US012647592B2

(12) United States Patent
Zhao et al.

(10) Patent No.: US 12,647,592 B2
(45) Date of Patent: Jun. 2, 2026

(54) ENCODING METHOD AND APPARATUS

(71) Applicant: Huawei Technologies Co., Ltd.,
Shenzhen (CN)

(72) Inventors: Yin Zhao, Hangzhou (CN); **Haitao
Yang, Shenzhen (CN); Jianle Chen,**
San Diego, CA (US)

(73) Assignee: **HUAWEI TECHNOLOGIES CO.,
LTD.,** Shenzhen (CN)

( * ) Notice: Subject to any disclaimer, the term of this
patent is extended or adjusted under 35
U.S.C. 154(b) by 0 days.

(21) Appl. No.: 18/931,212

(22) Filed: Oct. 30, 2024

(65) Prior Publication Data

US 2025/0056029 A1      Feb. 13, 2025

Related U.S. Application Data

(63) Continuation of application No. 17/973,151, filed on
Oct. 25, 2022, now Pat. No. 12,167,009, which is a
(Continued)

(30) Foreign Application Priority Data

Aug. 27, 2018   (WO) ................ PCT/CN2018/102524
Oct. 6, 2018   (WO) ................ PCT/CN2018/109254

(51) Int. Cl.
*H04N 19/12*      (2014.01)
*H04N 19/124*      (2014.01)
(Continued)

(52) U.S. Cl.
CPC ............. *H04N 19/44* (2014.11); *H04N 19/12*
(2014.11); *H04N 19/124* (2014.11);
(Continued)

(58) Field of Classification Search
None
See application file for complete search history.

(56) References Cited

U.S. PATENT DOCUMENTS 11,006,139 B2    5/2021  Zhao et al.
11,343,523 B2    5/2022  Zhao et al.
(Continued)

FOREIGN PATENT DOCUMENTS

CN          101668205 A        3/2010
CN          102165771 A        8/2011
(Continued)

OTHER PUBLICATIONS

Zhang, C., et al., "Video coding using Variable Block-Size Spatially
Varying Transforms," ICASSP 2009, XP031459377, Apr. 19, 2009,
p. 905-908.
(Continued)

*Primary Examiner* — Christopher G Findley
(74) *Attorney, Agent, or Firm* — Conley Rose, P.C.

(57) ABSTRACT

A video processing method includes: obtaining prediction
information of a CU; obtaining, when the CU comprises
only one residual TU and a size of the residual TU is less
than a size of the CU, a TU partitioning mode of the CU and
a residual position of the residual TU, wherein the TU
partitioning mode and the residual position are used to
determine a horizontal transform type and a vertical trans-
form type; obtaining transform coefficients of the residual
TU based on the horizontal transform type and the vertical
transform type; and generating a bitstream that is for storing
or transmitting and that includes the prediction information,
a first flag that indicates the TU partitioning mode, a second
flag that indicates the residual position, and the transform
coefficients.

20 Claims, 21 Drawing Sheets

Related U.S. Application Data continuation of application No. 17/227,821, filed on Apr. 12, 2021, now Pat. No. 11,523,129, which is a continuation of application No. 16/849,302, filed on Apr. 15, 2020, now Pat. No. 11,006,139, which is a continuation of application No. PCT/CN2018/109361, filed on Oct. 8, 2018.

(60) Provisional application No. 62/678,738, filed on May 31, 2018, provisional application No. 62/634,613, filed on Feb. 23, 2018, provisional application No. 62/572,987, filed on Oct. 16, 2017.

(51) Int. Cl.

| | |
|---|---|
| *H04N 19/176* | (2014.01) |
| *H04N 19/184* | (2014.01) |
| *H04N 19/44* | (2014.01) |
| *H04N 19/51* | (2014.01) |
| *H04N 19/61* | (2014.01) |
| *H04N 19/625* | (2014.01) |

(52) U.S. Cl.
CPC ......... *H04N 19/176* (2014.11); *H04N 19/184* (2014.11); *H04N 19/51* (2014.11); *H04N 19/61* (2014.11); *H04N 19/625* (2014.11)

(56) References Cited

U.S. PATENT DOCUMENTS

| | | | |
|---|---|---|---|
| 11,523,129 | B2 | 12/2022 | Zhao et al. |
| 2003/0113026 | A1 | 6/2003 | Srinivasan et al. |
| 2003/0156648 | A1 | 8/2003 | Holcomb et al. |
| 2008/0232705 | A1 | 9/2008 | Sohn et al. |
| 2009/0238271 | A1 | 9/2009 | Kim et al. |
| 2011/0170594 | A1 | 7/2011 | Budagavi et al. |
| 2012/0008683 | A1 | 1/2012 | Karczewicz et al. |
| 2012/0128074 | A1 | 5/2012 | Zhang et al. |
| 2013/0039417 | A1 | 2/2013 | Wang et al. |
| 2013/0243087 | A1 | 9/2013 | Lee et al. |
| 2013/0315302 | A1 | 11/2013 | Lim et al. |
| 2014/0056347 | A1 | 2/2014 | Xu et al. |
| 2014/0119455 | A1 | 5/2014 | Kobayashi |
| 2014/0146891 | A1 | 5/2014 | Chuang et al. |
| 2014/0226721 | A1 | 8/2014 | Joshi et al. |
| 2014/0241424 | A1 | 8/2014 | Oh et al. |
| 2014/0247866 | A1 | 9/2014 | Lee et al. |
| 2014/0286591 | A1 | 9/2014 | Cheon et al. |
| 2014/0307780 | A1 | 10/2014 | Cohen et al. |
| 2014/0307788 | A1 | 10/2014 | Lim et al. |
| 2015/0208094 | A1 | 7/2015 | Lee et al. |
| 2015/0350682 | A1 | 12/2015 | Zhang et al. |
| 2016/0219290 | A1 | 7/2016 | Zhao et al. |
| 2017/0094313 | A1* | 3/2017 | Zhao ................. H04N 1/32181 |
| 2017/0310958 | A1 | 10/2017 | Huang et al. |
| 2017/0366824 | A1 | 12/2017 | Hsu |
| 2018/0020218 | A1 | 1/2018 | Zhao et al. |
| 2018/0115775 | A1 | 4/2018 | Song et al. |
| 2018/0176582 | A1 | 6/2018 | Zhao et al. |
| 2018/0376150 | A1 | 12/2018 | Iwamura et al. |
| 2019/0222843 | A1 | 7/2019 | Lee |
| 2019/0342582 | A1 | 11/2019 | Su et al. |
| 2020/0304816 | A1 | 9/2020 | Zhao et al. |
| 2020/0329253 | A1 | 10/2020 | Zhao et al. |

FOREIGN PATENT DOCUMENTS

| | | |
|---|---|---|
| CN | 102986215 A | 3/2013 |
| CN | 103108181 A | 5/2013 |
| CN | 103152563 A | 6/2013 |
| CN | 103370939 A | 10/2013 |
| CN | 103380622 A | 10/2013 |
| CN | 103518374 A | 1/2014 |
| CN | 103581676 A | 2/2014 |
| CN | 103716623 A | 4/2014 |
| CN | 103997650 A | 8/2014 |
| CN | 104041048 A | 9/2014 |
| CN | 104067622 A | 9/2014 |
| CN | 104125466 A | 10/2014 |
| CN | 104735451 A | 6/2015 |
| CN | 104853217 A | 8/2015 |
| CN | 104935927 A | 9/2015 |
| CN | 105530518 A | 4/2016 |
| CN | 106254870 A | 12/2016 |
| CN | 106488242 A | 3/2017 |
| CN | 107005695 A | 8/2017 |
| CN | 107079165 A | 8/2017 |
| CN | 107211144 A | 9/2017 |
| EP | 2755388 A1 | 7/2014 |
| JP | 7381660 B2 | 4/2019 |
| KR | 20150086793 A | 7/2015 |
| WO | 2010116268 A1 | 10/2010 |
| WO | 2012150693 A1 | 11/2012 |
| WO | 2017131233 A1 | 8/2017 |
| WO | 2017171370 A1 | 10/2017 |

OTHER PUBLICATIONS

Zhang, C., et al., "Video Coding Using Spatially Varying Transform," PSIVT 2009, LNCS 5414, XP047468398, 2009, pp. 796-806.

An, J., et al., "Non-CE7: Boundary Dependent Transform for Inter Predicted Residue," Joint Collaborative Team on Video Coding (JCT-VC) of ITU-T SG16 WP3 and ISO/IEC JTC1/SC29/WG11, No. JCTVC-G281, 7th Meeting: Geneva, Ch., XP030110265, Nov. 21-30, 2011, 11 pages.

Zhao, Y., "CE6: Spatially Varying Transform (Test 6.1.12.1)," Joint Video Experts Team (JVET) of ITU-T SG 16 WP 3 and ISO/IEC JTC 1/SC 29/WG 11, JVET-K0139-v3, 11th Meeting: Ljubljana, SI, XP030199419, Jul. 10-18, 2018, 11th Meeting: Ljubljana, SI, 7 pages.

Zhao, X., et al., "Enhanced Multiple Transform for Video Coding," Data Compression Conference (DCC), IEEE, XP033027689, Mar. 30, 2016, p. 73-82.

Zhang, C., et al., "Video Coding Using Spatially Varying Transform," IEEE Trans. Image Process., vol. 21, No. 2, Feb. 2011, pp. 127-140.

"Series H: Audiovisual and Multimedia Systems, Infrastructure of audiovisual services—Coding of moving video, High efficiency video coding," ITU-T H.265, Dec. 2016, 664 pages.

Said, A., "Description of core experiment 6 (CE6): transforms and transform signaling," Joint Video Experts Team (JVET) of ITU-T SG 16 WP 3 and ISO/IEC JTC 1/SC 29/WG 11, JVET-K1026, 11th Meeting: Ljubljana, SI, XP030200052, Jul. 10-18, 2018, 13 pages.

Akula, S., et at., "Description of SDR, HDR and 360° video coding technology proposal considering mobile application scenario by Samsung, Huawei, GoPro, and HiSilicon," Joint Video Exploration Team (JVET) of ITU-T SG 16 WP 3 and ISO/IEC JTC 1/SC 29/WG 11, JVET-J0024_v2, 10th Meeting: San Diego, US, XP030151190, Apr. 10-20, 2018, 119 pages.

Document: JVET-D0117 , Xiang Li et al., Multi-Type-Tree, Joint Video Exploration Team (JVET) of ITU-T SG 16 WP 3 and ISO/IEC JTC 1/SC 29/WG 11, 4th Meeting: Chengdu, CN, Oct. 15-21, 2016, total 3 pages.

Document: JVET-B1001_v1 , Jianle Chen et al., Algorithm Description of Joint Exploration Test Model 2, Joint Video Exploration Team (JVET) of ITU-T SG 16 WP 3 and ISO/IEC JTC 1/SC 29/WG 11, 2nd Meeting: San Diego, USA, Feb. 20-26, 2016, total 31 pages.

"Series H: Audiovisual and Multimedia Systems; Infrastructure of audiovisual services—Coding of moving video; Advanced video coding for generic audiovisual services," ITU-T H.264, Apr. 2017, 812 pages.

Shen Yan-Fei et al., High Efficiency Video Coding, Chinese Journal of Computers, vol. 36, No. 11, Nov. 2013, with the English Abstract, 16 pages.

JCTVC-A119_Appendix_ Decoder_Description, Kemal Ugur et al., Appendix to Description of video coding technology proposal by Tandberg Nokia Ericsson, Joint Collaborative Team on Video

(56)     References Cited

OTHER PUBLICATIONS

Coding (JCT-VC) ofITU-T SG16 WP3 and 1S0/IEC JTC1/SC29/
WG11, 1st Meeting: Dresden, DE, Apr. 15-23, 2010, 55 pages,
XP030007563.
Cixun Zhang et al:"Video Coding Using Variable Block-Size Spa-
tially Varying Transforms." Apr. 19-24, 2009. total 4 pages.
Xin Zhao et al:"Enhanced Multiple Transform for Video Coding."
Mar. 1, 2016. total 10 pages.
Jicheng An et al:"Non-CE7: Boundary-Dependent Transform for
Inter-Predicted Residue." Document: JCTVC-G281. Joint Collab-
orative Team on Video Coding (JCT-VC) of ITU-T SG16 WP3 and
ISO/IEC JTC1/SC29/WG11 7th Meeting: Geneva, CH., Nov. 21-30,
2011. total 10 pages.

* cited by examiner

400

Video Coding Device

410

420

Processor    430

Coding Module

470

Rx

440

Tx

460    Memory

450

Downstream Ports

Upstream Ports

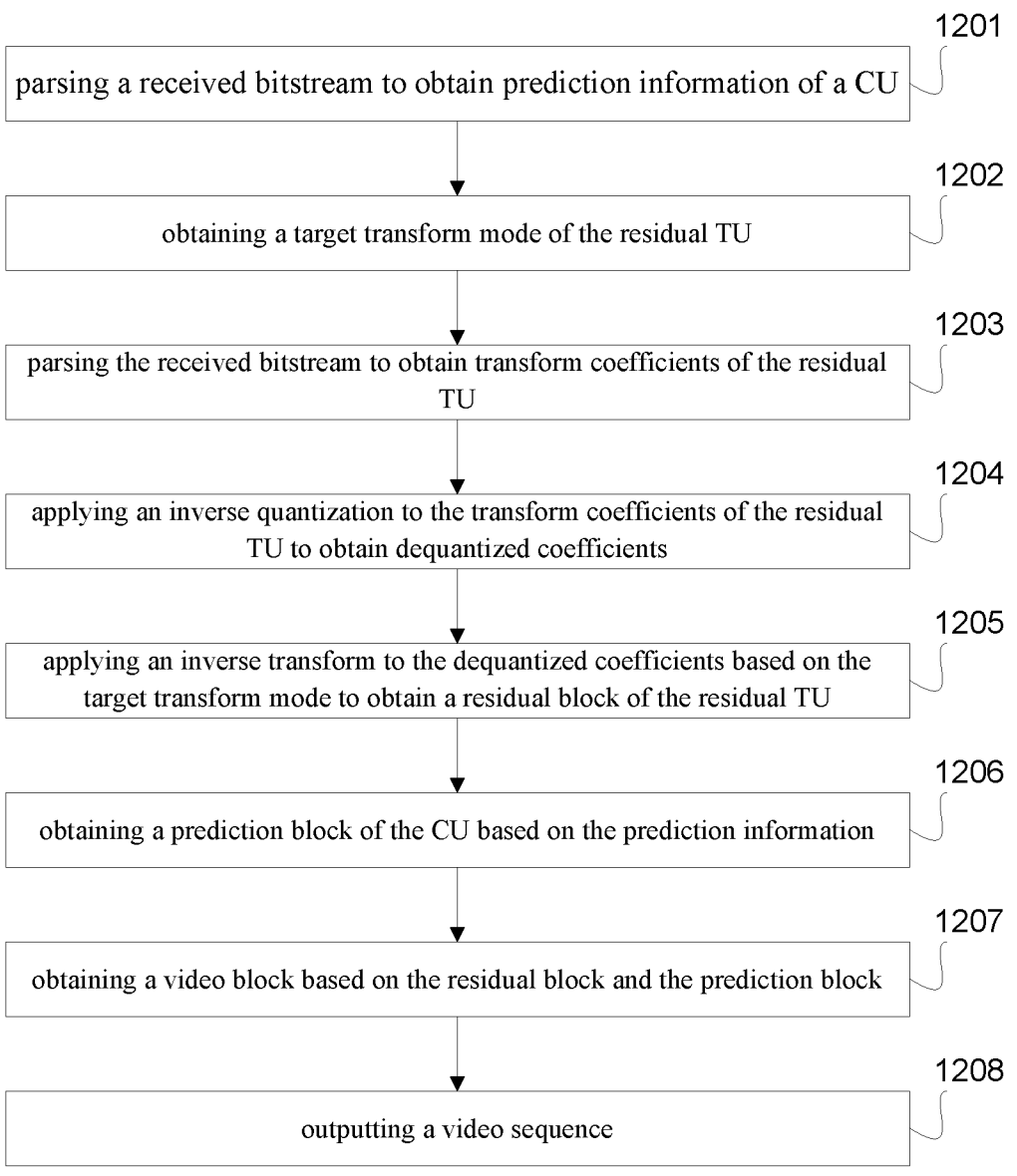

parsing a received bitstream to obtain prediction information of a CU — 1201 obtaining a target transform mode of the residual TU — 1202 parsing the received bitstream to obtain transform coefficients of the residual TU — 1203 applying an inverse quantization to the transform coefficients of the residual TU to obtain dequantized coefficients — 1204 applying an inverse transform to the dequantized coefficients based on the target transform mode to obtain a residual block of the residual TU — 1205 obtaining a prediction block of the CU based on the prediction information — 1206 obtaining a video block based on the residual block and the prediction block — 1207 outputting a video sequence — 1208

FIG. 12A

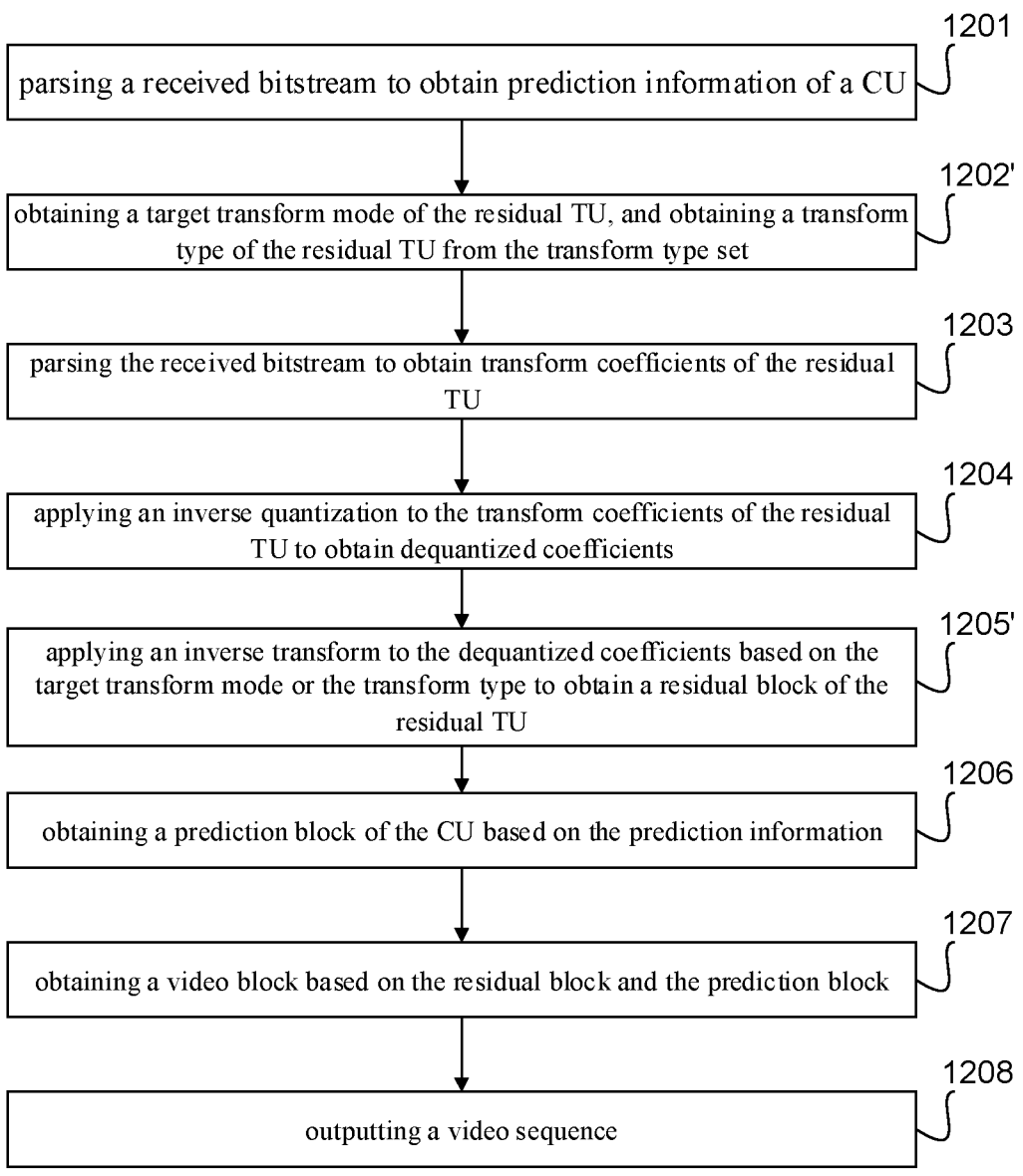

parsing a received bitstream to obtain prediction information of a CU — 1201 obtaining a target transform mode of the residual TU, and obtaining a transform type of the residual TU from the transform type set — 1202' parsing the received bitstream to obtain transform coefficients of the residual TU — 1203 applying an inverse quantization to the transform coefficients of the residual TU to obtain dequantized coefficients — 1204 applying an inverse transform to the dequantized coefficients based on the target transform mode or the transform type to obtain a residual block of the residual TU — 1205' obtaining a prediction block of the CU based on the prediction information — 1206 obtaining a video block based on the residual block and the prediction block — 1207 outputting a video sequence — 1208

(a) SVT-I        (b) SVT-II        (c) SVT-III

1600

(a) SVT-V        (b) SVT-H

1700

1800

1900

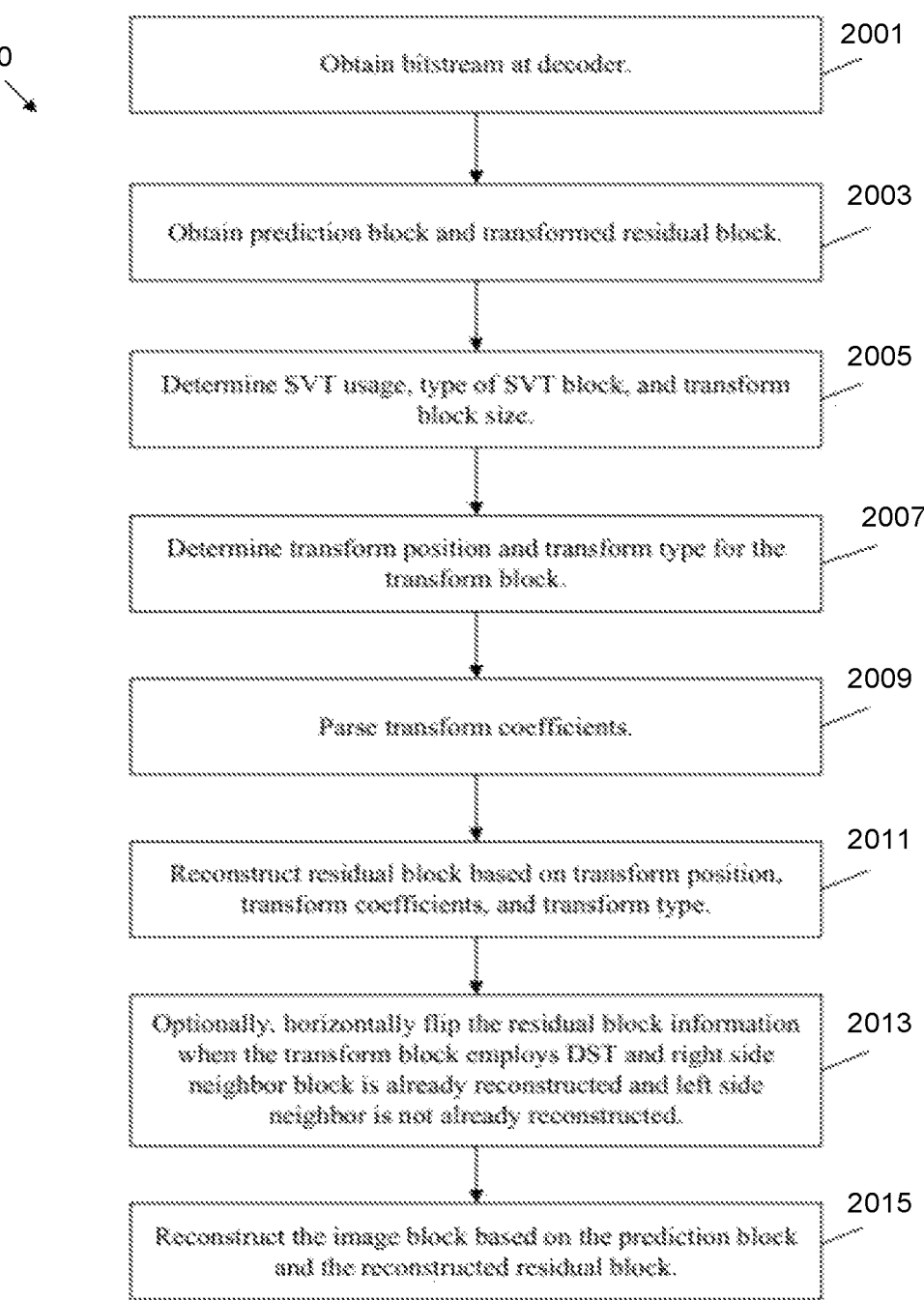

2000

2001 — Obtain bitstream at decoder.

2003 — Obtain prediction block and transformed residual block.

2005 — Determine SVT usage, type of SVT block, and transform block size.

2007 — Determine transform position and transform type for the transform block.

2009 — Parse transform coefficients.

2011 — Reconstruct residual block based on transform position, transform coefficients, and transform type.

2013 — Optionally, horizontally flip the residual block information when the transform block employs DST and right side neighbor block is already reconstructed and left side neighbor is not already reconstructed.

2015 — Reconstruct the image block based on the prediction block and the reconstructed residual block.

ENCODING METHOD AND APPARATUS

CROSS-REFERENCE TO RELATED APPLICATIONS

This is a continuation of U.S. patent application Ser. No. 17/973,151, filed on Oct. 25, 2022, which is a continuation of U.S. patent application Ser. No. 17/227,821, filed on Apr. 12, 2021, now U.S. Pat. No. 11,523,129, which is a continuation of U.S. patent application Ser. No. 16/849,302 filed on Apr. 15, 2020, now U.S. Pat. No. 11,006,139, which is a continuation of International Patent Application No. PCT/CN2018/109361 filed on Oct. 8, 2018, which claims priority to International Patent Application No. PCT/CN2018/102524 filed on Aug. 27, 2018 and International Patent Application No. PCT/CN2018/109254 filed on Oct. 6, 2018, which claim the benefit of U.S. Provisional Patent Application No. 62/678,738 filed on May 31, 2018, U.S. Provisional Patent Application No. 62/634,613 filed on Feb. 23, 2018, and U.S. Provisional Patent Application No. 62/572,987 filed on Oct. 16, 2017, all of which are hereby incorporated by reference.

TECHNICAL FIELD

The present disclosure relates to the communications field, and in particular, to an encoding method and apparatus.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data.

With limited network resources and ever increasing demands of higher video quality, improved compression and decompression techniques that improve compression ratio with little to no sacrifice in image quality are desirable.

SUMMARY

Embodiments of the present disclosure provide an encoding method and apparatus, which can perform proper quantization bit allocation for spectral coefficients of an audio signal, thereby improving quality of a signal obtained by a decoder by means of decoding.

To achieve the foregoing objective, the following technical solutions are used in the embodiments of the present disclosure.

According to a first aspect, an embodiment of the present disclosure provides a video decoding method, including: parsing a received bitstream to obtain prediction information of a coding unit (CU); when the CU has only one residual transform unit (TU) and a size of the residual TU is less than a size of the CU, obtaining a target transform mode of the residual TU, wherein the target transform mode specifies a TU partitioning mode of the CU, the position of the residual TU, and a transform type set of the residual TU; obtaining a transform type of the residual TU from the transform type set; parsing the received bitstream to obtain transform coefficients of the residual TU; applying an inverse quantization to the transform coefficients of the residual TU to obtain dequantized coefficients; applying, based on the transform type of the residual TU (or based on the TU partitioning mode of the CU, the position of the residual TU and the transform type of the residual TU), an inverse transform to the dequantized coefficients to obtain a residual block of the residual TU; obtaining a prediction block of the CU based on the prediction information; obtaining a video block based on the residual block and the prediction block; and outputting a video sequence, the video sequence including a video frame that includes the video block.

Because the target transform mode can specify the TU partitioning mode of the CU, the position of the residual TU, and the transform type of the residual, such that not only the decoding efficiency can be improved, but also the decoding quality can be improved. Additionally, the target transform mode can specify the above information, thus can reduce the bits needed for transmitting the above information, in order to save the transmitting resource, e.g., bandwidth for transmitting the encoded audio data.

In a possible embodiment of the first aspect, wherein N transform modes correspond to a transform type set, wherein the transform type set includes two or more transform types or the transform type set includes one or more transform types.

In a possible embodiment of the first aspect, wherein the transform type set of each transform mode includes four transform types, as follows.

Transform type 1: a horizontal transform of the residual TU is discrete sine transform (DST) type VII (DST-7) and a vertical transform of the residual TU is DST-7, denoted as DST-7/DST-7.

Transform type 2: a horizontal transform of the residual TU is DST-7 and a vertical transform of the residual TU is discrete cosine transform (DCT) type VIII (DCT-8), denoted as DST-7/DCT-8.

Transform type 3: a horizontal transform of the residual TU is DCT-8 and a vertical transform of the residual TU is DST-7, denoted as DCT-8/DST-7.

Transform type 4: a horizontal transform of the residual TU is DCT-8 and a vertical transform of the residual TU is DCT-8, denoted as DCT-8/DCT-8.

In an alternative embodiment, DST-7 may be replaced with DST type IV (DST-4), and DCT-8 may be replaced with DCT type IV (DCT-4) throughout the present disclosure. Accordingly, in another possible embodiment of the first aspect, wherein N transform modes correspond to a transform type set, wherein the transform type set includes two or more transform types or the transform type set includes one or more transform types.

In a possible embodiment of the first aspect, wherein the transform type set of each transform mode includes four transform types, as follows.

Transform type 1: a horizontal transform of the residual TU is DST-4 and a vertical transform of the residual TU is DST-4, denoted as DST-4/DST-4.

Transform type 2: a horizontal transform of the residual TU is DST-4 and a vertical transform of the residual TU is DCT-4, denoted as DST-4/DCT-4.

Transform type 3: a horizontal transform of the residual TU is DCT-4 and a vertical transform of the residual TU is DST-4, denoted as DCT-4/DST-4.

Transform type 4: a horizontal transform of the residual TU is DCT-4 and a vertical transform of the residual TU is DCT-4, denoted as DCT-4/DCT-4.

In a possible embodiment of the first aspect, N transform modes correspond to N transform type sets, wherein N>=1 and N is a positive integer, and wherein each transform type set includes two or more transform types or each transform type set includes one or more transform types.

In a possible embodiment of the first aspect, if the transform type set includes two or more transform types, the step of obtaining a transform type of the residual TU from the transform type set, comprises: selecting a transform type of the residual TU from the transform type set.

In a possible embodiment of the first aspect, the method further comprises: parsing indication information from the bitstream, wherein the indication information indicates a transform type of the residual TU. Additionally, the step of obtaining a transform type of the residual TU from the transform type set, comprises: determining a transform type of the residual TU from the transform type set based on the indication information parsed from the bitstream.

In a possible embodiment of the first aspect, if the transform type set of the residual TU includes a first transform type and a second transform type, the second transform type is dependent from the first transform type. Alternatively, if the transform type set of the residual TU includes a first transform type and a second transform type, the second transform type is independent from the first transform type or the second transform type is a unified transform type.

In a possible embodiment of the first aspect, the second transform type is a unified transform type being a horizontal transform of the residual TU is DCT-2 and a vertical transform of the residual TU is DCT-2, denoted as DCT-2/DCT-2.

In a first possible embodiment of the first aspect, the size of the CU is denoted by W×H, and the target transform mode of the residual TU is one of the following modes.

Transform mode Q0, which specifies that the TU partitioning mode of the CU is to partition the CU into 4 TUs of size (W/2)×(H/2), the position of the residual TU is top-left, and the transform type is selected from a transform type set; the transform type set includes two transform types, wherein a first transform type is that a horizontal transform of the residual TU is DCT-8 and a vertical transform of the residual TU is DCT-8; a second transform type is that a horizontal transform of the residual TU is DST-7 and a vertical transform of the residual TU is DST-7.

Transform mode Q1, which specifies that the TU partitioning mode of the CU is to partition the CU into 4 TUs of size (W/2)×(H/2), the position of the residual TU is top-right, and the transform type is selected from a transform type set; the transform type set includes two transform types, wherein a first transform type is that a horizontal transform of the residual TU is DST-7 and a vertical transform of the residual TU is DCT-8; a second transform type is that a horizontal transform of the residual TU is DCT-8 and a vertical transform of the residual TU is DST-7.

Transform mode Q2, which specifies that the TU partitioning mode of the CU is to partition the CU into 4 TUs of size (W/2)×(H/2), the position of the residual TU is bottom-left, and the transform type is selected from a transform type set; the transform type set includes two transform types, wherein a first transform type is that a horizontal transform of the residual TU is DCT-8 and a vertical transform of the residual TU is DST-7; a second transform type is that a horizontal transform of the residual TU is DST-7 and a vertical transform of the residual TU is DCT-8.

Transform mode Q3, which specifies that the TU partitioning mode of the CU is to partition the CU into 4 TUs of size (W/2)×(H/2), the position of the residual TU is bottom-right, and the transform type is selected from a transform type set; the transform type set includes two transform types, wherein a first transform type is that a horizontal transform of the residual TU is DST-7 and a vertical transform of the residual TU is DST-7; a second transform type is that a horizontal transform of the residual TU is DCT-8 and a vertical transform of the residual TU is DCT-8.

Transform mode QH0, which specifies that the TU partitioning mode of the CU is to partition the CU into 3 TUs, wherein 2 TUs of the 3 TUs are in the top and have a size of (W/2)×(H/2), and the other TU of the 3 TUs is in the bottom and has a size of W×(H/2), the position of the residual TU is top-left, and the transform type is selected from a transform type set; the transform type set includes two transform types, wherein a first transform type is that a horizontal transform of the residual TU is DCT-8 and a vertical transform of the residual TU is DCT-8; a second transform type is that a horizontal transform of the residual TU is DST-7 and a vertical transform of the residual TU is DST-7.

Transform mode QH1, which specifies that the TU partitioning mode of the CU is to partition the CU into 3 TUs, wherein 2 TUs of the 3 TUs are in the top and have a size of (W/2)×(H/2), and the other TU of the 3 TUs is in the bottom and has a size of W×(H/2), the position of the residual TU is top-right, and the transform type is selected from a transform type set; the transform type set includes two transform types, wherein a first transform type is that a horizontal transform of the residual TU is DST-7 and a vertical transform of the residual TU is DCT-8; a second transform type is that a horizontal transform of the residual TU is DCT-8 and a vertical transform of the residual TU is DST-7.

Transform mode QH2, which specifies that the TU partitioning mode of the CU is to partition the CU into 3 TUs, wherein 2 TUs of the 3 TUs are in the bottom and have a size of (W/2)×(H/2), and the other TU of the 3 TUs is in the top and has a size of W×(H/2), the position of the residual TU is bottom-left, and the transform type is selected from a transform type set; the transform type set includes two transform types, wherein a first transform type is that a horizontal transform of the residual TU is DCT-8 and a vertical transform of the residual TU is DST-7; a second transform type is that a horizontal transform of the residual TU is DST-7 and a vertical transform of the residual TU is DCT-8.

Transform mode QH3, which specifies that the TU partitioning mode of the CU is to partition the CU into 3 TUs, wherein 2 TUs of the 3 TUs are in the bottom and have a size of (W/2)×(H/2), and the other TU of the 3 TUs is in the top and has a size of W×(H/2), the position of the residual TU is bottom-right, and the transform type is selected from a transform type set; the transform type set includes two transform types, wherein a first transform type is that a horizontal transform of the residual TU is DST-7 and a vertical transform of the residual TU is DST-7; a second transform type is that a horizontal transform of the residual TU is DCT-8 and a vertical transform of the residual TU is DCT-8.

Transform mode QV0, which specifies that the TU partitioning mode of the CU is to partition the CU into 3 TUs, wherein 2 TUs of the 3 TUs are in the left and have a size of (W/2)×(H/2), and the other TU of the 3 TUs is in the right and has a size of (W/2)×H, the position of the residual TU is top-left, and the transform type is selected from a transform type set; the transform type set includes two transform types, wherein a first transform type is that a horizontal transform of the residual TU is DCT-8 and a vertical transform of the residual TU is DCT-8; a second transform type is that a horizontal transform of the residual TU is DST-7 and a vertical transform of the residual TU is DST-7.

Transform mode QV1, which specifies that the TU partitioning mode of the CU is to partition the CU into 3 TUs, wherein 2 TUs of the 3 TUs are in the right and have a size of (W/2)×(H/2), and the other TU of the 3 TUs is in the left and has a size of (W/2)×H, the position of the residual TU is top-right, and the transform type is selected from a transform type set; the transform type set includes two transform types, wherein a first transform type is that a horizontal transform of the residual TU is DST-7 and a vertical transform of the residual TU is DCT-8; a second transform type is that a horizontal transform of the residual TU is DCT-8 and a vertical transform of the residual TU is DST-7.

Transform mode QV2, which specifies that the TU partitioning mode of the CU is to partition the CU into 3 TUs, wherein 2 TUs of the 3 TUs are in the left and have a size of (W/2)×(H/2), and the other TU of the 3 TUs is in the right and has a size of (W/2)×H, the position of the residual TU is bottom-left, and the transform type is selected from a transform type set; the transform type set includes two transform types, wherein a first transform type is that a horizontal transform of the residual TU is DCT-8 and a vertical transform of the residual TU is DST-7; a second transform type is that a horizontal transform of the residual TU is DST-7 and a vertical transform of the residual TU is DCT-8.

Transform mode QV3, which specifies that the TU partitioning mode of the CU is to partition the CU into 3 TUs, wherein 2 TUs of the 3 TUs are in the right and have a size of (W/2)×(H/2), and the other TU of the 3 TUs is in the left and has a size of (W/2)×H, the position of the residual TU is bottom-right, and the transform type is selected from a transform type set; the transform type set includes two transform types, wherein a first transform type is that a horizontal transform of the residual TU is DST-7 and a vertical transform of the residual TU is DST-7; a second transform type is that a horizontal transform of the residual TU is DCT-8 and a vertical transform of the residual TU is DCT-8.

Transform mode HQ0, which specifies that the TU partitioning mode of the CU is to partition the CU into 2 TUs, wherein a size of a top TU is smaller than a size of a bottom TU, the position of the residual TU is top, and the transform type is selected from a transform type set; the transform type set includes two transform types, wherein a first transform type is that a horizontal transform of the residual TU is DST-7 or DCT-2, and a vertical transform of the residual TU is DCT-8; a second transform type is that a horizontal transform of the residual TU is DCT-8 or DCT-2, and a vertical transform of the residual TU is DST-7.

Transform mode HQ1, which specifies that the TU partitioning mode of the CU is to partition the CU into 2 TUs, wherein a size of a bottom TU is smaller than a size of a top TU, the position of the residual TU is bottom, and the transform type is selected from a transform type set; the transform type set includes two transform types, wherein a first transform type is that a horizontal transform of the residual TU is DST-7 or DCT-2, and a vertical transform of the residual TU is DST-7; a second transform type is that a horizontal transform of the residual TU is DCT-8 or DCT-2 and a vertical transform of the residual TU is DCT-8.

Transform mode VQ0, which specifies that the TU partitioning mode of the CU is to partition the CU into 2 TUs, wherein a size of a left TU is smaller than a size of a right TU, the position of the residual TU is left, and the transform type is selected from a transform type set; the transform type set includes two transform types, wherein a first transform type is that a horizontal transform of the residual TU is DCT-8 and a vertical transform of the residual TU is DST-7 or DCT-2; a second transform type is that a horizontal transform of the residual TU is DST-7, and a vertical transform of the residual TU is DCT-8 or DCT-2.

Transform mode VQ1, which specifies that the TU partitioning mode of the CU is to partition the CU into 2 TUs, wherein a size of a right TU is smaller than a size of a left TU, the position of the residual TU is right, and the transform type is selected from a transform type set; the transform type set includes two transform types, wherein a first transform type is that a horizontal transform of the residual TU is DST-7 and a vertical transform of the residual TU is DST-7 or DCT-2; a second transform type is that a horizontal transform of the residual TU is DCT-8 and a vertical transform of the residual TU is DCT-8 or DCT-2.

Transform mode HH0, which specifies that the TU partitioning mode of the CU is to partition the CU into 2 TUs, wherein a size of a top TU is equal to a size of a bottom TU, the position of the residual TU is top, and the transform type is selected from a transform type set; the transform type set includes two transform types, wherein a first transform type is that a horizontal transform of the residual TU is DST-7 or DCT-2, and a vertical transform of the residual TU is DCT-8; a second transform type is that a horizontal transform of the residual TU is DCT-8 or DCT-2 and a vertical transform of the residual TU is DST-7.

Transform mode HH1, which specifies that the TU partitioning mode of the CU is to partition the CU into 2 TUs, wherein a size of a top TU is equal to a size of a bottom TU, the position of the residual TU is bottom, and the transform type is selected from a transform type set; the transform type set includes two transform types, wherein a first transform type is that a horizontal transform of the residual TU is DST-7 or DCT-2, and a vertical transform of the residual TU is DST-7; a second transform type is that a horizontal transform of the residual TU is DCT-8 or DCT-2 and a vertical transform of the residual TU is DCT-8.

Transform mode HH2, which specifies that the TU partitioning mode of the CU is to partition the CU into 3 TUs, wherein a size of a top TU is equal to a size of a bottom TU, and the size of the top TU is less than a size of a center TU, the position of the residual TU is center, and the transform type is selected from a transform type set; the transform type set includes two transform types, wherein a first transform type is that a horizontal transform of the residual TU is DST-7 and a vertical transform of the residual TU is DCT-2; a second transform type is that a horizontal transform of the residual TU is DCT-8 and a vertical transform of the residual TU is DCT-2; or wherein a first transform type is that a horizontal transform of the residual TU is DST-7 and a vertical transform of the residual TU is DST-1; a second transform type is that a horizontal transform of the residual TU is DCT-8 and a vertical transform of the residual TU is DST-1.

Transform mode VH0, which specifies that the TU partitioning mode of the CU is to partition the CU into 2 TUs, wherein a size of a left TU is equal to a size of a right TU, the position of the residual TU is left, and the transform type is selected from a transform type set; the transform type set includes two transform types, wherein a first transform type is that a horizontal transform of the residual TU is DCT-8 and a vertical transform of the residual TU is DST-7 or DCT-2; a second transform type is that a horizontal transform of the residual TU is DST-7 and a vertical transform of the residual TU is DCT-8 or DCT-2.

Transform mode VH1, which specifies that the TU partitioning mode of the CU is to partition the CU into 2 TUs, wherein a size of a left TU is equal to a size of a right TU, the position of the residual TU is right, and the transform type is selected from a transform type set; the transform type set includes two transform types, wherein a first transform type is that a horizontal transform of the residual TU is DST-7 and a vertical transform of the residual TU is DST-7 or DCT-2; a second transform type is that a horizontal transform of the residual TU is DCT-8 and a vertical transform of the residual TU is DCT-8 or DCT-2.

Transform mode VH2 transform mode HH2, which specifies that the TU partitioning mode of the CU is to partition the CU into 3 TUs, wherein a size of a left TU is equal to a size of a right TU and the size of the left TU is less than a size of a center TU, the position of the residual TU is center, and the transform type is selected from a transform type set; the transform type set includes two transform types, wherein a first transform type is that a horizontal transform of the residual TU is DCT-2 and a vertical transform of the residual TU is DST-7; a second transform type is that a horizontal transform of the residual TU is DCT-2 and a vertical transform of the residual TU is DCT-8; or wherein first transform type is that a horizontal transform of the residual TU is DST-1 and a vertical transform of the residual TU is DST-7; a second transform type is that a horizontal transform of the residual TU is DST-1 and a vertical transform of the residual TU is DCT-8.

In an alternative embodiment, DST-7 may be replaced with DST-4, and DCT-8 may be replaced with DCT-4 throughout the present disclosure. Accordingly, in another first possible embodiment of the first aspect, the size of the CU is denoted by W×H; wherein the target transform mode of the residual TU is one of the following modes.

Transform mode Q0, which specifies that the TU partitioning mode of the CU is to partition the CU into 4 TUs of size (W/2)×(H/2), the position of the residual TU is top-left, and the transform type is selected from a transform type set; the transform type set includes two transform types, wherein a first transform type is that a horizontal transform of the residual TU is DCT-4 and a vertical transform of the residual TU is DCT-4; a second transform type is that a horizontal transform of the residual TU is DST-4 and a vertical transform of the residual TU is DST-4.

Transform mode Q1, which specifies that the TU partitioning mode of the CU is to partition the CU into 4 TUs of size (W/2)×(H/2), the position of the residual TU is top-right, and the transform type is selected from a transform type set; the transform type set includes two transform types, wherein a first transform type is that a horizontal transform of the residual TU is DST-4 and a vertical transform of the residual TU is DCT-4; a second transform type is that a horizontal transform of the residual TU is DCT-4 and a vertical transform of the residual TU is DST-4.

Transform mode Q2, which specifies that the TU partitioning mode of the CU is to partition the CU into 4 TUs of size (W/2)×(H/2), the position of the residual TU is bottom-left, and the transform type is selected from a transform type set; the transform type set includes two transform types, wherein a first transform type is that a horizontal transform of the residual TU is DCT-4 and a vertical transform of the residual TU is DST-4; a second transform type is that a horizontal transform of the residual TU is DST-4 and a vertical transform of the residual TU is DCT-4.

Transform mode Q3, which specifies that the TU partitioning mode of the CU is to partition the CU into 4 TUs of size (W/2)×(H/2), the position of the residual TU is bottom-right, and the transform type is selected from a transform type set; the transform type set includes two transform types, wherein a first transform type is that a horizontal transform of the residual TU is DST-4 and a vertical transform of the residual TU is DST-4; a second transform type is that a horizontal transform of the residual TU is DCT-4 and a vertical transform of the residual TU is DCT-4.

Transform mode QH0, which specifies that the TU partitioning mode of the CU is to partition the CU into 3 TUs, wherein 2 TUs of the 3 TUs are in the top and have a size of (W/2)×(H/2), and the other TU of the 3 TUs is in the bottom and has a size of W×(H/2), the position of the residual TU is top-left, and the transform type is selected from a transform type set; the transform type set includes two transform types, wherein a first transform type is that a horizontal transform of the residual TU is DCT-4 and a vertical transform of the residual TU is DCT-4; a second transform type is that a horizontal transform of the residual TU is DST-4 and a vertical transform of the residual TU is DST-4.

Transform mode QH1, which specifies that the TU partitioning mode of the CU is to partition the CU into 3 TUs, wherein 2 TUs of the 3 TUs are in the top and have a size of (W/2)×(H/2), and the other TU of the 3 TUs is in the bottom and has a size of W×(H/2), the position of the residual TU is top-right, and the transform type is selected from a transform type set; the transform type set includes two transform types, wherein a first transform type is that a horizontal transform of the residual TU is DST-4 and a vertical transform of the residual TU is DCT-4; a second transform type is that a horizontal transform of the residual TU is DCT-4 and a vertical transform of the residual TU is DST-4.

Transform mode QH2, which specifies that the TU partitioning mode of the CU is to partition the CU into 3 TUs, wherein 2 TUs of the 3 TUs are in the bottom and have a size of (W/2)×(H/2), and the other TU of the 3 TUs is in the top and has a size of W×(H/2), the position of the residual TU is bottom-left, and the transform type is selected from a transform type set; the transform type set includes two transform types, wherein a first transform type is that a horizontal transform of the residual TU is DCT-4 and a vertical transform of the residual TU is DST-4; a second transform type is that a horizontal transform of the residual TU is DST-4 and a vertical transform of the residual TU is DCT-4.

Transform mode QH3, which specifies that the TU partitioning mode of the CU is to partition the CU into 3 TUs, wherein 2 TUs of the 3 TUs are in the bottom and have a size of (W/2)×(H/2), and the other TU of the 3 TUs is in the top and has a size of W×(H/2), the position of the residual TU is bottom-right, and the transform type is selected from a transform type set; the transform type set includes two transform types, wherein a first transform type is that a horizontal transform of the residual TU is DST-4 and a vertical transform of the residual TU is DST-4; a second transform type is that a horizontal transform of the residual TU is DCT-4 and a vertical transform of the residual TU is DCT-4.

Transform mode QV0, which specifies that the TU partitioning mode of the CU is to partition the CU into 3 TUs, wherein 2 TUs of the 3 TUs are in the left and have a size of (W/2)×(H/2), and the other TU of the 3 TUs is in the right and has a size of (W/2)×H, the position of the residual TU is top-left, and the transform type is selected from a transform type set; the transform type set includes two transform types, wherein a first transform type is that a horizontal transform of the residual TU is DCT-4 and a vertical transform of the residual TU is DCT-4; a second transform type is that a horizontal transform of the residual TU is DST-4 and a vertical transform of the residual TU is DST-4.

Transform mode QV1, which specifies that the TU partitioning mode of the CU is to partition the CU into 3 TUs, wherein 2 TUs of the 3 TUs are in the right and have a size of (W/2)×(H/2), and the other TU of the 3 TUs is in the left and has a size of (W/2)×H, the position of the residual TU is top-right, and the transform type is selected from a transform type set; the transform type set includes two transform types, wherein a first transform type is that a horizontal transform of the residual TU is DST-4 and a vertical transform of the residual TU is DCT-4; a second transform type is that a horizontal transform of the residual TU is DCT-4 and a vertical transform of the residual TU is DST-4.

Transform mode QV2, which specifies that the TU partitioning mode of the CU is to partition the CU into 3 TUs, wherein 2 TUs of the 3 TUs are in the left and have a size of (W/2)×(H/2), and the other TU of the 3 TUs is in the right and has a size of (W/2)×H, the position of the residual TU is bottom-left, and the transform type is selected from a transform type set; the transform type set includes two transform types, wherein a first transform type is that a horizontal transform of the residual TU is DCT-4 and a vertical transform of the residual TU is DST-4; a second transform type is that a horizontal transform of the residual TU is DST-4 and a vertical transform of the residual TU is DCT-4.

Transform mode QV3, which specifies that the TU partitioning mode of the CU is to partition the CU into 3 TUs, wherein 2 TUs of the 3 TUs are in the right and have a size of (W/2)×(H/2), and the other TU of the 3 TUs is in the left and has a size of (W/2)×H, the position of the residual TU is bottom-right, and the transform type is selected from a transform type set; the transform type set includes two transform types, wherein a first transform type is that a horizontal transform of the residual TU is DST-4 and a vertical transform of the residual TU is DST-4; a second transform type is that a horizontal transform of the residual TU is DCT-4 and a vertical transform of the residual TU is DCT-4.

Transform mode HQ0, which specifies that the TU partitioning mode of the CU is to partition the CU into 2 TUs, wherein a size of a top TU is smaller than a size of a bottom TU, the position of the residual TU is top, and the transform type is selected from a transform type set; the transform type set includes two transform types, wherein a first transform type is that a horizontal transform of the residual TU is DST-4 or DCT-2, and a vertical transform of the residual TU is DCT-4; a second transform type is that a horizontal transform of the residual TU is DCT-4 or DCT-2, and a vertical transform of the residual TU is DST-4.

Transform mode HQ1, which specifies that the TU partitioning mode of the CU is to partition the CU into 2 TUs, wherein a size of a bottom TU is smaller than a size of a top TU, the position of the residual TU is bottom, and the transform type is selected from a transform type set; the transform type set includes two transform types, wherein a first transform type is that a horizontal transform of the residual TU is DST-4 or DCT-2, and a vertical transform of the residual TU is DST-4; a second transform type is that a horizontal transform of the residual TU is DCT-4 or DCT-2 and a vertical transform of the residual TU is DCT-4.

Transform mode VQ0, which specifies that the TU partitioning mode of the CU is to partition the CU into 2 TUs, wherein a size of a left TU is smaller than a size of a right TU, the position of the residual TU is left, and the transform type is selected from a transform type set; the transform type set includes two transform types, wherein a first transform type is that a horizontal transform of the residual TU is DCT-4 and a vertical transform of the residual TU is DST-4 or DCT-2; a second transform type is that a horizontal transform of the residual TU is DST-4, and a vertical transform of the residual TU is DCT-4 or DCT-2.

Transform mode VQ1, which specifies that the TU partitioning mode of the CU is to partition the CU into 2 TUs, wherein a size of a right TU is smaller than a size of a left TU, the position of the residual TU is right, and the transform type is selected from a transform type set; the transform type set includes two transform types, wherein a first transform type is that a horizontal transform of the residual TU is DST-4 and a vertical transform of the residual TU is DST-4 or DCT-2; a second transform type is that a horizontal transform of the residual TU is DCT-4 and a vertical transform of the residual TU is DCT-4 or DCT-2.

Transform mode HH0, which specifies that the TU partitioning mode of the CU is to partition the CU into 2 TUs, wherein a size of a top TU is equal to a size of a bottom TU, the position of the residual TU is top, and the transform type is selected from a transform type set; the transform type set includes two transform types, wherein a first transform type is that a horizontal transform of the residual TU is DST-4 or DCT-2, and a vertical transform of the residual TU is DCT-4; a second transform type is that a horizontal transform of the residual TU is DCT-4 or DCT-2 and a vertical transform of the residual TU is DST-4.

Transform mode HH1, which specifies that the TU partitioning mode of the CU is to partition the CU into 2 TUs, wherein a size of a top TU is equal to a size of a bottom TU, the position of the residual TU is bottom, and the transform type is selected from a transform type set; the transform type set includes two transform types, wherein a first transform type is that a horizontal transform of the residual TU is DST-4 or DCT-2, and a vertical transform of the residual TU is DST-4; a second transform type is that a horizontal transform of the residual TU is DCT-4 or DCT-2 and a vertical transform of the residual TU is DCT-4.

Transform mode HH2, which specifies that the TU partitioning mode of the CU is to partition the CU into 3 TUs, wherein a size of a top TU is equal to a size of a bottom TU, and the size of the top TU is less than a size of a center TU, the position of the residual TU is center, and the transform type is selected from a transform type set; the transform type set includes two transform types, wherein a first transform type is that a horizontal transform of the residual TU is DST-4 and a vertical transform of the residual TU is DCT-2; a second transform type is that a horizontal transform of the residual TU is DCT-4 and a vertical transform of the residual TU is DCT-2; or wherein a first transform type is that a horizontal transform of the residual TU is DST-4 and a vertical transform of the residual TU is DST-1; wherein a second transform type is that a second transform type is that a horizontal transform of the residual TU is DCT-4 and a vertical transform of the residual TU is DST-1.

Transform mode VH0, which specifies that the TU partitioning mode of the CU is to partition the CU into 2 TUs, wherein a size of a left TU is equal to a size of a right TU, the position of the residual TU is left, and the transform type is selected from a transform type set; the transform type set includes two transform types, wherein a first transform type is that a horizontal transform of the residual TU is DCT-4 and a vertical transform of the residual TU is DST-4 or DCT-2; a second transform type is that a horizontal transform of the residual TU is DST-4 and a vertical transform of the residual TU is DCT-4 or DCT-2.

Transform mode VH1, which specifies that the TU partitioning mode of the CU is to partition the CU into 2 TUs, wherein a size of a left TU is equal to a size of a right TU, the position of the residual TU is right, and the transform type is selected from a transform type set; the transform type set includes two transform types, wherein a first transform type is that a horizontal transform of the residual TU is DST-4 and a vertical transform of the residual TU is DST-4 or DCT-2; a second transform type is that a horizontal transform of the residual TU is DCT-4 and a vertical transform of the residual TU is DCT-4 or DCT-2.

Transform mode VH2 transform mode HH2, which specifies that the TU partitioning mode of the CU is to partition the CU into 3 TUs, wherein a size of a left TU is equal to a size of a right TU and the size of the left TU is less than a size of a center TU, the position of the residual TU is center, and the transform type is selected from a transform type set; the transform type set includes two transform types, wherein a first transform type is that a horizontal transform of the residual TU is DCT-2 and a vertical transform of the residual TU is DST-4; a second transform type is that a horizontal transform of the residual TU is DCT-2 and a vertical transform of the residual TU is DCT-4; or wherein first transform type is that a horizontal transform of the residual TU is DST-1 and a vertical transform of the residual TU is DST-4; a second transform type is that a horizontal transform of the residual TU is DST-1 and a vertical transform of the residual TU is DCT-4.

For another example, the transform type set of each transform mode may contain four transform types as follows.

Type 1: a horizontal transform of the residual TU is DST-7 and a vertical transform of the residual TU is DST-7, denoted as DST-7/DST-7.

Type 2: a horizontal transform of the residual TU is DST-7 and a vertical transform of the residual TU is DCT-8, denoted as DST-7/DCT-8.

Type 3: a horizontal transform of the residual TU is DCT-8 and a vertical transform of the residual TU is DST-7, denoted as DCT-8/DST-7.

Type 4: a horizontal transform of the residual TU is DCT-8 and a vertical transform of the residual TU is DCT-8, denoted as DCT-8/DCT-8.

In an alternative embodiment, DST-7 may be replaced with DST-4, and DCT-8 may be replaced with DCT-4 throughout the present disclosure. Accordingly, For another example, the transform type set of each transform mode may contain four transform types as follows.

Type 1: a horizontal transform of the residual TU is DST-4 and a vertical transform of the residual TU is DST-4, denoted as DST-4/DST-4.

Type 2: a horizontal transform of the residual TU is DST-4 and a vertical transform of the residual TU is DCT-4, denoted as DST-4/DCT-4.

Type 3: a horizontal transform of the residual TU is DCT-4 and a vertical transform of the residual TU is DST-4, denoted as DCT-4/DST-4.

Type 4: a horizontal transform of the residual TU is DCT-4 and a vertical transform of the residual TU is DCT-4, denoted as DCT-4/DCT-4.

The transform type of the residual TU is signaled in bitstream. The indication information (such as an index or one or more flags) is signaled to indicate which one of the plurality of transform types is used for the residual TU. When a transform type set contains 2 transform types, one flag is signaled to indicate which one of the 2 transform types is used for the residual TU. When a transform type set contains 4 transform types, an index is signaled to indicate which one of the 4 transform types is used for the residual TU, and the index may be coded by 2 bins or by truncated unary code. For example, if the quantity of transform types is more than two, two flags may be used to indicate which one of the plurality of transform types is used for the residual TU, e.g., one flag indicates a horizontal transform type of the residual TU; and another flag indicates a vertical transform type of the residual TU. In other words, a first flag indicates which one of the plurality of horizontal transform types is used for the residual TU and a second flag indicates which one of the plurality of vertical transform types is used for the residual TU.

With reference to the first aspect or the first possible embodiment of the first aspect, in a second possible embodiment, obtaining the target transform mode of the residual TU comprises: parsing the bitstream to obtain a mode index for indicating the target transform mode of the residual TU; and obtaining the target transform mode of the residual TU based on the mode index.

The target transform mode can be indexed by the mode index, thus the decoding efficiency can be improved for only one index needed to be obtained.

With reference to the second possible embodiment of the first aspect, in a third possible embodiment, before parsing the bitstream to obtain a mode index for indicating the target transform mode of the residual TU, the method further comprises: determining candidate target transform modes of the residual TU based on a size of the CU. Additionally, the parsing the bitstream to obtain a mode index for indicating the target transform mode of the residual TU comprises: parsing, based on the candidate target transform modes of the residual TU, the bitstream to obtain a mode index for indicating the target transform mode of the residual TU.

Determining the candidate target transform modes can reduce the quantity of candidate target transform modes for the residual TU, so as to reduce the bits needed for transmitting the mode index.

With reference to the third possible embodiment of the first aspect, in a fourth possible embodiment, the determining candidate target transform modes of the residual TU based on a size of the CU comprises at least one of the following: when a width of the CU is in the range of [Th1×2, Th3] and a height of the CU is in the range of [Th1×2, Th3], the candidate target transform modes comprise transform mode Q0, transform mode Q1, transform mode Q2, and transform mode Q3; when a width of the CU is in the range of [Th1×4, Th3] and a height of the CU is in the range of [Th1, Th2], the candidate target transform modes comprise transform mode VQ0, transform mode VQ1 and transform mode VH2; when a width of the CU is in the range of [Th1×2, Th2] and a height of the CU is in the range of [Th1, Th2], the candidate target transform modes comprise transform mode VH0 and transform mode VH1; when a height of the CU is in the range of [Th1×4, Th3] and a width of the CU is in the range of [Th1, Th2], the candidate target transform modes comprise transform mode HQ0, transform mode HQ1 and transform mode HH2; when a height of the CU is in the range of [Th1×2, Th2] and a width of the CU is in the range of [Th1, Th2], the candidate target transform modes comprise transform mode HH0 and transform mode HH1; when a width of the CU is in the range of [Th1×2, Th2] and a height of the CU is in the range of [Th1×2, Th2], the candidate target transform modes comprise mode transform mode Q0, transform mode Q1, transform mode Q2 and transform mode Q3; when a width of the CU is in the range of [Th1×4, Th2] and a height of the CU is in the range of [Th1, Th2], the candidate target transform modes comprise transform mode VQ0, transform mode VQ1 and transform mode VH2; when a width of the CU is in the range of [Th1×2, Th2] and a height of the CU is in the range of [Th1, Th2], the candidate target transform modes comprise transform mode VH0 and transform mode VH1; when a height of the CU is in the range of [Th1×4, Th2] and a width of the CU is in the range of [Th1, Th2], the candidate target transform modes comprise transform mode HQ0, transform mode HQ1 and transform mode HH2; or when a height of the CU is in the range of [Th1×2, Th2] and a width of the CU is in the range of [Th1, Th2], the candidate target transform modes comprise transform mode HH0 and transform mode HH1; wherein Th1, Th2, and Th3 are pre-defined integer values.

With reference to the first aspect or the first possible embodiment of the first aspect, in a fifth possible embodiment, obtaining the target transform mode of the residual TU comprises: parsing the bitstream to obtain a group index for indicating which mode group of the target transform mode belongs to; parsing the bitstream to obtain a mode index for indicating the target transform mode in the mode group; and obtaining the target transform mode based on the group index and the mode index.

The transform modes are pre-grouped, thus can reduce the quantity of the transform modes suitable for one CU, and not only improve the decoding efficiency but also save transmitting resource.

With reference to the fifth possible embodiment of the first aspect, in a sixth possible embodiment, the target transform mode belongs to any mode group as follows:

A mode group comprises transform mode HH0, transform mode HH1, transform mode HH2, transform mode VH0, transform mode VH1, and transform mode VH2.

A mode group comprises transform mode Q0, transform mode Q1, transform mode Q2, transform mode Q3, transform mode HQ0, transform mode HQ1, transform mode VQ0, and transform mode VQ1.

A mode group comprises transform mode HH0, HH1, HH2, VH0, VH1, and VH2.

A mode group comprises transform mode Q0, transform mode Q1, transform mode Q2, transform mode Q3, transform mode HQ0, transform mode HQ1, transform mode VQ0, and transform mode VQ1.

A mode group comprises transform mode QH0, transform mode QH1, transform mode QH2, transform mode QH3, transform mode HQ0, transform mode HQ1, transform mode VQ0, and transform mode VQ1.

A mode group comprises transform mode QV0, transform mode QV1, transform mode QV2, transform mode QV3, transform mode HQ0, transform mode HQ1, transform mode VQ0, and transform mode VQ1.

A mode group comprises transform mode Q0, transform mode Q1, transform mode Q2, transform mode Q3, transform mode HQ0, transform mode HQ1, transform mode VQ0, transform mode VQ1, transform mode HH0, transform mode HH1, transform mode VH0, and transform mode VH1.

A mode group comprises transform mode Q0, transform mode Q1, transform mode Q2, transform mode Q3, transform mode HQ0, transform mode HQ1, transform mode VQ0, transform mode VQ1, transform mode HH0, transform mode HH1, transform mode HH2, transform mode VH0, transform mode VH1, and transform mode VH2.

A mode group comprises transform mode QH0, transform mode QH1, transform mode QH2, transform mode QH3, transform mode HQ0, transform mode HQ1, transform mode VQ0, transform mode VQ1, transform mode HH0, transform mode HH1, transform mode HH2, transform mode VH0, transform mode VH1, and transform mode VH2.

A mode group comprises transform mode HH0, transform mode HH1, transform mode VH0, and transform mode VH1.

A mode group comprises transform mode Q0, transform mode Q1, transform mode Q2, and transform mode Q3.

A mode group comprises transform mode HQ0, transform mode HQ1, transform mode VQ0, and transform mode VQ1.

With reference to the fifth possible embodiment of the first aspect, in a seventh possible embodiment, before parsing the bitstream to obtain a group index for indicating which mode group of the target transform mode belongs to, the method further comprising: determining at least one candidate mode groups of the residual TU based on a size of the CU. Additionally, the parsing the bitstream to obtain a group index for indicating which mode group of the target transform mode belongs to comprises: parsing, based on the at least one candidate mode groups of the residual TU, the bitstream to obtain a group index for indicating which mode group of the target transform mode belongs to.

Determining the candidate target transform modes can reduce the quantity of candidate target transform modes for the residual TU, so as to reduce the bits needed for transmitting the mode index.

With reference to the seventh possible embodiment of the first aspect, in an eighth possible embodiment, the determining at least one candidate mode groups of the residual TU based on a size of the CU comprises at least one of the following: when a width of the CU is in the range of [Th1×2, Th3] and a height of the CU is in the range of [Th1×2, Th3], the candidate mode groups comprise a mode group comprises transform mode Q0, transform mode Q1, transform mode Q2 and transform mode Q3; when a width of the CU is in the range of [Th1×4, Th3] and a height of the CU is in the range of [Th1, Th2], the candidate mode groups comprise a mode group comprises transform mode VQ0, transform mode VQ1 and transform mode VH2; when a width of the CU is in the range of [Th1×2, Th2] and a height of the CU is in the range of [Th1, Th2], the candidate mode groups comprise a mode group comprises transform mode VH0 and transform mode VH1; when a height of the CU is in the range of [Th1×4, Th3] and a width of the CU is in the range of [Th1, Th2], the candidate mode groups comprise a mode group comprises transform mode HQ0, transform mode HQ1 and transform mode HH2; when a height of the CU is in the range of [Th1×2, Th2] and a width of the CU is in the range of [Th1, Th2], the candidate mode groups comprise a mode group comprises transform mode HH0 and transform mode HH1; when a width of the CU is in the range of [Th1×2, Th2] and a height of the CU is in the range of

[Th1×2, Th2], the candidate mode groups comprise a mode group comprises mode transform mode Q0, transform mode Q1, transform mode Q2 and transform mode Q3; when a width of the CU is in the range of [Th1×4, Th2] and a height of the CU is in the range of [Th1, Th2], the candidate mode groups comprise a mode group comprises transform mode VQ0, transform mode VQ1 and transform mode VH2; when a width of the CU is in the range of [Th1×2, Th2] and a height of the CU is in the range of [Th1, Th2], the candidate mode groups comprise a mode group comprises transform mode VH0 and transform mode VH1; when a height of the CU is in the range of [Th1×4, Th2] and a width of the CU is in the range of [Th1, Th2], the candidate mode groups comprise a mode group comprises transform mode HQ0, transform mode HQ1 and transform mode HH2; or when a height of the CU is in the range of [Th1×2, Th2] and a width of the CU is in the range of [Th1, Th2], the candidate mode groups comprise a mode group comprises transform mode HH0 and transform mode HH1; wherein Th1, Th2, and Th3 are pre-defined integer values.

With reference to the fourth possible embodiment or the eighth possible embodiment of the first aspect, in a ninth possible embodiment, Th1 is 4, 8, or 16; Th2 is 32, 64, or 128; or Th3 is 64, 128, or 256.

With reference to the first aspect or any of the first to the ninth possible embodiment of the first aspect, in a tenth possible embodiment, before obtaining the target transform mode of the residual TU, the method further comprising: determining, based on the prediction information of the CU, whether to obtain the target transform mode of the residual TU.

With reference to the tenth possible embodiment of the first aspect, in a eleventh possible embodiment, the determining, based on the prediction information of the CU, whether to obtaining the target transform mode of the residual TU comprises at least one of the following: when a prediction mode of the CU is intra prediction mode, determining to obtain the target transform mode of the residual TU; when a prediction mode of the CU is inter prediction mode, determining to obtain the target transform mode of the residual TU; when a prediction method of the CU is a preset positive prediction method, determining to obtain the target transform mode of the residual TU; or when a prediction method of the CU is a preset negative prediction method, determining not to obtain the target transform mode of the residual TU.

With reference to the eleventh possible embodiment of the first aspect, in a twelfth possible embodiment, the preset positive prediction method comprises at least one of the following: a translation model based motion compensation method; a Merge prediction method; an advanced motion vector prediction method with ¼-pel motion vector difference precision; or a Merge prediction method with a merge index smaller than 2.

With reference to the eleventh or twelfth possible embodiment of the first aspect, in a thirteenth possible embodiment, the preset negative prediction method comprises at least one of the following: an affine model based motion compensation method; an affine merge prediction method; an affine inter prediction mode; an advanced motion vector prediction method with 1-pel or 4-pel motion vector difference precision; or a Merge prediction method with a merge index not smaller than 2.

With reference to the first aspect or any one of the first to thirteenth possible embodiments of the first aspect, in a fourteenth possible embodiment, before obtaining the target transform mode of the residual TU, the method further comprising: determining, based on a size of the CU, whether to obtain the target transform mode of the residual TU.

With reference to the fourteenth possible embodiment of the first aspect, in a fifteenth possible embodiment, the determining, based on a size of the CU, whether to obtain the target transform mode of the residual TU comprises at least one of the following: when a width or a height of the CU is greater than a preset CU threshold, determining not to obtain the target transform mode of the residual TU; when a width or a height of a TU of the CU is less than a preset minimum TU threshold, determining not to obtain the target transform mode of the residual TU; or when a width or a height of a TU of the CU is greater than a preset maximum TU threshold, determining not to obtain the target transform mode of the residual TU.

With reference to the fifteenth possible embodiment of the first aspect, in a sixteenth possible embodiment, the preset CU threshold is 32 luma pixels, 64 luma pixels, or 128 luma pixels; or the preset minimum TU threshold is 4 luma pixels, 8 luma pixels, or 16 luma pixels; or the preset maximum TU threshold is 32 luma pixels, 64 luma pixels, or 128 luma pixels.

According to a second aspect, an embodiment of the present disclosure provides a video decoder, comprising an entropy decoding unit configured to: parse a received bitstream to obtain prediction information of a coding unit (CU); obtain a target transform mode of a residual transform unit (TU) when the residual TU is the only residual TU of the CU and a size of the residual TU is less than a size of the CU, wherein the target transform mode specifies a TU partitioning mode of the CU, the position of the residual TU, and a transform type set of the residual TU; parse the received bitstream to obtain transform coefficients of the residual TU; and obtain a transform type of the residual TU from the transform type set. The video decoder further comprises: an inverse quantization processing unit configured to apply an inverse quantization to the transform coefficients of the residual TU to obtain dequantized coefficients; an inverse transform processing unit configured to apply, based on the transform type of the residual TU or based on the TU partitioning mode of the CU, the position of the residual TU and the transform type of the residual TU, an inverse transform to the dequantized coefficients to obtain a residual block of the residual TU; a prediction processing unit configured to obtain a prediction block of the CU based on the prediction information; a reconstruction unit configured to obtain a video block based on the residual block and the prediction block; and an output configured to output a video sequence, the video sequence including a video frame that includes the video block.

In a possible embodiment of the second aspect, N transform modes correspond to a transform type set, wherein the transform type set includes two or more transform types or the transform type set includes one or more transform types.

In a possible embodiment of the second aspect, wherein the transform type set of each transform mode includes four transform types, as follows.

Transform type 1: a horizontal transform of the residual TU is DST-7 and a vertical transform of the residual TU is DST-7, denoted as DST-7/DST-7.

Transform type 2: a horizontal transform of the residual TU is DST-7 and a vertical transform of the residual TU is DCT-8, denoted as DST-7/DCT-8.

Transform type 3: a horizontal transform of the residual TU is DCT-8 and a vertical transform of the residual TU is DST-7, denoted as DCT-8/DST-7.

Transform type 4: a horizontal transform of the residual TU is DCT-8 and a vertical transform of the residual TU is DCT-8, denoted as DCT-8/DCT-8.

In an alternative embodiment, DST-7 may be replaced with DST-4, and DCT-8 may be replaced with DCT-4 throughout the present disclosure. Accordingly, in a possible embodiment of the second aspect, the transform type set of each transform mode includes four transform types, as follows.

Transform type 1: a horizontal transform of the residual TU is DST-4 and a vertical transform of the residual TU is DST-4, denoted as DST-4/DST-4.

Transform type 2: a horizontal transform of the residual TU is DST-4 and a vertical transform of the residual TU is DCT-4, denoted as DST-4/DCT-4.

Transform type 3: a horizontal transform of the residual TU is DCT-4 and a vertical transform of the residual TU is DST-4, denoted as DCT-4/DST-4.

Transform type 4: a horizontal transform of the residual TU is DCT-4 and a vertical transform of the residual TU is DCT-4, denoted as DCT-4/DCT-4.

In a possible embodiment of the second aspect, N transform modes correspond to N transform type sets, wherein N>=1 and N is a positive integer, and wherein each transform type set includes two or more transform types or each transform type set includes one or more transform types.

In a possible embodiment of the second aspect, if the transform type set includes two or more transform types, the step of obtaining a transform type of the residual TU from the transform type set, comprises: selecting a transform type of the residual TU from the transform type set.

In a possible embodiment of the second aspect, the method further comprises: parsing indication information from the bitstream, wherein the indication information indicates a transform type of the residual TU. Additionally, the step of obtaining a transform type of the residual TU from the transform type set, comprises: determining a transform type of the residual TU from the transform type set based on the indication information parsed from the bitstream.

In a possible embodiment of the second aspect, if the transform type set of the residual TU includes a first transform type and a second transform type, the second transform type is dependent from the first transform type; or if the transform type set of the residual TU includes a first transform type and a second transform type, the second transform type is independent from the first transform type or the second transform type is a unified transform type.

In a possible embodiment of the second aspect, the second transform type is a unified transform type being a horizontal transform of the residual TU is DCT-2 and a vertical transform of the residual TU is DCT-2, denoted as DCT-2/DCT-2.

In a first possible embodiment of the second aspect, the size of the CU is denoted by W×H, wherein the target transform mode of the residual TU is one of the following modes.

Transform mode Q0, which specifies that the TU partitioning mode of the CU is to partition the CU into 4 TUs of size (W/2)×(H/2), the position of the residual TU is top-left, and the transform type is selected from a transform type set; the transform type set includes two transform types, wherein a first transform type is that a horizontal transform of the residual TU is DCT-8 and a vertical transform of the residual TU is DCT-8; a second transform type is that a horizontal transform of the residual TU is DST-7 and a vertical transform of the residual TU is DST-7.

Transform mode Q1, which specifies that the TU partitioning mode of the CU is to partition the CU into 4 TUs of size (W/2)×(H/2), the position of the residual TU is top-right, and the transform type is selected from a transform type set; the transform type set includes two transform types, wherein a first transform type is that a horizontal transform of the residual TU is DST-7 and a vertical transform of the residual TU is DCT-8; a second transform type is that a horizontal transform of the residual TU is DCT-8 and a vertical transform of the residual TU is DST-7.

Transform mode Q2, which specifies that the TU partitioning mode of the CU is to partition the CU into 4 TUs of size (W/2)×(H/2), the position of the residual TU is bottom-left, and the transform type is selected from a transform type set; the transform type set includes two transform types, wherein a first transform type is that a horizontal transform of the residual TU is DCT-8 and a vertical transform of the residual TU is DST-7; a second transform type is that a horizontal transform of the residual TU is DST-7 and a vertical transform of the residual TU is DCT-8.

Transform mode Q3, which specifies that the TU partitioning mode of the CU is to partition the CU into 4 TUs of size (W/2)×(H/2), the position of the residual TU is bottom-right, and the transform type is selected from a transform type set; the transform type set includes two transform types, wherein a first transform type is that a horizontal transform of the residual TU is DST-7 and a vertical transform of the residual TU is DST-7; a second transform type is that a horizontal transform of the residual TU is DCT-8 and a vertical transform of the residual TU is DCT-8.

Transform mode QH0, which specifies that the TU partitioning mode of the CU is to partition the CU into 3 TUs, wherein 2 TUs of the 3 TUs are in the top and have a size of (W/2)×(H/2), and the other TU of the 3 TUs is in the bottom and has a size of W×(H/2), the position of the residual TU is top-left, and the transform type is selected from a transform type set; the transform type set includes two transform types, wherein a first transform type is that a horizontal transform of the residual TU is DCT-8 and a vertical transform of the residual TU is DCT-8; a second transform type is that a horizontal transform of the residual TU is DST-7 and a vertical transform of the residual TU is DST-7.

Transform mode QH1, which specifies that the TU partitioning mode of the CU is to partition the CU into 3 TUs, wherein 2 TUs of the 3 TUs are in the top and have a size of (W/2)×(H/2), and the other TU of the 3 TUs is in the bottom and has a size of W×(H/2), the position of the residual TU is top-right, and the transform type is selected from a transform type set; the transform type set includes two transform types, wherein a first transform type is that a horizontal transform of the residual TU is DST-7 and a vertical transform of the residual TU is DCT-8; a second transform type is that a horizontal transform of the residual TU is DCT-8 and a vertical transform of the residual TU is DST-7.

Transform mode QH2, which specifies that the TU partitioning mode of the CU is to partition the CU into 3 TUs, wherein 2 TUs of the 3 TUs are in the bottom and have a size of (W/2)×(H/2), and the other TU of the 3 TUs is in the top and has a size of W×(H/2), the position of the residual TU is bottom-left, and the transform type is selected from a transform type set; the transform type set includes two transform types, wherein a first transform type is that a horizontal transform of the residual TU is DCT-8 and a vertical transform of the residual TU is DST-7; a second transform type is that a horizontal transform of the residual TU is DST-7 and a vertical transform of the residual TU is DCT-8.

Transform mode QH3, which specifies that the TU partitioning mode of the CU is to partition the CU into 3 TUs, wherein 2 TUs of the 3 TUs are in the bottom and have a size of (W/2)×(H/2), and the other TU of the 3 TUs is in the top and has a size of W×(H/2), the position of the residual TU is bottom-right, and the transform type is selected from a transform type set; the transform type set includes two transform types, wherein a first transform type is that a horizontal transform of the residual TU is DST-7 and a vertical transform of the residual TU is DST-7; a second transform type is that a horizontal transform of the residual TU is DCT-8 and a vertical transform of the residual TU is DCT-8.

Transform mode QV0, which specifies that the TU partitioning mode of the CU is to partition the CU into 3 TUs, wherein 2 TUs of the 3 TUs are in the left and have a size of (W/2)×(H/2), and the other TU of the 3 TUs is in the right and has a size of (W/2)×H, the position of the residual TU is top-left, and the transform type is selected from a transform type set; the transform type set includes two transform types, wherein a first transform type is that a horizontal transform of the residual TU is DCT-8 and a vertical transform of the residual TU is DCT-8; a second transform type is that a horizontal transform of the residual TU is DST-7 and a vertical transform of the residual TU is DST-7.

Transform mode QV1, which specifies that the TU partitioning mode of the CU is to partition the CU into 3 TUs, wherein 2 TUs of the 3 TUs are in the right and have a size of (W/2)×(H/2), and the other TU of the 3 TUs is in the left and has a size of (W/2)×H, the position of the residual TU is top-right, and the transform type is selected from a transform type set; the transform type set includes two transform types, wherein a first transform type is that a horizontal transform of the residual TU is DST-7 and a vertical transform of the residual TU is DCT-8; a second transform type is that a horizontal transform of the residual TU is DCT-8 and a vertical transform of the residual TU is DST-7.

Transform mode QV2, which specifies that the TU partitioning mode of the CU is to partition the CU into 3 TUs, wherein 2 TUs of the 3 TUs are in the left and have a size of (W/2)×(H/2), and the other TU of the 3 TUs is in the right and has a size of (W/2)×H, the position of the residual TU is bottom-left, and the transform type is selected from a transform type set; the transform type set includes two transform types, wherein a first transform type is that a horizontal transform of the residual TU is DCT-8 and a vertical transform of the residual TU is DST-7; a second transform type is that a horizontal transform of the residual TU is DST-7 and a vertical transform of the residual TU is DCT-8.

Transform mode QV3, which specifies that the TU partitioning mode of the CU is to partition the CU into 3 TUs, wherein 2 TUs of the 3 TUs are in the right and have a size of (W/2)×(H/2), and the other TU of the 3 TUs is in the left and has a size of (W/2)×H, the position of the residual TU is bottom-right, and the transform type is selected from a transform type set; the transform type set includes two transform types, wherein a first transform type is that a horizontal transform of the residual TU is DST-7 and a vertical transform of the residual TU is DST-7; a second transform type is that a horizontal transform of the residual TU is DCT-8 and a vertical transform of the residual TU is DCT-8.

Transform mode HQ0, which specifies that the TU partitioning mode of the CU is to partition the CU into 2 TUs, wherein a size of a top TU is smaller than a size of a bottom TU, the position of the residual TU is top, and the transform type is selected from a transform type set; the transform type set includes two transform types, wherein a first transform type is that a horizontal transform of the residual TU is DST-7 or DCT-2, and a vertical transform of the residual TU is DCT-8; a second transform type is that a horizontal transform of the residual TU is DCT-8 or DCT-2, and a vertical transform of the residual TU is DST-7.

Transform mode HQ1, which specifies that the TU partitioning mode of the CU is to partition the CU into 2 TUs, wherein a size of a bottom TU is smaller than a size of a top TU, the position of the residual TU is bottom, and the transform type is selected from a transform type set; the transform type set includes two transform types, wherein a first transform type is that a horizontal transform of the residual TU is DST-7 or DCT-2, and a vertical transform of the residual TU is DST-7; a second transform type is that a horizontal transform of the residual TU is DCT-8 or DCT-2 and a vertical transform of the residual TU is DCT-8.

Transform mode VQ0, which specifies that the TU partitioning mode of the CU is to partition the CU into 2 TUs, wherein a size of a left TU is smaller than a size of a right TU, the position of the residual TU is left, and the transform type is selected from a transform type set; the transform type set includes two transform types, wherein a first transform type is that a horizontal transform of the residual TU is DCT-8 and a vertical transform of the residual TU is DST-7 or DCT-2; a second transform type is that a horizontal transform of the residual TU is DST-7, and a vertical transform of the residual TU is DCT-8 or DCT-2.

Transform mode VQ1, which specifies that the TU partitioning mode of the CU is to partition the CU into 2 TUs, wherein a size of a right TU is smaller than a size of a left TU, the position of the residual TU is right, and the transform type is selected from a transform type set; the transform type set includes two transform types, wherein a first transform type is that a horizontal transform of the residual TU is DST-7 and a vertical transform of the residual TU is DST-7 or DCT-2; a second transform type is that a horizontal transform of the residual TU is DCT-8 and a vertical transform of the residual TU is DCT-8 or DCT-2.

Transform mode HH0, which specifies that the TU partitioning mode of the CU is to partition the CU into 2 TUs, wherein a size of a top TU is equal to a size of a bottom TU, the position of the residual TU is top, and the transform type is selected from a transform type set; the transform type set includes two transform types, wherein a first transform type is that a horizontal transform of the residual TU is DST-7 or DCT-2, and a vertical transform of the residual TU is DCT-8; a second transform type is that a horizontal transform of the residual TU is DCT-8 or DCT-2 and a vertical transform of the residual TU is DST-7.

Transform mode HH1, which specifies that the TU partitioning mode of the CU is to partition the CU into 2 TUs, wherein a size of a top TU is equal to a size of a bottom TU, the position of the residual TU is bottom, and the transform type is selected from a transform type set; the transform type set includes two transform types, wherein a first transform type is that a horizontal transform of the residual TU is DST-7 or DCT-2, and a vertical transform of the residual TU is DST-7; a second transform type is that a horizontal transform of the residual TU is DCT-8 or DCT-2 and a vertical transform of the residual TU is DCT-8.

Transform mode HH2, which specifies that the TU partitioning mode of the CU is to partition the CU into 3 TUs, wherein a size of a top TU is equal to a size of a bottom TU, and the size of the top TU is less than a size of a center TU, the position of the residual TU is center, and the transform type is selected from a transform type set; the transform type set includes two transform types, wherein a first transform type is that a horizontal transform of the residual TU is DST-7 and a vertical transform of the residual TU is DCT-2 a second transform type is that a horizontal transform of the residual TU is DCT-8 and a vertical transform of the residual TU is DCT-2; or wherein a first transform type is that a horizontal transform of the residual TU is DST-7 and a vertical transform of the residual TU is DST-1; a second transform type is that a horizontal transform of the residual TU is DCT-8 and a vertical transform of the residual TU is DST-1.

Transform mode VH0, which specifies that the TU partitioning mode of the CU is to partition the CU into 2 TUs, wherein a size of a left TU is equal to a size of a right TU, the position of the residual TU is left, and the transform type is selected from a transform type set; the transform type set includes two transform types, wherein a first transform type is that a horizontal transform of the residual TU is DCT-8 and a vertical transform of the residual TU is DST-7 or DCT-2; a second transform type is that a horizontal transform of the residual TU is DST-7 and a vertical transform of the residual TU is DCT-8 or DCT-2.

Transform mode VH1, which specifies that the TU partitioning mode of the CU is to partition the CU into 2 TUs, wherein a size of a left TU is equal to a size of a right TU, the position of the residual TU is right, and the transform type is selected from a transform type set; the transform type set includes two transform types, wherein a first transform type is that a horizontal transform of the residual TU is DST-7 and a vertical transform of the residual TU is DST-7 or DCT-2; a second transform type is that a horizontal transform of the residual TU is DCT-8 and a vertical transform of the residual TU is DCT-8 or DCT-2.

Transform mode VH2 transform mode HH2, which specifies that the TU partitioning mode of the CU is to partition the CU into 3 TUs, wherein a size of a left TU is equal to a size of a right TU and the size of the left TU is less than a size of a center TU, the position of the residual TU is center, and the transform type is selected from a transform type set; the transform type set includes two transform types, wherein a first transform type is that a horizontal transform of the residual TU is DCT-2 and a vertical transform of the residual TU is DST-7; a second transform type is that a horizontal transform of the residual TU is DCT-2 and a vertical transform of the residual TU is DCT-8; or wherein first transform type is that a horizontal transform of the residual TU is DST-1 and a vertical transform of the residual TU is DST-7; a second transform type is that a horizontal transform of the residual TU is DST-1 and a vertical transform of the residual TU is DCT-8.

In an alternative embodiment, DST-7 may be replaced with DST-4, and DCT-8 may be replaced with DCT-4 throughout the present disclosure. Accordingly, in a first possible embodiment of the second aspect, the size of the CU is denoted by W×H, wherein the target transform mode of the residual TU is one of the following modes.

Transform mode Q0, which specifies that the TU partitioning mode of the CU is to partition the CU into 4 TUs of size (W/2)×(H/2), the position of the residual TU is top-left, and the transform type is selected from a transform type set; the transform type set includes two transform types, wherein a first transform type is that a horizontal transform of the residual TU is DCT-4 and a vertical transform of the residual TU is DCT-4; a second transform type is that a horizontal transform of the residual TU is DST-4 and a vertical transform of the residual TU is DST-4.

Transform mode Q1, which specifies that the TU partitioning mode of the CU is to partition the CU into 4 TUs of size (W/2)×(H/2), the position of the residual TU is top-right, and the transform type is selected from a transform type set; the transform type set includes two transform types, wherein a first transform type is that a horizontal transform of the residual TU is DST-4 and a vertical transform of the residual TU is DCT-4; a second transform type is that a horizontal transform of the residual TU is DCT-4 and a vertical transform of the residual TU is DST-4.

Transform mode Q2, which specifies that the TU partitioning mode of the CU is to partition the CU into 4 TUs of size (W/2)×(H/2), the position of the residual TU is bottom-left, and the transform type is selected from a transform type set; the transform type set includes two transform types, wherein a first transform type is that a horizontal transform of the residual TU is DCT-4 and a vertical transform of the residual TU is DST-4; a second transform type is that a horizontal transform of the residual TU is DST-4 and a vertical transform of the residual TU is DCT-4.

Transform mode Q3, which specifies that the TU partitioning mode of the CU is to partition the CU into 4 TUs of size (W/2)×(H/2), the position of the residual TU is bottom-right, and the transform type is selected from a transform type set; the transform type set includes two transform types, wherein a first transform type is that a horizontal transform of the residual TU is DST-4 and a vertical transform of the residual TU is DST-4; a second transform type is that a horizontal transform of the residual TU is DCT-4 and a vertical transform of the residual TU is DCT-4.

Transform mode QH0, which specifies that the TU partitioning mode of the CU is to partition the CU into 3 TUs, wherein 2 TUs of the 3 TUs are in the top and have a size of (W/2)×(H/2), and the other TU of the 3 TUs is in the bottom and has a size of W×(H/2), the position of the residual TU is top-left, and the transform type is selected from a transform type set; the transform type set includes two transform types, wherein a first transform type is that a horizontal transform of the residual TU is DCT-4 and a vertical transform of the residual TU is DCT-4; a second transform type is that a horizontal transform of the residual TU is DST-4 and a vertical transform of the residual TU is DST-4.

Transform mode QH1, which specifies that the TU partitioning mode of the CU is to partition the CU into 3 TUs, wherein 2 TUs of the 3 TUs are in the top and have a size of (W/2)×(H/2), and the other TU of the 3 TUs is in the bottom and has a size of W×(H/2), the position of the residual TU is top-right, and the transform type is selected from a transform type set; the transform type set includes two transform types, wherein a first transform type is that a horizontal transform of the residual TU is DST-4 and a vertical transform of the residual TU is DCT-4; a second transform type is that a horizontal transform of the residual TU is DCT-4 and a vertical transform of the residual TU is DST-4.

Transform mode QH2, which specifies that the TU partitioning mode of the CU is to partition the CU into 3 TUs, wherein 2 TUs of the 3 TUs are in the bottom and have a size of (W/2)×(H/2), and the other TU of the 3 TUs is in the top and has a size of W×(H/2), the position of the residual TU is bottom-left, and the transform type is selected from a transform type set; the transform type set includes two transform types, wherein a first transform type is that a horizontal transform of the residual TU is DCT-4 and a vertical transform of the residual TU is DST-4; a second transform type is that a horizontal transform of the residual TU is DST-4 and a vertical transform of the residual TU is DCT-4.

Transform mode QH3, which specifies that the TU partitioning mode of the CU is to partition the CU into 3 TUs, wherein 2 TUs of the 3 TUs are in the bottom and have a size of (W/2)×(H/2), and the other TU of the 3 TUs is in the top and has a size of W×(H/2), the position of the residual TU is bottom-right, and the transform type is selected from a transform type set; the transform type set includes two transform types, wherein a first transform type is that a horizontal transform of the residual TU is DST-4 and a vertical transform of the residual TU is DST-4; a second transform type is that a horizontal transform of the residual TU is DCT-4 and a vertical transform of the residual TU is DCT-4.

Transform mode QV0, which specifies that the TU partitioning mode of the CU is to partition the CU into 3 TUs, wherein 2 TUs of the 3 TUs are in the left and have a size of (W/2)×(H/2), and the other TU of the 3 TUs is in the right and has a size of (W/2)×H, the position of the residual TU is top-left, and the transform type is selected from a transform type set; the transform type set includes two transform types, wherein a first transform type is that a horizontal transform of the residual TU is DCT-4 and a vertical transform of the residual TU is DCT-4; a second transform type is that a horizontal transform of the residual TU is DST-4 and a vertical transform of the residual TU is DST-4.

Transform mode QV1, which specifies that the TU partitioning mode of the CU is to partition the CU into 3 TUs, wherein 2 TUs of the 3 TUs are in the right and have a size of (W/2)×(H/2), and the other TU of the 3 TUs is in the left and has a size of (W/2)×H, the position of the residual TU is top-right, and the transform type is selected from a transform type set; the transform type set includes two transform types, wherein a first transform type is that a horizontal transform of the residual TU is DST-4 and a vertical transform of the residual TU is DCT-4; a second transform type is that a horizontal transform of the residual TU is DCT-4 and a vertical transform of the residual TU is DST-4.

Transform mode QV2, which specifies that the TU partitioning mode of the CU is to partition the CU into 3 TUs, wherein 2 TUs of the 3 TUs are in the left and have a size of (W/2)×(H/2), and the other TU of the 3 TUs is in the right and has a size of (W/2)×H, the position of the residual TU is bottom-left, and the transform type is selected from a transform type set; the transform type set includes two transform types, wherein a first transform type is that a horizontal transform of the residual TU is DCT-4 and a vertical transform of the residual TU is DST-4; a second transform type is that a horizontal transform of the residual TU is DST-4 and a vertical transform of the residual TU is DCT-4.

Transform mode QV3, which specifies that the TU partitioning mode of the CU is to partition the CU into 3 TUs, wherein 2 TUs of the 3 TUs are in the right and have a size of (W/2)×(H/2), and the other TU of the 3 TUs is in the left and has a size of (W/2)×H, the position of the residual TU is bottom-right, and the transform type is selected from a transform type set; the transform type set includes two transform types, wherein a first transform type is that a horizontal transform of the residual TU is DST-4 and a vertical transform of the residual TU is DST-4; a second transform type is that a horizontal transform of the residual TU is DCT-4 and a vertical transform of the residual TU is DCT-4.

Transform mode HQ0, which specifies that the TU partitioning mode of the CU is to partition the CU into 2 TUs, wherein a size of a top TU is smaller than a size of a bottom TU, the position of the residual TU is top, and the transform type is selected from a transform type set; the transform type set includes two transform types, wherein a first transform type is that a horizontal transform of the residual TU is DST-4 or DCT-2, and a vertical transform of the residual TU is DCT-4; a second transform type is that a horizontal transform of the residual TU is DCT-4 or DCT-2, and a vertical transform of the residual TU is DST-4.

Transform mode HQ1, which specifies that the TU partitioning mode of the CU is to partition the CU into 2 TUs, wherein a size of a bottom TU is smaller than a size of a top TU, the position of the residual TU is bottom, and the transform type is selected from a transform type set; the transform type set includes two transform types, wherein a first transform type is that a horizontal transform of the residual TU is DST-4 or DCT-2, and a vertical transform of the residual TU is DST-4; a second transform type is that a horizontal transform of the residual TU is DCT-4 or DCT-2 and a vertical transform of the residual TU is DCT-4.

Transform mode VQ0, which specifies that the TU partitioning mode of the CU is to partition the CU into 2 TUs, wherein a size of a left TU is smaller than a size of a right TU, the position of the residual TU is left, and the transform type is selected from a transform type set; the transform type set includes two transform types, wherein a first transform type is that a horizontal transform of the residual TU is DCT-4 and a vertical transform of the residual TU is DST-4 or DCT-2; a second transform type is that a horizontal transform of the residual TU is DST-4, and a vertical transform of the residual TU is DCT-4 or DCT-2;

Transform mode VQ1, which specifies that the TU partitioning mode of the CU is to partition the CU into 2 TUs, wherein a size of a right TU is smaller than a size of a left TU, the position of the residual TU is right, and the transform type is selected from a transform type set; the transform type set includes two transform types, wherein a first transform type is that a horizontal transform of the residual TU is DST-4 and a vertical transform of the residual TU is DST-4 or DCT-2; a second transform type is that a horizontal transform of the residual TU is DCT-4 and a vertical transform of the residual TU is DCT-4 or DCT-2.

Transform mode HH0, which specifies that the TU partitioning mode of the CU is to partition the CU into 2 TUs, wherein a size of a top TU is equal to a size of a bottom TU, the position of the residual TU is top, and the transform type is selected from a transform type set; the transform type set includes two transform types, wherein a first transform type is that a horizontal transform of the residual TU is DST-4 or DCT-2, and a vertical transform of the residual TU is DCT-4; a second transform type is that a horizontal transform of the residual TU is DCT-4 or DCT-2 and a vertical transform of the residual TU is DST-4.

Transform mode HH1, which specifies that the TU partitioning mode of the CU is to partition the CU into 2 TUs, wherein a size of a top TU is equal to a size of a bottom TU, the position of the residual TU is bottom, and the transform type is selected from a transform type set; the transform type set includes two transform types, wherein a first transform type is that a horizontal transform of the residual TU is DST-4 or DCT-2, and a vertical transform of the residual TU is DST-4; a second transform type is that a horizontal transform of the residual TU is DCT-4 or DCT-2 and a vertical transform of the residual TU is DCT-4.

Transform mode HH2, which specifies that the TU partitioning mode of the CU is to partition the CU into 3 TUs, wherein a size of a top TU is equal to a size of a bottom TU, and the size of the top TU is less than a size of a center TU, the position of the residual TU is center, and the transform type is selected from a transform type set; the transform type set includes two transform types; wherein a first transform type is that a horizontal transform of the residual TU is DST-4 and a vertical transform of the residual TU is DCT-2 a second transform type is that a horizontal transform of the residual TU is DCT-4 and a vertical transform of the residual TU is DCT-2; or wherein a first transform type is that a horizontal transform of the residual TU is DST-4 and a vertical transform of the residual TU is DST-1; a second transform type is that a horizontal transform of the residual TU is DCT-4 and a vertical transform of the residual TU is DST-1.

Transform mode VH0, which specifies that the TU partitioning mode of the CU is to partition the CU into 2 TUs, wherein a size of a left TU is equal to a size of a right TU, the position of the residual TU is left, and the transform type is selected from a transform type set; the transform type set includes two transform types, wherein a first transform type is that a horizontal transform of the residual TU is DCT-4 and a vertical transform of the residual TU is DST-4 or DCT-2; a second transform type is that a horizontal transform of the residual TU is DST-4 and a vertical transform of the residual TU is DCT-4 or DCT-2.

Transform mode VH1, which specifies that the TU partitioning mode of the CU is to partition the CU into 2 TUs, wherein a size of a left TU is equal to a size of a right TU, the position of the residual TU is right, and the transform type is selected from a transform type set; the transform type set includes two transform types, wherein a first transform type is that a horizontal transform of the residual TU is DST-4 and a vertical transform of the residual TU is DST-4 or DCT-2; a second transform type is that a horizontal transform of the residual TU is DCT-4 and a vertical transform of the residual TU is DCT-4 or DCT-2.

Transform mode VH2 transform mode HH2, which specifies that the TU partitioning mode of the CU is to partition the CU into 3 TUs, wherein a size of a left TU is equal to a size of a right TU and the size of the left TU is less than a size of a center TU, the position of the residual TU is center, and the transform type is selected from a transform type set; the transform type set includes two transform types, wherein a first transform type is that a horizontal transform of the residual TU is DCT-2 and a vertical transform of the residual TU is DST-4; a second transform type is that a horizontal transform of the residual TU is DCT-2 and a vertical transform of the residual TU is DCT-4; or wherein first transform type is that a horizontal transform of the residual TU is DST-1 and a vertical transform of the residual TU is DST-4; a second transform type is that a horizontal transform of the residual TU is DST-1 and a vertical transform of the residual TU is DCT-4.

For another example, the transform type set of each transform mode may contain four transform types as follows.

Type 1: a horizontal transform of the residual TU is DST-7 and a vertical transform of the residual TU is DST-7, denoted as DST-7/DST-7.

Type 2: a horizontal transform of the residual TU is DST-7 and a vertical transform of the residual TU is DCT-8, denoted as DST-7/DCT-8.

Type 3: a horizontal transform of the residual TU is DCT-8 and a vertical transform of the residual TU is DST-7, denoted as DCT-8/DST-7.

Type 4: a horizontal transform of the residual TU is DCT-8 and a vertical transform of the residual TU is DCT-8, denoted as DCT-8/DCT-8.

In an alternative embodiment, DST-7 may be replaced with DST-4, and DCT-8 may be replaced with DCT-4 throughout the present disclosure. Accordingly, for another example, the transform type set of each transform mode may contain four transform types as follows.

Type 1: a horizontal transform of the residual TU is DST-4 and a vertical transform of the residual TU is DST-4, denoted as DST-4/DST-4.

Type 2: a horizontal transform of the residual TU is DST-4 and a vertical transform of the residual TU is DCT-4, denoted as DST-4/DCT-4.

Type 3: a horizontal transform of the residual TU is DCT-4 and a vertical transform of the residual TU is DST-4, denoted as DCT-4/DST-4.

Type 4: a horizontal transform of the residual TU is DCT-4 and a vertical transform of the residual TU is DCT-4, denoted as DCT-4/DCT-4.

With reference to the first aspect or the first possible embodiment of the second aspect, in a second possible embodiment, the entropy decoding unit is further configured to: parse the bitstream to obtain a mode index for indicating the target transform mode of the residual TU; and obtain the target transform mode of the residual TU based on the mode index.

With reference to the second possible embodiment of the second aspect, in a third possible embodiment, the entropy decoding unit, is further configured to: determine candidate target transform modes of the residual TU based on a size of the CU; and parse, based on the candidate target transform modes of the residual TU, the bitstream to obtain a mode index for indicating the target transform mode of the residual TU.

With reference to the third possible embodiment of the second aspect, in a fourth possible embodiment, the entropy decoding unit is further configured to determine candidate target transform modes of the residual TU according to at least one of the following: when a width of the CU is in the range of [Th1×2, Th3] and a height of the CU is in the range of [Th1×2, Th3], the candidate target transform modes comprise transform mode Q0, transform mode Q1, transform mode Q2 and transform mode Q3; when a width of the CU is in the range of [Th1×4, Th3] and a height of the CU is in the range of [Th1, Th2], the candidate target transform modes comprise transform mode VQ0, transform mode VQ1 and transform mode VH2; when a width of the CU is in the range of [Th1×2, Th2] and a height of the CU is in the range of [Th1, Th2], the candidate target transform modes comprise transform mode VH0 and transform mode VH1; when a height of the CU is in the range of [Th1×4, Th3] and a width of the CU is in the range of [Th1, Th2], the candidate target transform modes comprise transform mode HQ0, transform mode HQ1 and transform mode HH2; when a height of the CU is in the range of [Th1×2, Th2] and a width of the CU is in the range of [Th1, Th2], the candidate target transform modes comprise transform mode HH0 and transform mode HH1; when a width of the CU is in the range of [Th1×2, Th2] and a height of the CU is in the range of [Th1×2, Th2], the candidate target transform modes comprise mode transform mode Q0, transform mode Q1, transform mode Q2 and transform mode Q3; when a width of the CU is in the range of [Th1×4, Th2] and a height of the CU is in the range of [Th1, Th2], the candidate target transform modes comprise transform mode VQ0, transform mode VQ1 and transform mode VH2; when a width of the CU is in the range of [Th1×2, Th2] and a height of the CU is in the range of [Th1, Th2], the candidate target transform modes comprise transform mode VH0 and transform mode VH1; when a height of the CU is in the range of [Th1×4, Th2] and a width of the CU is in the range of [Th1, Th2], the candidate target transform modes comprise transform mode HQ0, transform mode HQ1 and transform mode HH2; or when a height of the CU is in the range of [Th1×2, Th2] and a width of the CU is in the range of [Th1, Th2], the candidate target transform modes comprise transform mode HH0 and transform mode HH1; wherein Th1, Th2, and Th3 are pre-defined integer values.

With reference to the second aspect or the first possible embodiment of the second aspect, in a fifth possible embodiment, the entropy decoding unit is further configured to: parse the bitstream to obtain a group index for indicating which mode group of the target transform mode belongs to; parse the bitstream to obtain a mode index for indicating the target transform mode in the mode group; and obtain the target transform mode based on the group index and the mode index.

With reference to the fifth possible embodiment of the second aspect, in a sixth possible embodiment, the target transform mode belongs to any mode group as follows.

A mode group comprises transform mode HH0, transform mode HH1, transform mode HH2, transform mode VH0, transform mode VH1, and transform mode VH2.

A mode group comprises transform mode Q0, transform mode Q1, transform mode Q2, transform mode Q3, transform mode HQ0, transform mode HQ1, transform mode VQ0, and transform mode VQ1.

A mode group comprises transform mode HH0, HH1, HH2, VH0, VH1, and VH2.

A mode group comprises transform mode Q0, transform mode Q1, transform mode Q2, transform mode Q3, transform mode HQ0, transform mode HQ1, transform mode VQ0, and transform mode VQ1.

A mode group comprises transform mode QH0, transform mode QH1, transform mode QH2, transform mode QH3, transform mode HQ0, transform mode HQ1, transform mode VQ0, and transform mode VQ1.

A mode group comprises transform mode QV0, transform mode QV1, transform mode QV2, transform mode QV3, transform mode HQ0, transform mode HQ1, transform mode VQ0, and transform mode VQ1.

A mode group comprises transform mode Q0, transform mode Q1, transform mode Q2, transform mode Q3, transform mode HQ0, transform mode HQ1, transform mode VQ0, transform mode VQ1, transform mode HH0, transform mode HH1, transform mode VH0, and transform mode VH1.

A mode group comprises transform mode Q0, transform mode Q1, transform mode Q2, transform mode Q3, transform mode HQ0, transform mode HQ1, transform mode VQ0, transform mode VQ1, transform mode HH0, transform mode HH1, transform mode HH2, transform mode VH0, transform mode VH1, and transform mode VH2.

A mode group comprises transform mode QH0, transform mode QH1, transform mode QH2, transform mode QH3, transform mode HQ0, transform mode HQ1, transform mode VQ0, transform mode VQ1, transform mode HH0, transform mode HH1, transform mode HH2, transform mode VH0, transform mode VH, 1 and transform mode VH2.

A mode group comprises transform mode HH0, transform mode HH1, transform mode VH0, and transform mode VH1.

A mode group comprises transform mode Q0, transform mode Q1, transform mode Q2, and transform mode Q3.

A mode group comprises transform mode HQ0, transform mode HQ1, transform mode VQ0, and transform mode VQ1.

With reference to the fifth possible embodiment of the second aspect, in a seventh possible embodiment, the entropy decoding unit is further configured to: determine at least one candidate mode groups of the residual TU based on a size of the CU; and parse, based on the at least one candidate mode groups of the residual TU, the bitstream to obtain a group index for indicating which mode group of the target transform mode belongs to.

With reference to the seventh possible embodiment of the second aspect, in an eighth possible embodiment, the entropy decoding unit is further configured to determine at least one candidate mode groups according to at least one of the following: when a width of the CU is in the range of [Th1×2, Th3] and a height of the CU is in the range of [Th1×2, Th3], the candidate mode groups comprise a mode group comprises transform mode Q0, transform mode Q1, transform mode Q2, and transform mode Q3; when a width of the CU is in the range of [Th1×4, Th3] and a height of the CU is in the range of [Th1, Th2], the candidate mode groups comprise a mode group comprises transform mode VQ0, transform mode VQ1, and transform mode VH2; when a width of the CU is in the range of [Th1×2, Th2] and a height of the CU is in the range of [Th1, Th2], the candidate mode groups comprise a mode group comprises transform mode VH0 and transform mode VH1; when a height of the CU is in the range of [Th1×4, Th3] and a width of the CU is in the range of [Th1, Th2], the candidate mode groups comprise a mode group comprises transform mode HQ0, transform mode HQ1, and transform mode HH2; when a height of the CU is in the range of [Th1×2, Th2] and a width of the CU is in the range of [Th1, Th2], the candidate mode groups comprise a mode group comprises transform mode HH0 and transform mode HH1; when a width of the CU is in the range of [Th1×2, Th2] and a height of the CU is in the range of [Th1×2, Th2], the candidate mode groups comprise a mode group comprises mode transform mode Q0, transform mode Q1, transform mode Q2, and transform mode Q3; when a width of the CU is in the range of [Th1×4, Th2] and a height of the CU is in the range of [Th1, Th2], the candidate mode groups comprise a mode group comprises transform mode VQ0, transform mode VQ1, and transform mode VH2; when a width of the CU is in the range of [Th1×2, Th2] and a height of the CU is in the range of [Th1, Th2], the candidate mode groups comprise a mode group comprises transform mode VH0 and transform mode VH1; when a height of the CU is in the range of [Th1×4, Th2] and a width of the CU is in the range of [Th1, Th2], the candidate mode groups comprise a mode group comprises transform mode HQ0, transform mode HQ1, and transform mode HH2; or when a height of the CU is in the range of [Th1×2, Th2] and a width of the CU is in the range of [Th1, Th2], the candidate mode groups comprise a mode group comprises transform mode HH0 and transform mode HH1; wherein Th1, Th2, and Th3 are pre-defined integer values.

With reference to the fifth or eighth possible embodiment of the second aspect, in a ninth possible embodiment, Th1 is 4, 8, or 16; Th2 is 32, 64, or 128; or Th3 is 64, 128, or 256.

With reference to the second aspect or any one of the first to ninth possible embodiments of the second aspect, in a tenth possible embodiment, the entropy decoding unit, is further configured to determine, based on the prediction information of the CU, whether to obtain the target transform mode of the residual TU.

With reference to the tenth possible embodiment of the second aspect, in a eleventh possible embodiment, the entropy decoding unit, is further configured to determine whether to obtaining the target transform mode of the residual TU according to at least one of the following: when a prediction mode of the CU is intra prediction mode, determine to obtain the target transform mode of the residual TU; when a prediction mode of the CU is inter prediction mode, determine to obtain the target transform mode of the residual TU; when a prediction method of the CU is a preset positive prediction method, determine to obtain the target transform mode of the residual TU; or when a prediction method of the CU is a preset negative prediction method, determine not to obtain the target transform mode of the residual TU.

With reference to the eleventh possible embodiment of the second aspect, in a twelfth possible embodiment, the preset positive prediction method comprises at least one of the following: a translation model based motion compensation method; a Merge prediction method; an advanced motion vector prediction method with ¼-pel motion vector difference precision; or a Merge prediction method with a merge index smaller than 2.

With reference to the eleventh or twelfth possible embodiment of the second aspect, in a thirteenth possible embodiment, the preset negative prediction method comprises at least one of the following: an affine model based motion compensation method; an affine merge prediction method; an affine inter prediction mode; an advanced motion vector prediction method with 1-pel or 4-pel motion vector difference precision; or a Merge prediction method with a merge index not smaller than 2.

With reference to the second aspect or any one of the first to thirteenth possible embodiment of the second aspect, in a fourteenth possible embodiment, the entropy decoding unit, is further configured to determine, based on a size of the CU, whether to obtain the target transform mode of the residual TU.

With reference to the fourteenth possible embodiment of the second aspect, in a fifteenth possible embodiment, the entropy decoding unit, is further configured to determine whether to obtain the target transform mode of the residual TU according to at least one of the following: when a width or a height of the CU is greater than a preset CU threshold, determining not to obtain the target transform mode of the residual TU; when a width or a height of a TU of the CU is less than a preset minimum TU threshold, determining not to obtain the target transform mode of the residual TU; or when a width or a height of a TU of the CU is greater than a preset maximum TU threshold, determining not to obtain the target transform mode of the residual TU.

With reference to the fifteenth possible embodiment of the second aspect, in a sixteenth possible embodiment, the preset CU threshold is 32 luma pixels, 64 luma pixels, or 128 luma pixels; or the preset minimum TU threshold is 4 luma pixels, 8 luma pixels, or 16 luma pixels; or the preset maximum TU threshold is 32 luma pixels, 64 luma pixels, or 128 luma pixels.

According to a third aspect, an embodiment of the present disclosure provides decoder comprising processing circuitry for carrying out the method according to any one of the first aspect and the first to sixteenth impossible embodiments of the first aspect.

According to a fourth aspect, an embodiment of the present disclosure provides a computer program product comprising a program code for performing the method according to any one of the first aspect and the first to sixteenth impossible embodiments of the first aspect.

According to a fifth aspect, an embodiment of the present disclosure provides a decoder, comprising: one or more processors; and a non-transitory computer-readable storage medium coupled to the processors and storing programming for execution by the processors, wherein the programming, when executed by the processors, configures the decoder to carry out the method according to any one of the first aspect and the first to sixteenth impossible embodiments of the first aspect.

By performing methods provided by the present disclosure, the target transform mode can specify the TU partitioning mode of the CU, the position of the residual TU, and the transform type of the residual, such that not only the decoding efficiency can be improved, but also the decoding quality can be improved. Additionally, the target transform mode can specify the above information, and thus can reduce the bits needed for transmitting the above information, in order to save the transmitting resource, e.g., bandwidth for transmitting the encoded audio data.

BRIEF DESCRIPTION OF DRAWINGS

To describe the technical solutions in the embodiments of the present disclosure or in other approaches more clearly, the following briefly introduces the accompanying drawings required for describing the embodiments or other approaches. The accompanying drawings in the following description show merely some embodiments of the present disclosure, and a person of ordinary skill in the art may still derive other drawings from these accompanying drawings without creative efforts.

FIG. 12A and FIG. 12B are schematic diagrams of a video decoding method.

FIG. 20 is a flowchart of an example method of video decoding with position dependent SVT.

DESCRIPTION OF EMBODIMENTS

Figure 1A:
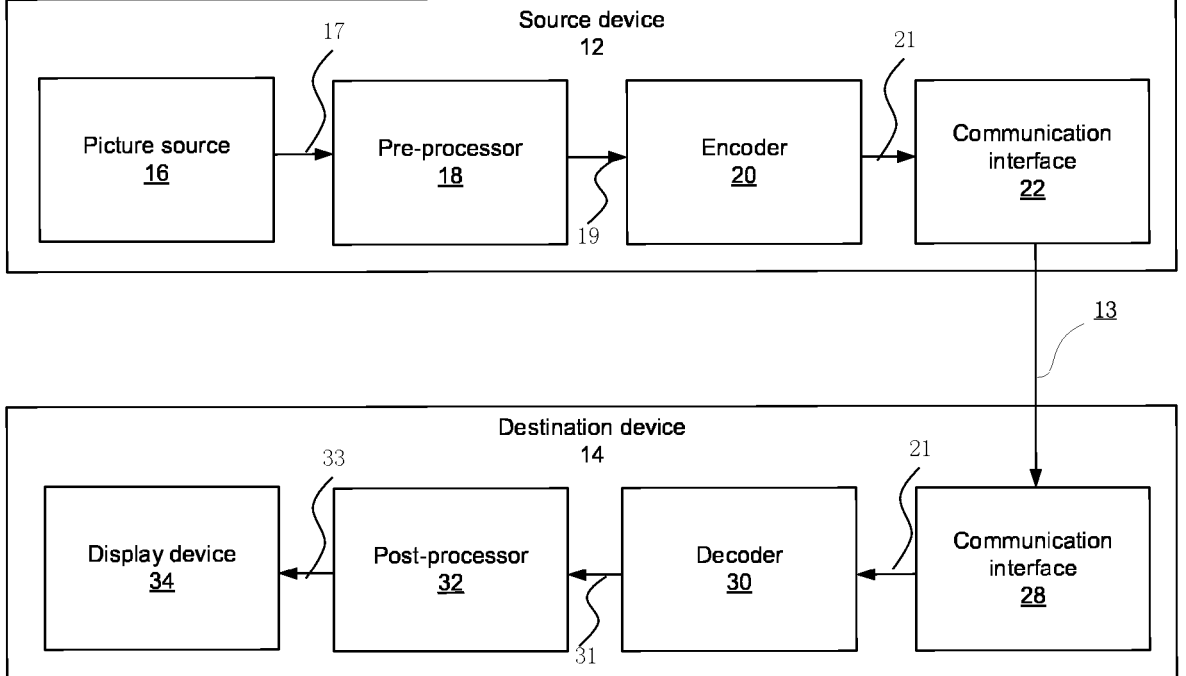
FIG. 1A is a conceptual or schematic block diagram illustrating an example coding system.

In the following description, reference is made to the accompanying figures, which form part of the disclosure, and which show, by way of illustration, aspects of embodiments of the disclosure or aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if an apparatus is described based on one or a plurality of units, e.g., functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless noted otherwise.

Video coding typically refers to the processing of a sequence of pictures, which form the video or video sequence. Instead of the term "picture" the term "frame" or "image" may be used as synonyms in the field of video coding. Video coding used in the present application (or present disclosure) indicates either video encoding or video decoding. Video encoding is performed at the source side, typically comprising processing (e.g., by compression) the original video pictures to reduce the amount of data required for representing the video pictures (for more efficient storage and/or transmission). Video decoding is performed at the destination side and typically comprises the inverse processing compared to the encoder to reconstruct the video pictures. Embodiments referring to "coding" of video pictures (or pictures in general, as will be explained later) shall be understood to relate to either "encoding" or "decoding" for video sequence. The combination of the encoding part and the decoding part is also referred to as CODEC (Coding and Decoding).

In case of lossless video coding, the original video pictures can be reconstructed, i.e. the reconstructed video pictures have the same quality as the original video pictures (assuming no transmission loss or other data loss during storage or transmission). In case of lossy video coding, further compression, e.g., by quantization, is performed, to reduce the amount of data representing the video pictures, which cannot be completely reconstructed at the decoder, i.e., the quality of the reconstructed video pictures is lower or worse compared to the quality of the original video pictures.

Several video coding standards since H.261 belong to the group of "lossy hybrid video codecs" (i.e., combine spatial and temporal prediction in the sample domain and two-dimensional (2D) transform coding for applying quantization in the transform domain). Each picture of a video sequence is typically partitioned into a set of non-overlapping blocks and the coding is typically performed on a block level. In other words, at the encoder the video is typically processed, i.e. encoded, on a block (video block) level, e.g. using spatial (intra picture) prediction and temporal (inter picture) prediction to generate a prediction block, subtracting the prediction block from the current block (block currently processed/to be processed) to obtain a residual block, transforming the residual block and quantizing the residual block in the transform domain to reduce the amount of data to be transmitted (compression), whereas at the decoder the inverse processing compared to the encoder is partially applied to the encoded or compressed block to reconstruct the current block for representation. Furthermore, the encoder duplicates the decoder processing loop such that both will generate identical predictions (e.g., intra- and inter-predictions) and/or re-constructions for processing, i.e., coding, the subsequent blocks.

As used herein, the term "block" may a portion of a picture or a frame. For convenience of description, embodiments of the disclosure are described herein in reference to High-Efficiency Video Coding (HEVC) or the reference software of Versatile video coding (VVC), developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC. It may refer to a CU, PU, and TU. In HEVC, a coding tree unit (CTU) is split into CUs using a quad-tree structure denoted as coding tree. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. In the newest development of the video compression technical, Qual-tree and binary tree (QTBT) partitioning frame is used to partition a coding block. In the QTBT block structure, a CU can have either a square or rectangular shape. For example, a coding tree unit (CTU) is first partitioned by a quadtree structure. The quadtree leaf nodes are further partitioned by a binary tree structure. The binary tree leaf nodes are called coding units (CUs), and that segmentation is used for prediction and transform processing without any further partitioning. This means that the CU, PU and TU have the same block size in the QTBT coding block structure. In parallel, multiply partition, for example, triple tree partition was also proposed to be used together with the QTBT block structure.

In the following embodiments of an encoder 20, a decoder 30 and a coding system 10 are described based on FIGS. 1 to 3.

FIG. 1A is a conceptual or schematic block diagram illustrating an example coding system 10, e.g., a video coding system 10 that may utilize techniques of this present application. Encoder 20 (e.g., Video encoder 20) and decoder 30 (e.g., video decoder 30) of video coding system 10 represent examples of devices that may be configured to perform techniques in accordance with various examples described in the present application. As shown in FIG. 1A, the coding system 10 comprises a source device 12 configured to provide encoded data 13 (e.g., an encoded picture 13) e.g., to a destination device 14 for decoding the encoded data 13.

The source device 12 comprises an encoder 20, and may additionally, i.e., optionally, comprise a picture source 16, a pre-processing unit 18, e.g., a picture pre-processing unit 18, and a communication interface or communication unit 22.

The picture source 16 may comprise or be any kind of picture capturing device, for example for capturing a real-world picture, and/or any kind of a picture or comment (for screen content coding, some texts on the screen is also considered a part of a picture or image to be encoded) generating device, for example a computer-graphics processor for generating a computer animated picture, or any kind of device for obtaining and/or providing a real-world picture, a computer animated picture (e.g., a screen content, a virtual reality (VR) picture) and/or any combination thereof (e.g., an augmented reality (AR) picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance/chrominance format or color space, e.g., YCbCr, which comprises a luminance component indicated by Y (sometimes also L is used instead) and two chrominance components indicated by Cb and Cr. The luminance (or luma for short) component Y represents the brightness or grey level intensity (e.g., like in a grey-scale picture), while the two chrominance (or chroma for short) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array.

The picture source 16 (e.g., video source 16) may be, for example a camera for capturing a picture, a memory, e.g., a picture memory, comprising or storing a previously captured or generated picture, and/or any kind of interface (internal or external) to obtain or receive a picture. The camera may be, for example, a local or integrated camera integrated in the source device, the memory may be a local or integrated memory, e.g., integrated in the source device. The interface may be, for example, an external interface to receive a picture from an external video source, for example an external picture capturing device like a camera, an external memory, or an external picture generating device, for example an external computer-graphics processor, computer or server. The interface can be any kind of interface, e.g., a wired or wireless interface, an optical interface, according to any proprietary or standardized interface protocol. The interface for obtaining the picture data 17 may be the same interface as or a part of the communication interface 22.

In distinction to the pre-processing unit 18 and the processing performed by the pre-processing unit 18, the picture or picture data 17 (e.g., video data 16) may also be referred to as raw picture or raw picture data 17.

Pre-processing unit 18 is configured to receive the (raw) picture data 17 and to perform pre-processing on the picture data 17 to obtain a pre-processed picture 19 or pre-processed picture data 19. Pre-processing performed by the pre-processing unit 18 may, e.g., comprise trimming, color format conversion (e.g., from RGB to YCbCr), color correction, or de-noising. It can be understood that the pre-processing unit 18 may be an optional component.

The encoder 20 (e.g., video encoder 20) is configured to receive the pre-processed picture data 19 and provide encoded picture data 21 (further details will be described below, e.g., based on FIG. 2 or FIG. 4).

Communication interface 22 of the source device 12 may be configured to receive the encoded picture data 21 and to transmit it to another device, e.g., the destination device 14 or any other device, for storage or direct reconstruction, or to process the encoded picture data 21 for respectively before storing the encoded data 13 and/or transmitting the encoded data 13 to another device, e.g., the destination device 14 or any other device for decoding or storing.

The destination device 14 comprises a decoder 30 (e.g., a video decoder 30), and may additionally, i.e., optionally, comprise a communication interface or communication unit 28, a post-processing unit 32, and a display device 34.

The communication interface 28 of the destination device 14 is configured receive the encoded picture data 21 or the encoded data 13, e.g., directly from the source device 12 or from any other source (e.g., a storage device, such as an encoded picture data storage device).

The communication interface 22 and the communication interface 28 may be configured to transmit or receive the encoded picture data 21 or encoded data 13 via a direct communication link between the source device 12 and the destination device 14, e.g., a direct wired or wireless connection, or via any kind of network, such as a wired or wireless network or any combination thereof, or any kind of private and public network, or any kind of combination thereof.

The communication interface 22 may be, e.g., configured to package the encoded picture data 21 into an appropriate format, e.g., packets, for transmission over a communication link or communication network.

The communication interface 28, forming the counterpart of the communication interface 22, may be, e.g., configured to de-package the encoded data 13 to obtain the encoded picture data 21.

Both communication interface 22 and communication interface 28 may be configured as: unidirectional communication interfaces as indicated by the arrow for the encoded picture data 13 in FIG. 1A pointing from the source device 12 to the destination device 14; or bi-directional communication interfaces, and may be configured, e.g., to send and receive messages, e.g., to set up a connection, to acknowledge and exchange any other information related to the communication link and/or data transmission, e.g., encoded picture data transmission.

The decoder 30 is configured to receive the encoded picture data 21 and provide decoded picture data 31 or a decoded picture 31 (further details will be described below, e.g., based on FIG. 3 or FIG. 5).

The post-processor 32 of destination device 14 is configured to post-process the decoded picture data 31 (also called reconstructed picture data), e.g., the decoded picture 31, to obtain post-processed picture data 33, e.g., a post-processed picture 33. The post-processing performed by the post-processing unit 32 may comprise, e.g., color format conversion (e.g. from YCbCr to RGB), color correction, trimming, or re-sampling, or any other processing, e.g., for preparing the decoded picture data 31 for display, e.g., by display device 34.

The display device 34 of the destination device 14 is configured to receive the post-processed picture data 33 for displaying the picture, e.g., to a user or viewer. The display device 34 may be or comprise any kind of display for representing the reconstructed picture, e.g., an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP), or any kind of other display.

Although FIG. 1A depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 1A may vary depending on the actual device and application.

The encoder 20 (e.g., a video encoder 20) and the decoder 30 (e.g., a video decoder 30) each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

Source device 12 may be referred to as a video encoding device or a video encoding apparatus. Destination device 14 may be referred to as a video decoding device or a video decoding apparatus. Source device 12 and destination device 14 may be examples of video coding devices or video coding apparatuses.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system.

In some cases, the source device 12 and the destination device 14 may be equipped for wireless communication. Thus, the source device 12 and the destination device 14 may be wireless communication devices.

In some cases, video coding system 10 illustrated in FIG. 1A is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

It should be understood that, for each of the above examples described with reference to video encoder 20, video decoder 30 may be configured to perform a reciprocal process. With regard to signaling syntax elements, video decoder 30 may be configured to receive and parse such syntax element and decode the associated video data accordingly. In some examples, video encoder 20 may entropy encode one or more syntax elements into the encoded video bitstream. In such examples, video decoder 30 may parse such syntax element and decode the associated video data accordingly.

Figure 1B:
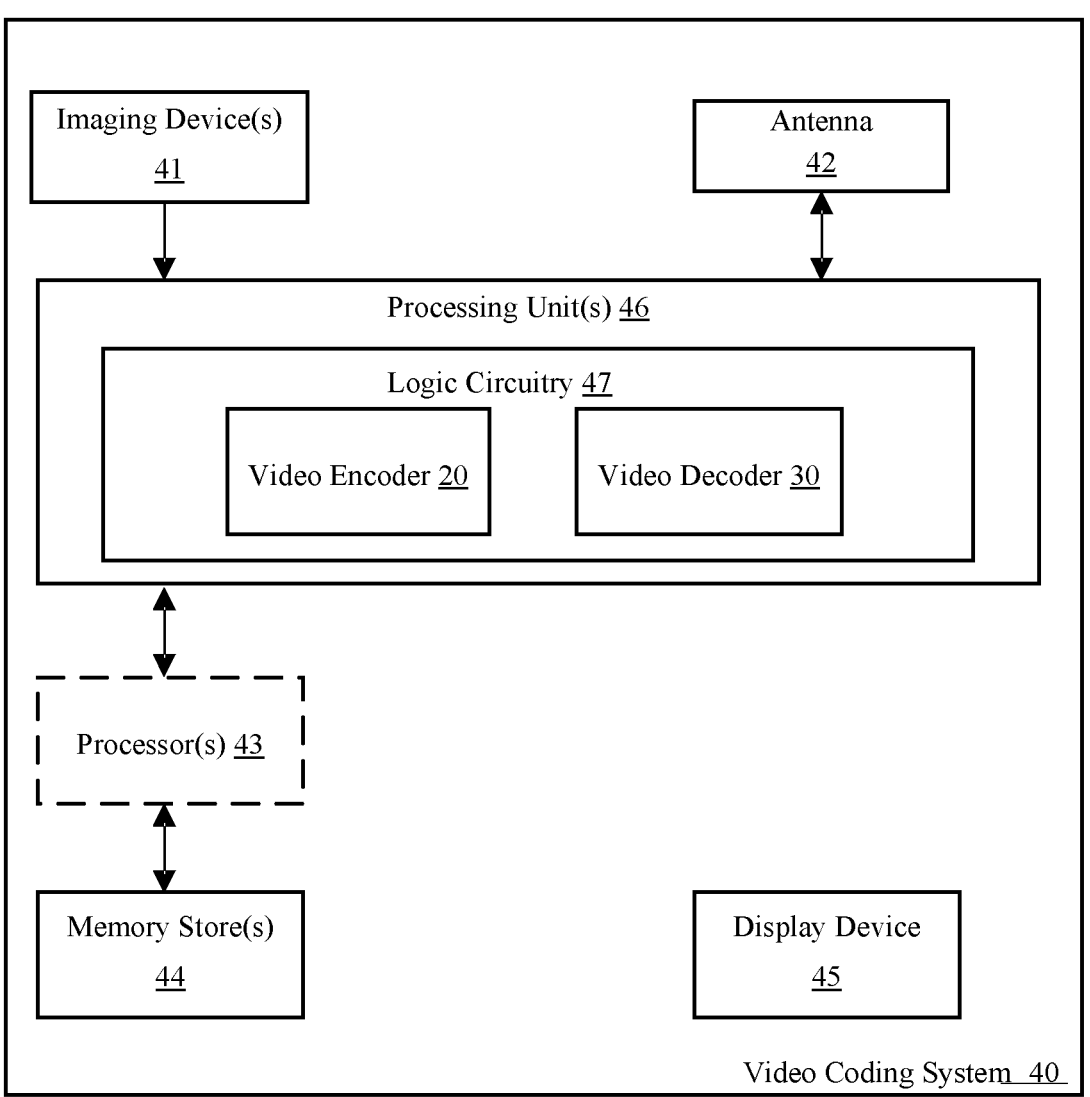
FIG. 1B is an illustrative diagram of another example video coding system.
Figure 2:
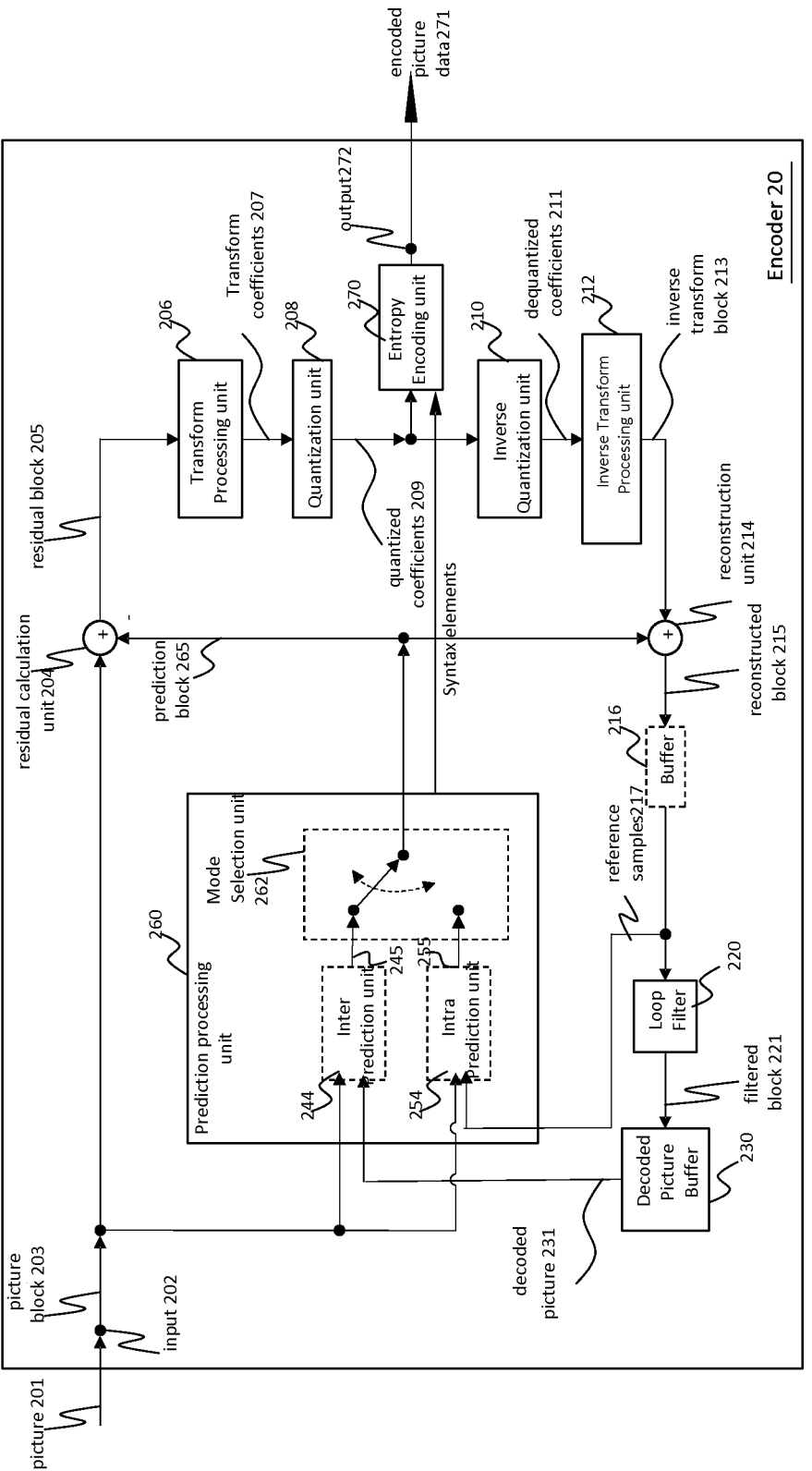
FIG. 2 is a schematic/conceptual block diagram of an example video encoder.
Figure 3:
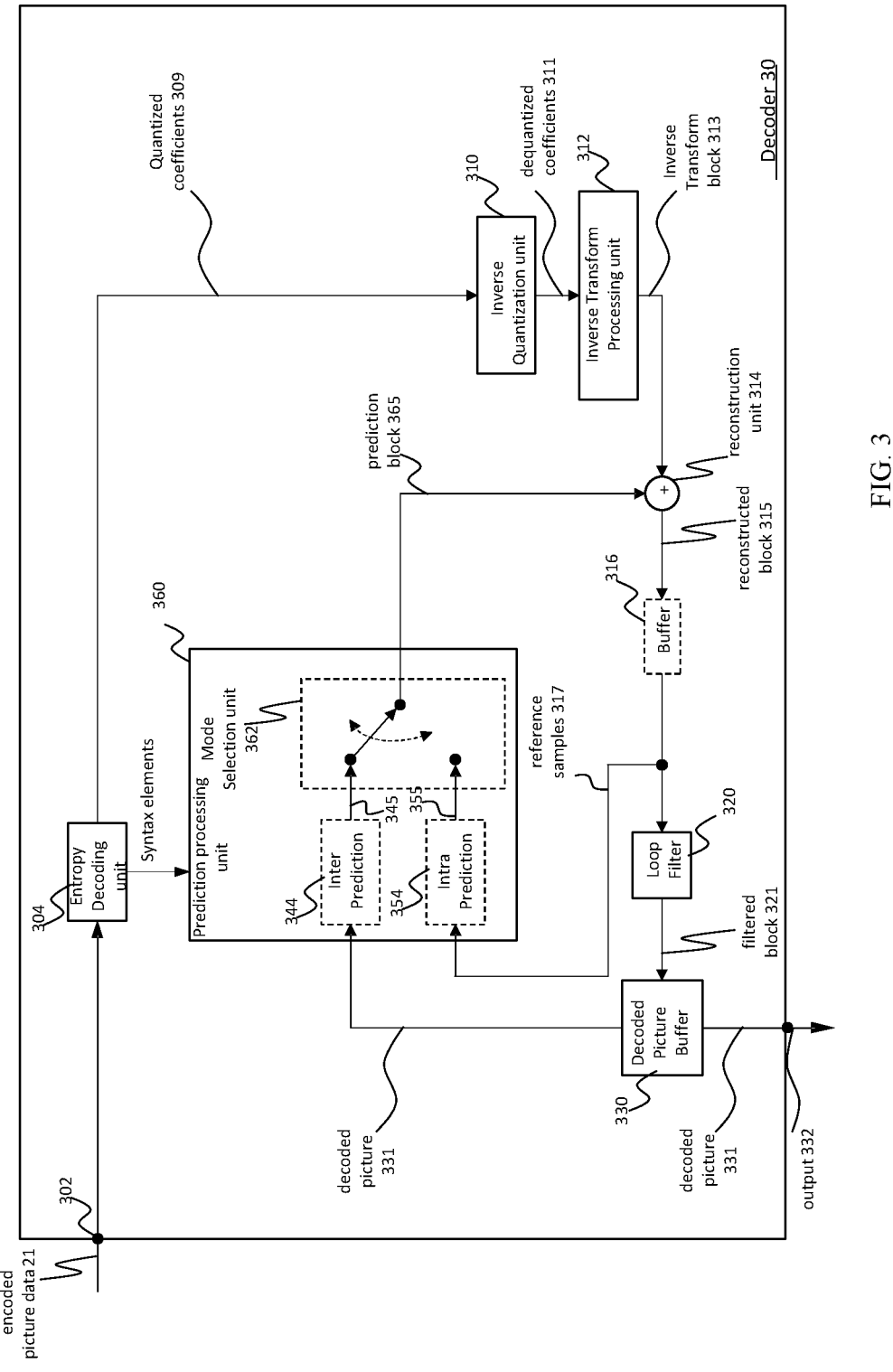
FIG. 3 is a schematic/conceptual block diagram of an example video decoder.

FIG. 1B is an illustrative diagram of another example video coding system 40 including encoder 20 of FIG. 2 and/or decoder 30 of FIG. 3 according to an exemplary embodiment. The system 40 can implement techniques in accordance with various examples described in the present application. In the illustrated implementation, video coding system 40 may include imaging device(s) 41, video encoder 100, video decoder 30 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 20 and video decoder 30, video coding system 40 may include only video encoder 20 or only video decoder 30 in various examples.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 47 may be implemented via processing unit(s) 46. Processing unit(s) 46 may include application-specific integrated circuit (ASIC) logic, graphics processor(s), general purpose processor(s), or the like. Video coding system 40 also may include optional processor(s) 43, which may similarly include application-specific integrated circuit (ASIC) logic, graphics processor(s), general purpose processor(s), or the like. In some examples, logic circuitry 47 may be implemented via hardware, video coding dedicated hardware, or the like, and processor(s) 43 may be implemented general purpose software, operating systems, or the like. In addition, memory store(s) 44 may be any type of memory such as volatile memory (e.g., Static Random-Access Memory (SRAM), Dynamic Random-Access Memory (DRAM), etc.) or non-volatile memory (e.g., flash memory, etc.), and so forth. In a non-limiting example, memory store(s) 44 may be implemented by cache memory. In some examples, logic circuitry 47 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 100 implemented via logic circuitry may include an image buffer (e.g., via either processing unit(s) 46 or memory store(s) 44) and a graphics processing unit (e.g., via processing unit(s) 46). The graphics processing unit may be communicatively coupled to the image buffer. The graphics processing unit may include video encoder 100 as implemented via logic circuitry 47 to embody the various modules as discussed with respect to FIG. 2 and/or any other encoder system or subsystem described herein. The logic circuitry may be configured to perform the various operations as discussed herein.

Video decoder 30 may be implemented in a similar manner as implemented via logic circuitry 47 to embody the various modules as discussed with respect to decoder 30 of FIG. 3 and/or any other decoder system or subsystem described herein. In some examples, video decoder 30 may be implemented via logic circuitry may include an image buffer (e.g., via either processing unit(s) 420 or memory store(s) 44) and a graphics processing unit (e.g., via processing unit(s) 46). The graphics processing unit may be communicatively coupled to the image buffer. The graphics processing unit may include video decoder 30 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 30 coupled to antenna 42 and configured to decode the encoded bitstream. The display device 45 is configured to present video frames.

Encoder & Encoding Method

FIG. 2 shows a schematic/conceptual block diagram of an example video encoder 20 that is configured to implement the techniques of the present application. In the example of FIG. 2, the video encoder 20 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. Inter prediction unit 244 may include a motion estimation unit and a motion compensation unit (not shown). A video encoder 20 as shown in FIG. 2 may also be referred to as hybrid video encoder or a video encoder according to a hybrid video codec.

For example, the residual calculation unit 204, the transform processing unit 206, the quantization unit 208, the prediction processing unit 260, and the entropy encoding unit 270 form a forward signal path of the encoder 20, whereas, for example, the inverse quantization unit 210, the inverse transform processing unit 212, the reconstruction unit 214, the buffer 216, the loop filter 220, the decoded picture buffer (DPB) 230, and prediction processing unit 260 form a backward signal path of the encoder, wherein the backward signal path of the encoder corresponds to the signal path of the decoder (see decoder 30 in FIG. 3).

The encoder 20 is configured to receive, e.g., by input 202, a picture 201 or a block 203 of the picture 201, e.g., picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g., previously encoded and/or decoded pictures of the same video sequence, i.e. the video sequence which also comprises the current picture).

Partitioning

Embodiments of the encoder 20 may comprise a partitioning unit (not depicted in FIG. 2) configured to partition the picture 201 into a plurality of blocks, e.g., blocks like block 203, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

In one example, the prediction processing unit 260 of video encoder 20 may be configured to perform any combination of the partitioning techniques described above.

Like the picture 201, the block 203 again is or can be regarded as a two-dimensional array or matrix of samples with intensity values (sample values), although of smaller dimension than the picture 201. In other words, the block 203 may comprise, e.g., one sample array (e.g., a luma array in case of a monochrome picture 201) or three sample arrays (e.g., a luma and two chroma arrays in case of a color picture 201) or any other number and/or kind of arrays depending on the color format applied. The number of samples in horizontal and vertical direction (or axis) of the block 203 define the size of block 203.

Encoder 20 as shown in FIG. 2 is configured encode the picture 201 block by block, e.g., the encoding and prediction is performed per block 203.

Residual Calculation

The residual calculation unit 204 is configured to calculate a residual block 205 based on the picture block 203 and a prediction block 265 (further details about the prediction block 265 are provided later), e.g., by subtracting sample values of the prediction block 265 from sample values of the picture block 203, sample by sample (pixel by pixel) to obtain the residual block 205 in the sample domain.

Transform

The transform processing unit 206 is configured to apply a transform, e.g., a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Scaling factors are, for example, specified for the inverse transform, e.g., by inverse transform processing unit 212, at a decoder 30 (and the corresponding inverse transform, e.g., by inverse transform processing unit 212 at an encoder 20) and corresponding scaling factors for the forward transform, e.g., by transform processing unit 206, at an encoder 20 may be specified accordingly.

Quantization

The quantization unit 208 is configured to quantize the transform coefficients 207 to obtain quantized transform coefficients 209, e.g., by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example, for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and corresponding or inverse dequantization, e.g. by inverse quantization 210, may include multiplication by the quantization step size. Embodiments according to some standards, e.g., HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g., in a bitstream. The quantization is a lossy operation, wherein the loss increases with increasing quantization step sizes.

The inverse quantization unit 210 is configured to apply the inverse quantization of the quantization unit 208 on the quantized coefficients to obtain dequantized coefficients 211, e.g., by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g., an inverse discrete cosine transform (DCT) or inverse discrete sine transform (DST), to obtain an inverse transform block 213 in the sample domain. The inverse transform block 213 may also be referred to as inverse transform dequantized block 213 or inverse transform residual block 213.

The reconstruction unit 214 (e.g., summer 214) is configured to add the inverse transform block 213 (i.e., reconstructed residual block 213) to the prediction block 265 to obtain a reconstructed block 215 in the sample domain, e.g., by adding the sample values of the reconstructed residual block 213 and the sample values of the prediction block 265.

Optionally, the buffer unit 216 (or simply "buffer" 216), e.g., a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g., intra-prediction.

Embodiments of the encoder 20 may be configured such that, e.g., the buffer unit 216 is not only used for storing the reconstructed blocks 215 for intra prediction 254 but also for the loop filter unit 220 (not shown in FIG. 2), and/or such that, e.g., the buffer unit 216 and the decoded picture buffer unit 230 form one buffer. Further embodiments may be configured to use filtered blocks 221 and/or blocks or samples from the decoded picture buffer 230 (both not shown in FIG. 2) as input or basis for intra prediction 254.

The loop filter unit 220 (or simply "loop filter" 220) is configured to filter the reconstructed block 215 to obtain a filtered block 221, e.g., to smooth pixel transitions, or otherwise improve the video quality. The loop filter unit 220 is intended to represent one or more loop filters such as a de-blocking filter, a sample-adaptive offset (SAO) filter or other filters, e.g., a bilateral filter or an adaptive loop filter (ALF) or a sharpening or smoothing filters or collaborative filters. Although the loop filter unit 220 is shown in FIG. 2 as being an in-loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the encoder 20 (respectively loop filter unit 220) may be configured to output loop filter parameters (such as sample adaptive offset information), e.g., directly or entropy encoded via the entropy encoding unit 270 or any other entropy coding unit, such that, e.g., a decoder 30 may receive and apply the same loop filter parameters for decoding.

The decoded picture buffer (DPB) 230 may be a reference picture memory that stores reference picture data for use in encoding video data by video encoder 20. The DPB 230 may be formed by any of a variety of memory devices, such as dynamic random-access memory (DRAM), including synchronous DRAM (SDRAM), magnetoresistive RAM (MRAM), resistive RAM (RRAM), or other types of memory devices. The DPB 230 and the buffer 216 may be provided by the same memory device or separate memory devices. In some example, the decoded picture buffer (DPB) 230 is configured to store the filtered block 221. The decoded picture buffer 230 may be further configured to store other previously filtered blocks, e.g., previously reconstructed and filtered blocks 221, of the same current picture or of different pictures, e.g., previously reconstructed pictures, and may provide complete previously reconstructed, i.e., decoded, pictures (and corresponding reference blocks and samples) and/or a partially reconstructed current picture (and corresponding reference blocks and samples), for example for inter-prediction. In some example, if the reconstructed block 215 is reconstructed but without in-loop filtering, the decoded picture buffer (DPB) 230 is configured to store the reconstructed block 215.

The prediction processing unit 260, also referred to as block prediction processing unit 260, is configured to receive or obtain the block 203 (current block 203 of the current picture 201) and reconstructed picture data, e.g., reference samples of the same (current) picture from buffer 216 and/or reference picture data 231 from one or a plurality of previously decoded pictures from decoded picture buffer 230, and to process such data for prediction, i.e., to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g., from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on rate distortion optimization (RDO), i.e., select the prediction mode which provides a minimum rate distortion optimization or which associated rate distortion at least a fulfills a prediction mode selection criterion.

In the following the prediction processing (e.g., prediction processing unit 260 and mode selection (e.g., by mode selection unit 262) performed by an example encoder 20 will be explained in more detail.

As described above, the encoder 20 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g., non-directional modes like direct current (DC) mode (or mean mode) and planar mode, or directional modes, e.g., as defined in H.265, or may comprise 67 different intra-prediction modes, e.g., non-directional modes like DC (or mean) mode and planar mode, or directional modes, e.g., as defined in H.266 under developing.

The set of (or possible) inter-prediction modes depend on the available reference pictures (i.e., previous at least partially decoded pictures, e.g., stored in DBP 230) and other inter-prediction parameters, e.g., whether the whole reference picture or only a part, e.g., a search window area around the area of the current block, of the reference picture is used for searching for a best matching reference block, and/or e.g., whether pixel interpolation is applied, e.g., half/semi-pel and/or quarter-pel interpolation, or not.

Additional to the above prediction modes, skip mode and/or direct mode may be applied.

The prediction processing unit 260 may be further configured to partition the block 203 into smaller block partitions or sub-blocks, e.g., iteratively using quad-tree-partitioning (QT), binary partitioning (BT) or triple-tree-partitioning (TT) or any combination thereof, and to perform, e.g., the prediction for each of the block partitions or sub-blocks, wherein the mode selection comprises the selection of the tree-structure of the partitioned block 203 and the prediction modes applied to each of the block partitions or sub-blocks.

The inter prediction unit 244 may include motion estimation (ME) unit (not shown in FIG. 2) and motion compensation (MC) unit (not shown in FIG. 2). The motion estimation unit is configured to receive or obtain the picture block 203 (current picture block 203 of the current picture 201) and a decoded picture 231, or at least one or a plurality of previously reconstructed blocks, e.g., reconstructed blocks of one or a plurality of other/different previously decoded pictures 231, for motion estimation. E.g., a video sequence may comprise the current picture and the previously decoded pictures 231, or in other words, the current picture and the previously decoded pictures 231 may be part of or form a sequence of pictures forming a video sequence.

The encoder 20 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called motion vector (MV).

The motion compensation unit is configured to obtain, e.g., receive, an inter prediction parameter and to perform inter prediction based on or using the inter prediction parameter to obtain an inter prediction block 245. Motion compensation, performed by motion compensation unit (not shown in FIG. 2), may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit 246 may locate the prediction block to which the motion vector points in one of the reference picture lists. Motion compensation unit 246 may also generate syntax elements associated with the blocks and the video slice for use by video decoder 30 in decoding the picture blocks of the video slice.

The intra prediction unit 254 is configured to obtain, e.g., receive, the picture block 203 (current picture block) and one or a plurality of previously reconstructed blocks, e.g. reconstructed neighbor blocks, of the same picture for intra estimation. The encoder 20 may, e.g., be configured to select an intra prediction mode from a plurality of (predetermined) intra prediction modes.

Embodiments of the encoder 20 may be configured to select the intra-prediction mode based on an optimization criterion, e.g., minimum residual (e.g., the intra-prediction mode providing the prediction block 255 most similar to the current picture block 203) or minimum rate distortion.

The intra prediction unit 254 is further configured to determine based on intra prediction parameter, e.g., the selected intra prediction mode, the intra prediction block 255. In any case, after selecting an intra prediction mode for a block, the intra prediction unit 254 is also configured to provide intra prediction parameter, i.e., information indicative of the selected intra prediction mode for the block to the entropy encoding unit 270. In one example, the intra prediction unit 254 may be configured to perform any combination of the intra prediction techniques described later.

The entropy encoding unit 270 is configured to apply an entropy encoding algorithm or scheme (e.g., a variable length coding (VLC) scheme, a context adaptive VLC scheme (CALVC), an arithmetic coding scheme, a context adaptive binary arithmetic coding (CABAC), syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g., in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 20 can be used to encode the video stream. For example, a non-transform based encoder 20 can quantize the residual signal directly without the transform processing unit 206 for certain blocks or frames. In another implementation, an encoder 20 can have the quantization unit 208 and the inverse quantization unit 210 combined into a single unit.

FIG. 3 shows an exemplary video decoder 30 that is configured to implement the techniques of this present application. The video decoder 30 configured to receive encoded picture data (e.g., encoded bitstream) 21, e.g., encoded by encoder 100, to obtain a decoded picture 131. During the decoding process, video decoder 30 receives video data, e.g., an encoded video bitstream that represents picture blocks of an encoded video slice and associated syntax elements, from video encoder 100.

In the example of FIG. 3, the decoder 30 comprises an entropy decoding unit 304, an inverse quantization unit 310, an inverse transform processing unit 312, a reconstruction unit 314 (e.g. a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. Video decoder 30 may, in some examples, perform a decoding pass generally reciprocal to the encoding pass described with respect to video encoder 100 from FIG. 2.

The entropy decoding unit 304 is configured to perform entropy decoding to the encoded picture data 21 to obtain, e.g., quantized coefficients 309 and/or decoded coding parameters (not shown in FIG. 3), e.g., (decoded) any or all of inter prediction parameters, intra prediction parameter, loop filter parameters, and/or other syntax elements. Entropy decoding unit 304 is further configured to forward inter prediction parameters, intra prediction parameter, and/or other syntax elements to the prediction processing unit 360. Video decoder 30 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter prediction unit 344 and an intra prediction unit 354, wherein the inter prediction unit 344 may resemble the inter prediction unit 144 in function, and the intra prediction unit 354 may resemble the intra prediction unit 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g., from the entropy decoding unit 304.

When the video slice is coded as an intra coded (I) slice, intra prediction unit 354 of prediction processing unit 360 is configured to generate prediction block 365 for a picture block of the current video slice based on a signaled intra prediction mode and data from previously decoded blocks of the current frame or picture. When the video frame is coded as an inter coded (i.e., B, or P) slice, inter prediction unit 344 (e.g., motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 30 may construct the reference frame lists, List 0 and List 1, using default construction techniques based on reference pictures stored in DPB 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a quantization parameter calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g., summer 314) is configured to add the inverse transform block 313 (i.e., reconstructed residual block 313) to the prediction block 365 to obtain a reconstructed block 315 in the sample domain, e.g., by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g., to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a sample-adaptive offset (SAO) filter or other filters, e.g., a bilateral filter or an adaptive loop filter (ALF) or a sharpening or smoothing filters or collaborative filters. Although the loop filter unit 320 is shown in FIG. 3 as being an in-loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 30 is configured to output the decoded picture 331, e.g., via output 332, for presentation or viewing to a user.

Other variations of the video decoder 30 can be used to decode the compressed bitstream. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

Figure 4:
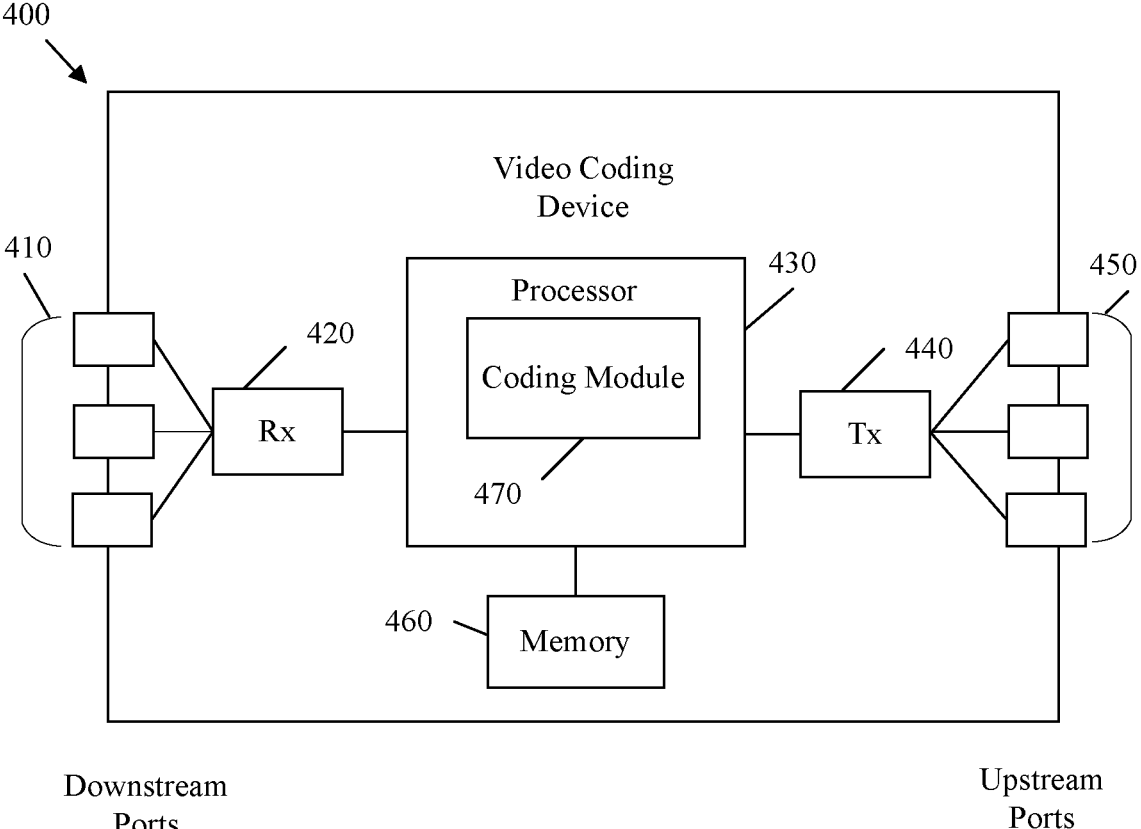
FIG. 4 is a schematic diagram of a video coding device.

FIG. 4 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 1A or an encoder such as video encoder 20 of FIG. 1A. In an embodiment, the video coding device 400 may be one or more components of the video decoder 30 of FIG. 1A or the video encoder 20 of FIG. 1A as described above.

The video coding device 400 comprises: ingress ports 410 and receiver units (Rx) 420 for receiving data; a processor, logic unit, or central processing unit (CPU) 430 to process the data; transmitter units (Tx) 440 and egress ports 450 for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICS, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random-access memory (RAM), ternary content-addressable memory (TCAM), and/or static random-access memory (SRAM).

Figure 5:
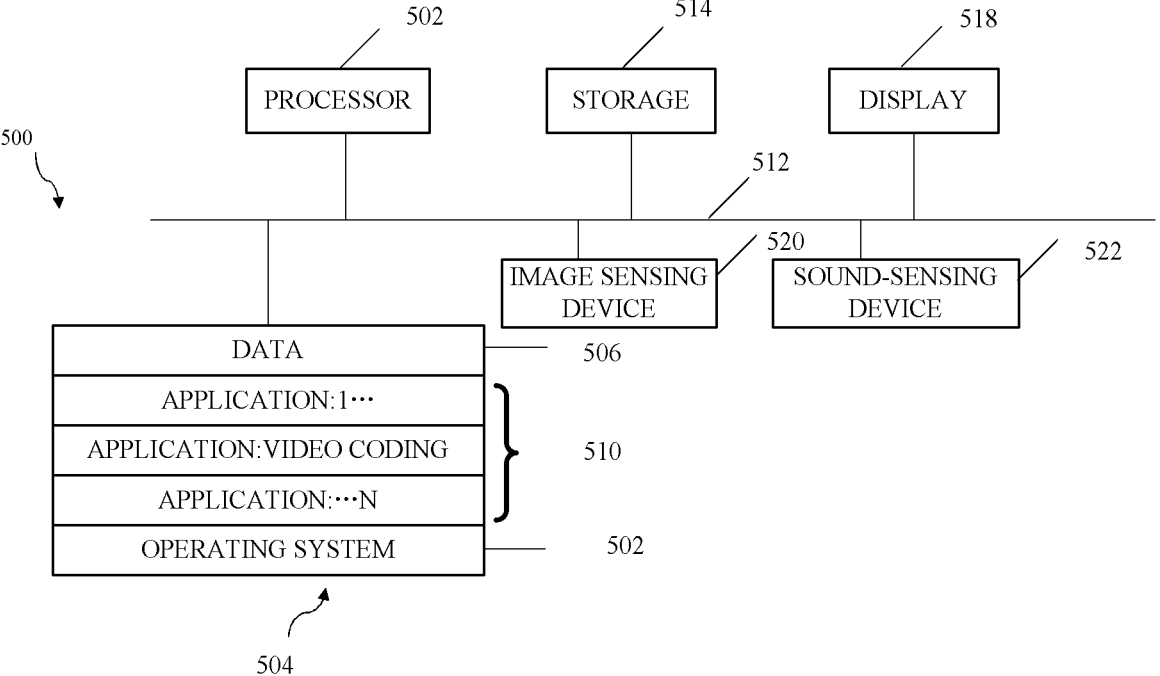
FIG. 5 is a block diagram of an apparatus.

FIG. 5 is a simplified block diagram of an apparatus 500 that may be used as either or both of the source device 310 and the destination device 320 from FIG. 1 according to an exemplary embodiment. The apparatus 500 can implement techniques of this present application described above. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read-only memory (ROM) device or a random-access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a liquid crystal display (LCD), a cathode-ray tube (CRT) display, a plasma display or light emitting diode (LED) display, such as an organic LED (OLED) display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Video coding like H.265/HEVC or H.266/VVC is based on a hybrid prediction plus transform framework. Coding Tree Unit (CTU) is divided in to one or more coding unit (CU). A CU may contain one luma block and two chroma blocks (e.g., YUV4:2:0 or YUV4:4:4 format), or a CU may only contain one luma block, or a CU may only contain two chroma blocks. A CU may correspond to a prediction unit (PU) and a transform unit (TU), or may correspond to a prediction unit and multiple transform units. The prediction unit contains prediction blocks of prediction samples, and the transform unit contains transform blocks of residual samples. The reconstructed samples of the CU are obtained by adding up the prediction samples with corresponding residual samples.

At encoder, the prediction information (e.g., prediction mode and motion vector information) and residual information (e.g., transform mode, transform coefficients and quantization parameter) of a CU are decided by rate distortion optimization and then encoded into bitstream. At decoder, prediction information and residual information are parsed. According to the prediction information, intra or inter prediction is conducted to generate the prediction samples of the prediction unit. According to the residual information, inverse quantization and inverse transform are conducted to generate residual samples of the transform unit. The prediction samples and the residual samples are added to obtain the reconstructed samples of the coding unit.

A basic transform mode is the residual of a CU being transformed in one TU, i.e., CU size equal to TU size. In Residual Quad-Tree (RQT) in HEVC, a CU may be divided into 4 TUs of equal size, and the information of whether each TU has residual or not is signaled by coded block flags (cbf) of each TU. The information of whether the CU has residual is signaled by root cbf of the CU (e.g., the rqt_root_cbf syntax element in HEVC).

Adaptive Multiple core Transform (AMT) in Versatile Video Coding (VVC) test model (VTM) enables one transform block using one transform type among a set of transform types. The transform type is signaled in bitstream, and a transform type specifies the horizontal transform (or row transform) and vertical transform (or column transform) of the transform block. The possible core transforms for the horizontal/vertical transform include Discrete Sine Transform (DST) and Discrete Cosine Transform (DCT), e.g., DST-7 (DST type 7), DST-1, DCT-8, DCT-2, and DCT5.

To improve the transform coding efficiency, new transform modes for a CU are introduced in this disclosure. For each of the new transform modes, a CU is tiled into N (N=2, 3, or 4) TUs, and only one TU of the CU has residual and the rest N–1 TUs of the CU are inferred not to have residual. Besides, the transform type (i.e., the horizontal and vertical transform) of the TU with residual is obtained or selected from a transform type set specified by the transform mode. In other words, each of the new transform modes specifies TU partitioning, the only one TU with residual, and the transform type set of the TU with residual.

An embodiment of present disclosure describes the process of decoding a coding unit. A bitstream containing at least one picture of video data is decoded. A picture is split into a plurality of rectangular image regions and each region corresponds to a Coding Tree Unit (CTU). A CTU is partitioned into a plurality of coding units, according to block partition information contained in the bitstream. Coding information of the coding units are parsed from the bitstream, and pixels of the coding units are reconstructed based on the coding information. The coding information contains prediction information and transform information.

The prediction information indicates the prediction mode of the CU (i.e., inter prediction or intra prediction). If the prediction mode is intra prediction, the prediction information may further contain intra prediction mode, such as the Planar mode, DC mode, and angular mode in HEVC and VVC. If the prediction mode is inter prediction, the prediction information may further contain whether using Skip mode or Merge mode or advanced motion vector prediction (AMVP) mode, merge candidate index, inter prediction direction, reference frame index, motion vector, whether using affine-model based prediction, etc.

The transform information indicates the transform mode of the CU and the transform coefficients associated with one or more TUs in the CU. Apart from the conventional transform mode that residual of a CU is transformed in a TU of the same size as that of the CU, this embodiment also utilizes new transform modes. For each of the new transform modes, a CU is tiled into N (N=2, 3, or 4) TUs, and only one TU has residual and the rest N−1 TUs are inferred not to have residual. Besides, the transform type (i.e., the horizontal and vertical transform) of the TU with residual is specified by the transform mode.

Figure 6:
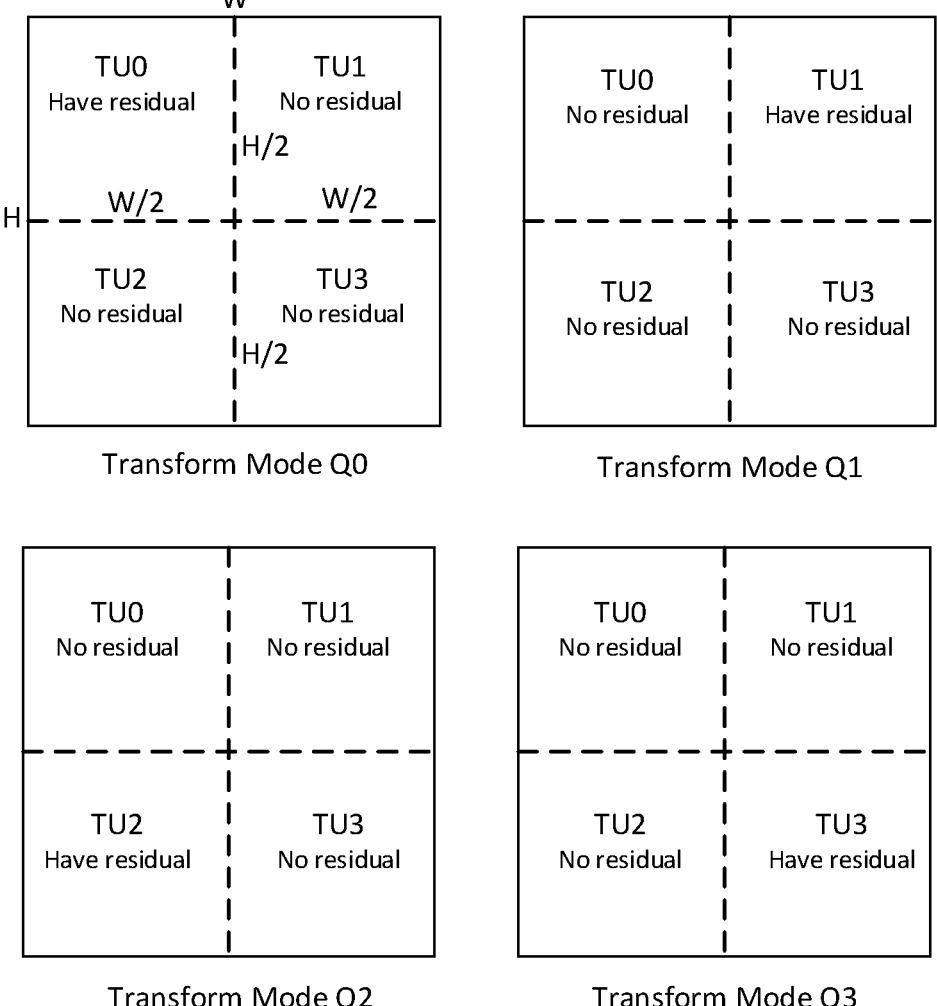
FIG. 6 illustrates transform modes Q0, Q1, Q2 and Q3.

In one example, the new transform modes include the following four modes Q0, Q1, Q2, and Q3, as illustrated in FIG. 6. For each of the four modes, a CU of size W×H is divided into 4 TUs of size (W/2)×(H/2), namely the top-left TU0, the top-right TU1, the bottom-left TU2, and the bottom-right TU3. Only one of the TU0, TU1, TU2, and TU3 has residual. The TU with residual has a transform type set including two transform types, namely a first transform type and a second transform type, and the transform types are dependent on the transform mode (i.e., the transform type set are corresponding to the transform mode). The actual transform type used by the TU with residual is signaled in bitstream, e.g., signaled by a flag or an index.

1) Transform mode Q0: TU0 has residual; a first transform type is that the horizontal transform and vertical transform of TU0 are DCT-8 and DCT-8, respectively, and a second transform type is that the horizontal transform and vertical transform of TU0 are DST-7 and DST-7, respectively.

2) Transform mode Q1: TU1 has residual; a first transform type is that the horizontal transform and vertical transform of TU1 are DST-7 and DCT-8, respectively, and a second transform type is that the horizontal transform and vertical transform of TU1 are DCT-8 and DST-7, respectively.

3) Transform mode Q2: TU2 has residual; a first transform type is that the horizontal transform and vertical transform of TU2 are DCT-8 and DST-7, respectively, and a second transform type is that the horizontal transform and vertical transform of TU2 are DST-7 and DCT-8, respectively.

4) Transform mode Q3: TU3 has residual; a first transform type is that the horizontal transform and vertical transform of TU3 are DST-7 and DST-7, respectively, a second transform type is that the horizontal transform and vertical transform of TU3 are DCT-8 and DCT-8, respectively.

In this example, the second transform type is dependent on the first transform type. If the horizontal transform of the first transform type is DCT-8 (or DST-7), the horizontal transform of the second transform type is DST-7 (or DCT-8). If the vertical transform of the first transform type is DCT-8 (or DST-7), the vertical transform of the second transform type is DST-7 (or DCT-8).

In another example, the second transform type is always DCT-2/DCT-2 for Transform modes Q0, Q1, Q2, and Q3.

In another example, the TU with residual has a transform type set including four transform types, and the four transform types are the same for each transform mode among Q0, Q1, Q2, and Q3. The transform type used by the TU with residual is signaled in bitstream, e.g., signaled by two flags or signaled by truncated unary code. The four transform types are as follows.

Transform type 1: a horizontal transform of the residual TU is DST-7 and a vertical transform of the residual TU is DST-7, denoted as DST-7/DST-7.

Transform type 2: a horizontal transform of the residual TU is DST-7 and a vertical transform of the residual TU is DCT-8, denoted as DST-7/DCT-8.

Transform type 3: a horizontal transform of the residual TU is DCT-8 and a vertical transform of the residual TU is DST-7, denoted as DCT-8/DST-7.

Transform type 4: a horizontal transform of the residual TU is DCT-8 and a vertical transform of the residual TU is DCT-8, denoted as DCT-8/DCT-8.

In an alternative embodiment, DST-7 may be replaced with DST-4, and DCT-8 may be replaced with DCT-4 throughout the present disclosure. Accordingly, in one example, the new transform modes include the following four modes Q0, Q1, Q2, and Q3, as illustrated in FIG. 6. For each of the four modes, a CU of size W×H is divided into 4 TUs of size (W/2)×(H/2), namely the top-left TU0, the top-right TU1, the bottom-left TU2, and the bottom-right TU3. Only one of the TU0, TU1, TU2, and TU3 has residual. The TU with residual has a transform type set including two transform types, namely a first transform type and a second transform type, and the transform types are dependent on the transform mode (i.e., the transform type set are corresponding to the transform mode). The actual transform type used by the TU with residual is signaled in bitstream, e.g., signaled by a flag or an index.

1) Transform mode Q0: TU0 has residual; a first transform type is that the horizontal transform and vertical transform of TU0 are DCT-4 and DCT-4, respectively, and a second transform type is that the horizontal transform and vertical transform of TU0 are DST-4 and DST-4, respectively.

2) Transform mode Q1: TU1 has residual; a first transform type is that the horizontal transform and vertical transform of TU1 are DST-4 and DCT-4, respectively, and a second transform type is that the horizontal transform and vertical transform of TU1 are DCT-4 and DST-4, respectively.

3) Transform mode Q2: TU2 has residual; a first transform type is that the horizontal transform and vertical transform of TU2 are DCT-4 and DST-4, respectively, and a second transform type is that the horizontal transform and vertical transform of TU2 are DST-4 and DCT-4, respectively.

4) Transform mode Q3: TU3 has residual; a first transform type is that the horizontal transform and vertical transform of TU3 are DST-4 and DST-4, respectively, a second transform type is that the horizontal transform and vertical transform of TU3 are DCT-4 and DCT-4, respectively.

In this example, the second transform type is dependent on the first transform type. If the horizontal transform of the first transform type is DCT-4 (or DST-4), the horizontal transform of the second transform type is DST-4 (or DCT-4). If the vertical transform of the first transform type is DCT-4 (or DST-4), the vertical transform of the second transform type is DST-4 (or DCT-4).

In another example, the second transform type is always DCT-2/DCT-2 for Transform modes Q0, Q1, Q2, and Q3.

In another example, the TU with residual has a transform type set including four transform types, and the four transform types are the same for each transform mode among Q0, Q1, Q2, and Q3. The transform type used by the TU with residual is signaled in bitstream, e.g., signaled by two flags or signaled by truncated unary code. The four transform types are as follows.

Transform type 1: a horizontal transform of the residual TU is DST-4 and a vertical transform of the residual TU is DST-4, denoted as DST-4/DST-4.

Transform type 2: a horizontal transform of the residual TU is DST-4 and a vertical transform of the residual TU is DCT-4, denoted as DST-4/DCT-4.

Transform type 3: a horizontal transform of the residual TU is DCT-4 and a vertical transform of the residual TU is DST-4, denoted as DCT-4/DST-4.

Transform type 4: a horizontal transform of the residual TU is DCT-4 and a vertical transform of the residual TU is DCT-4, denoted as DCT-4/DCT-4.

For the TU having residual, coded block flags (cbf) of three components, i.e., the Cb, Cr, and Y components, may be parsed from bitstream, and the value of at least one cbf of the three components is 1. For each of the remaining TUs without residual, the cbfs of all color components are inferred to be 0, i.e., the cbfs are not parsed from bitstream.

Figure 7:
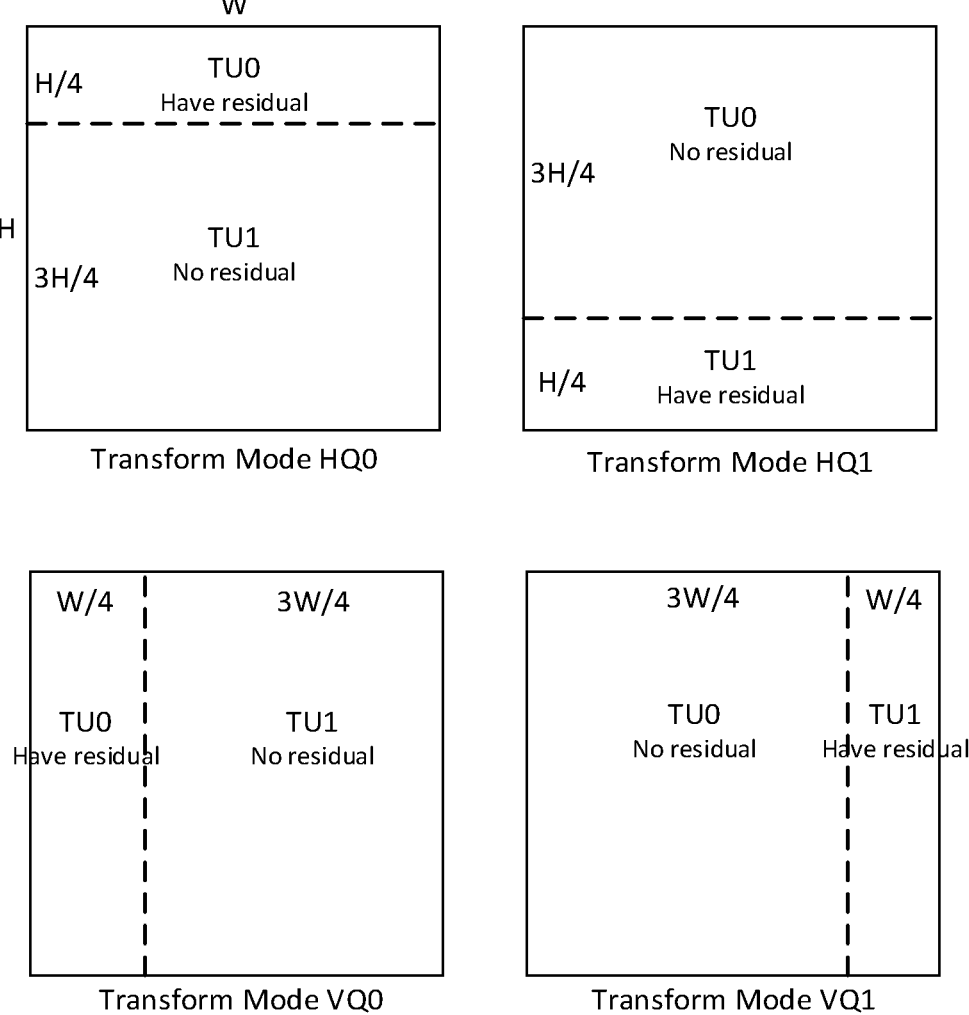
FIG. 7 illustrates transform modes HQ0, HQ1, VQ0 and VQ1.

In another example, the new transform modes include the following four modes HQ0, HQ1, VQ0, and VQ1, as illustrated in FIG. 7. For each of the four modes, a CU of size W×H is divided into two TUs of unequal size, and only the smaller-sized TU has residual. The TU with residual has a transform type set including two transform types, namely a first transform type and a second transform type, and the transform types are dependent on the transform mode. The actual transform type used by the TU with residual is signaled in bitstream, e.g., signaled by a flag.

1) Transform mode HQ0: the CU is divided by a horizontal split into two TUs, TU0 of size W×(H/4) and TU1 of size W×(3H/4); the top TU0 has residual; the transform type is selected from a transform type set; the transform type set includes two transform types, wherein a first transform type is that the horizontal transform of TU0 is a pre-defined core transform, e.g., DST-7 or DCT-2, and the vertical transform of TU0 is DCT-8; a second transform type is that the horizontal transform of TU0 is a pre-defined core transform, e.g., DCT-8 or DCT-2, and the vertical transform of TU0 is DST-7. As an example, the horizontal transform of the first transform type of TU0 is always DST-7 or is always DCT-2. As another example, the horizontal transform of the first transform type of TU0 is DCT-2 if the width of TU0 is larger than a threshold MaxMtsSize (e.g., MaxMtsSize=32), and the horizontal transform of the first transform type of TU0 is DST-7 if the width of TU0 is equal to or less than the threshold MaxMtsSize. As an example, the horizontal transform of the second transform type of TU0 is always DCT-8 or is always DCT-2. As another example, the horizontal transform of the second transform type of TU0 is DCT-2 if the width of TU0 is larger than a threshold MaxMtsSize (e.g., MaxMtsSize=32), and the horizontal transform of the second transform type of TU0 is DCT-8 if the width of TU0 is equal to or less than the threshold MaxMtsSize.

2) Transform mode HQ1: the CU is divided by a horizontal split into two TUs, TU0 of size W×(3H/4) and TU1 of size W×(H/4); the bottom TU1 has residual; the transform type is selected from a transform type set; the transform type set includes two transform types, wherein a first transform type is that the horizontal transform of TU1 is a pre-defined core transform, e.g., DST-7 or DCT-2, and the vertical transform of TU1 is DST-7; a second transform type is that the horizontal transform of TU1 is a pre-defined core transform, e.g., DCT-8 or DCT-2, and the vertical transform of TU1 is DCT-8.

3) Transform mode VQ0: the CU is divided by a vertical split into two TUs, TU0 of size (W/4)×H and TU1 of size (3 W/4)×H; the left TU0 has residual; the transform type is selected from a transform type set; the transform type set includes two transform types, wherein a first transform type is that the horizontal transform of TU0 is DCT-8, and the vertical transform of TU0 is a pre-defined core transform, e.g., DST-7 or DCT-2; a second transform type is that the horizontal transform of TU0 is DST-7, and the vertical transform of TU0 is a pre-defined core transform, e.g., DCT-8 or DCT-2. As an example, the vertical transform of the first transform type of TU0 is always DST-7 or is always DCT-2. As another example, the vertical transform of the first transform type of TU0 is DCT-2 if the height of TU0 is larger than a threshold MaxMtsSize (e.g., MaxMtsSize=32), and the vertical transform of the first transform type of TU0 is DST-7 if the height of TU0 is equal to or less than the threshold MaxMtsSize. As an example, the vertical transform of the second transform type of TU0 is always DCT-8 or is always DCT-2. As another example, the vertical transform of the second transform type of TU0 is DCT-2 if the height of TU0 is larger than a threshold MaxMtsSize (e.g., MaxMtsSize=32), and the vertical transform of the second transform type of TU0 is DCT-8 if the height of TU0 is equal to or less than the threshold MaxMtsSize.

4) Transform mode VQ1: the CU is divided by a vertical split into two TUs, TU0 of size (3 W/4)×H and TU1 of size (W/4)×H; the right TU1 has residual; the transform type is selected from a transform type set; the transform type set includes two transform types, wherein a first transform type is that the horizontal transform of TU1 is DST-7, and the vertical transform of TU1 is a pre-defined core transform, e.g., DST-7 or DCT-2; a second transform type is that the horizontal transform of TU1 is DCT-8, and the vertical transform of TU1 is a pre-defined core transform, e.g., DCT-8 or DCT-2.

In another example, the second transform type is always DCT-2/DCT-2 for HQ0, HQ1, VQ0, and VQ1.

In another example, the TU with residual has a transform type set including four transform types, e.g., DST-7/DST-7, DST-7/DCT-8, DCT-8/DST-7, and DCT-8/DCT-8, and the four transform types are the same for each transform mode among HQ0, HQ1, VQ0, and VQ1.

In an alternative embodiment, DST-7 may be replaced with DST-4, and DCT-8 may be replaced with DCT-4 throughout the present disclosure. Accordingly, in another example, the new transform modes include the following four modes HQ0, HQ1, VQ0, and VQ1, as illustrated in FIG. 7. For each of the four modes, a CU of size W×H is divided into two TUs of unequal size, and only the smaller-sized TU has residual. The TU with residual has a transform type set including two transform types, namely a first transform type and a second transform type, and the transform types are dependent on the transform mode. The actual transform type used by the TU with residual is signaled in bitstream, e.g., signaled by a flag.

1) Transform mode HQ0: the CU is divided by a horizontal split into two TUs, TU0 of size W×(H/4) and TU1 of size W×(3H/4); the top TU0 has residual; the transform type is selected from a transform type set; the transform type set includes two transform types, wherein a first transform type is that the horizontal transform of TU0 is a pre-defined core transform, e.g., DST-4 or DCT-2, and the vertical transform of TU0 is DCT-4; a second transform type is that the horizontal transform of TU0 is a pre-defined core transform, e.g., DCT-4 or DCT-2, and the vertical transform of TU0 is DST-4. As an example, the horizontal transform of the first transform type of TU0 is always DST-4 or is always DCT-2. As another example, the horizontal transform of the first transform type of TU0 is DCT-2 if the width of TU0 is larger than a threshold MaxMtsSize (e.g., MaxMtsSize=32), and the horizontal transform of the first transform type of TU0 is DST-4 if the width of TU0 is equal to or less than the threshold MaxMtsSize. As an example, the horizontal transform of the second transform type of TU0 is always DCT-4 or is always DCT-2. As another example, the horizontal transform of the second transform type of TU0 is DCT-2 if the width of TU0 is larger than a threshold MaxMtsSize (e.g., MaxMtsSize=32), and the horizontal transform of the second transform type of TU0 is DCT-4 if the width of TU0 is equal to or less than the threshold MaxMtsSize.

2) Transform mode HQ1: the CU is divided by a horizontal split into two TUs, TU0 of size W×(3H/4) and TU1 of size W×(H/4); the bottom TU1 has residual; the transform type is selected from a transform type set; the transform type set includes two transform types, wherein a first transform type is that the horizontal transform of TU1 is a pre-defined core transform, e.g., DST-4 or DCT-2, and the vertical transform of TU1 is DST-4; a second transform type is that the horizontal transform of TU1 is a pre-defined core transform, e.g., DCT-4 or DCT-2, and the vertical transform of TU1 is DCT-4.

3) Transform mode VQ0: the CU is divided by a vertical split into two TUs, TU0 of size (W/4)×H and TU1 of size (3 W/4)×H; the left TU0 has residual; the transform type is selected from a transform type set; the transform type set includes two transform types, wherein a first transform type is that the horizontal transform of TU0 is DCT-4, and the vertical transform of TU0 is a pre-defined core transform, e.g., DST-4 or DCT-2; a second transform type is that the horizontal transform of TU0 is DST-4, and the vertical transform of TU0 is a pre-defined core transform, e.g., DCT-4 or DCT-2. As an example, the vertical transform of the first transform type of TU0 is always DST-4 or is always DCT-2. As another example, the vertical transform of the first transform type of TU0 is DCT-2 if the height of TU0 is larger than a threshold MaxMtsSize (e.g., MaxMtsSize=32), and the vertical transform of the first transform type of TU0 is DST-4 if the height of TU0 is equal to or less than the threshold MaxMtsSize. As an example, the vertical transform of the second transform type of TU0 is always DCT-4 or is always DCT-2. As another example, the vertical transform of the second transform type of TU0 is DCT-2 if the height of TU0 is larger than a threshold MaxMtsSize (e.g., MaxMtsSize=32), and the vertical transform of the second transform type of TU0 is DCT-4 if the height of TU0 is equal to or less than the threshold MaxMtsSize.

4) Transform mode VQ1: the CU is divided by a vertical split into two TUs, TU0 of size (3 W/4)×H and TU1 of size (W/4)×H; the right TU1 has residual; the transform type is selected from a transform type set; the transform type set includes two transform types, wherein a first transform type is that the horizontal transform of TU1 is DST-4, and the vertical transform of TU1 is a pre-defined core transform, e.g., DST-4 or DCT-2; a second transform type is that the horizontal transform of TU1 is DCT-4, and the vertical transform of TU1 is a pre-defined core transform, e.g., DCT-4 or DCT-2.

In another example, the second transform type is always DCT-2/DCT-2 for HQ0, HQ1, VQ0, and VQ1.

In another example, the TU with residual has a transform type set including four transform types, e.g., DST-4/DST-4, DST-4/DCT-4, DCT-4/DST-4, and DCT-4/DCT-4, and the four transform types are the same for each transform mode among HQ0, HQ1, VQ0, and VQ1.

It should be noted that a DST or DCT transform can be implemented using matrix multiplication, or can be implemented using partial butter-fly structure, or can be implemented as transform adjustment filtering with inverse DCT-2 transform as introduced in Joint Video Exploration Team (JVET)-L0386. The method in JVET-L0386 is a way to approximate a target DST type (e.g., DST-7) or a target DCT type (e.g., DCT-8 or DCT-4) with an adjustment filter as pre-processing and inverse of DCT-2.

Figure 8:
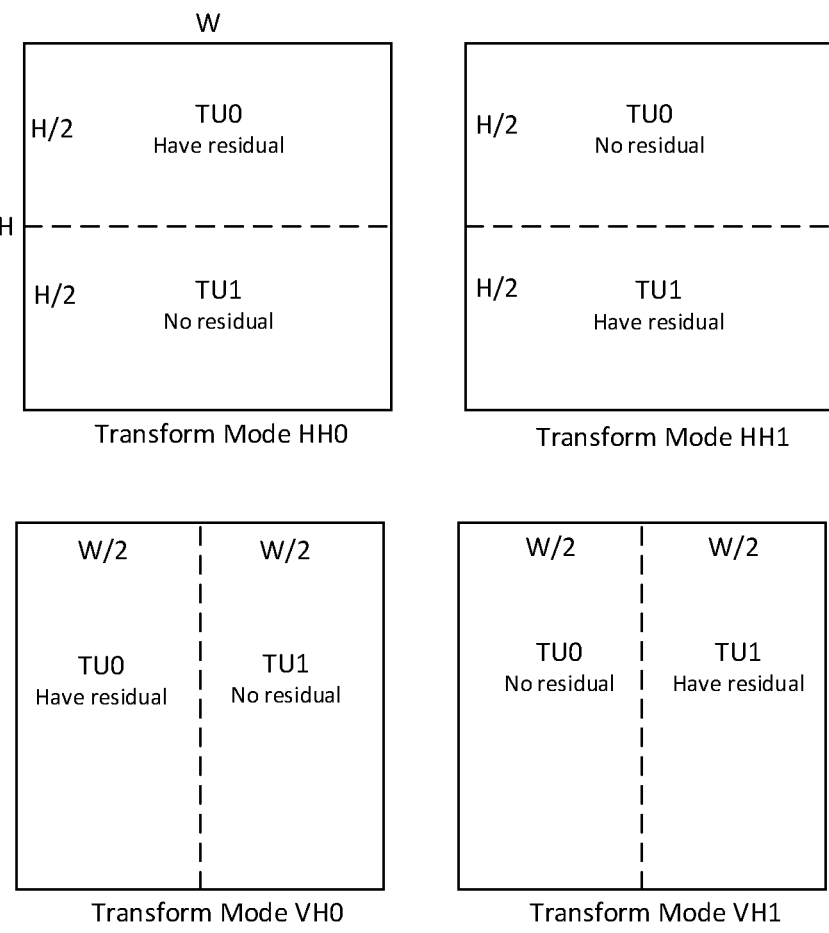
FIG. 8 illustrates transform modes HH0, HH1, VH0 and VH1.

In one example, the new transform modes include the following four modes HH0, HH1, VH0, and VH1, as illustrated in FIG. 8. For each of the four modes, a CU of size W×H is divided into two TUs of equal size, and only one TU has residual. The TU with residual has a transform type set including two transform types, namely a first transform type and a second transform type, and the transform types (i.e., the transform type set) are dependent on the transform mode. The actual transform type used by the TU with residual is signaled in bitstream, e.g., signaled by a flag.

1) Transform mode HH0: the CU is divided by a horizontal split into two TUs, TU0 of size W×(H/2) and TU1 of size W×(H/2); the top TU0 has residual; the transform type is selected from a transform type set; the transform type set includes two transform types, wherein a first transform type is that the horizontal transform of TU0 is a pre-defined core transform, e.g., DST-7 or DCT-2, and the vertical transform of TU0 is DCT-8; a second transform type is that the horizontal transform of TU0 is a pre-defined core transform, e.g., DCT-8 or DCT-2, and the vertical transform of TU0 is DST-7. As an example, the horizontal transform of the first transform type of TU0 is always DST-7 or is always DCT-2. As another example, the horizontal transform of the first transform type of TU0 is DCT-2 if the width of TU0 is larger than a threshold MaxMtsSize (e.g., MaxMtsSize=32), and the horizontal transform of the first transform type of TU0 is DST-7 if the width of TU0 is equal to or less than the threshold MaxMtsSize. As an example, the horizontal transform of the second transform type of TU0 is always DCT-8 or is always DCT-2. As another example, the horizontal transform of the second transform type of TU0 is DCT-2 if the width of TU0 is larger than a threshold MaxMtsSize (e.g., MaxMtsSize=32), and the horizontal transform of the second transform type of TU0 is DCT-8 if the width of TU0 is equal to or less than the threshold MaxMtsSize.

2) Transform mode HH1: the CU is divided by a horizontal split into two TUs, TU0 of size W×(H/2) and TU1 of size W×(H/2); the bottom TU1 has residual; the transform type is selected from a transform type set; the transform type set includes two transform types, wherein a first transform type is that the horizontal transform of TU1 is a pre-defined core transform, e.g., DST-7 or DCT-2, and vertical transform of TU1 is DST-7; a second transform type is that the horizontal transform of TU1 is a pre-defined core transform, e.g., DCT-8 or DCT-2, and vertical transform of TU1 is DCT-8.

3) Transform mode VH0: the CU is divided by a vertical split into two TUs, TU0 of size (W/2)×H and TU1 of size (W/2)×H; the left TU0 has residual; the transform type is selected from a transform type set; the transform type set includes two transform types, wherein a first transform type is that the horizontal transform of TU0 is DCT-8, and vertical transform of TU0 is a pre-defined core transform, e.g., DST-7 or DCT-2; a second transform type is that the horizontal transform of TU0 is DST-7, and vertical transform of TU0 is a pre-defined core transform, e.g., DCT-8 or DCT-2. As an example, the vertical transform of the first transform type of TU0 is always DST-7 or is always DCT-2. As another example, the vertical transform of the first transform type of TU0 is DCT-2 if the height of TU0 is larger than a threshold MaxMtsSize (e.g., MaxMtsSize=32), and the vertical transform of the first transform type of TU0 is DST-7 if the height of TU0 is equal to or less than the threshold MaxMtsSize. As an example, the vertical transform of the second transform type of TU0 is always DCT-8 or is always DCT-2. As another example, the vertical transform of the second transform type of TU0 is DCT-2 if the height of TU0 is larger than a threshold MaxMtsSize (e.g., MaxMtsSize=32), and the vertical transform of the second transform type of TU0 is DCT-8 if the height of TU0 is equal to or less than the threshold MaxMtsSize.

4) Transform mode VH1: the CU is divided by a vertical split into two TUs, TU0 of size $(W/2) \times H$ and TU1 of size $(W/2) \times H$; the right TU1 has residual; the transform type is selected from a transform type set; the transform type set includes two transform types, wherein a first transform type is that the horizontal transform of TU1 is DST-7, and vertical transform of TU1 is a pre-defined core transform, e.g., DST-7 or DCT-2; a second transform type is that the horizontal transform of TU1 is DCT-8, and vertical transform of TU1 is a pre-defined core transform, e.g., DCT-8 or DCT-2.

In an alternative embodiment, DST-7 may be replaced with DST-4, and DCT-8 may be replaced with DCT-4 throughout the present disclosure. Accordingly, in one example, the new transform modes include the following four modes HH0, HH1, VH0, and VH1, as illustrated in FIG. 8. For each of the four modes, a CU of size $W \times H$ is divided into two TUs of equal size, and only one TU has residual. The TU with residual has a transform type set including two transform types, namely a first transform type and a second transform type, and the transform types (i.e., the transform type set) are dependent on the transform mode. The actual transform type used by the TU with residual is signaled in bitstream, e.g., signaled by a flag.

1) Transform mode HH0: the CU is divided by a horizontal split into two TUs, TU0 of size $W \times (H/2)$ and TU1 of size $W \times (H/2)$; the top TU0 has residual; the transform type is selected from a transform type set; the transform type set includes two transform types, wherein a first transform type is that the horizontal transform of TU0 is a pre-defined core transform, e.g., DST-4 or DCT-2, and the vertical transform of TU0 is DCT-4; a second transform type is that the horizontal transform of TU0 is a pre-defined core transform, e.g., DCT-4 or DCT-2, and the vertical transform of TU0 is DST-4. As an example, the horizontal transform of the first transform type of TU0 is always DST-4 or is always DCT-2. As another example, the horizontal transform of the first transform type of TU0 is DCT-2 if the width of TU0 is larger than a threshold MaxMtsSize (e.g., MaxMtsSize=32), and the horizontal transform of the first transform type of TU0 is DST-4 if the width of TU0 is equal to or less than the threshold MaxMtsSize. As an example, the horizontal transform of the second transform type of TU0 is always DCT-4 or is always DCT-2. As another example, the horizontal transform of the second transform type of TU0 is DCT-2 if the width of TU0 is larger than a threshold MaxMtsSize (e.g., MaxMtsSize=32), and the horizontal transform of the second transform type of TU0 is DCT-4 if the width of TU0 is equal to or less than the threshold MaxMtsSize.

2) Transform mode HH1: the CU is divided by a horizontal split into two TUs, TU0 of size $W \times (H/2)$ and TU1 of size $W \times (H/2)$; the bottom TU1 has residual; the transform type is selected from a transform type set; the transform type set includes two transform types, wherein a first transform type is that the horizontal transform of TU1 is a pre-defined core transform, e.g., DST-4 or DCT-2, and vertical transform of TU1 is DST-4; a second transform type is that the horizontal transform of TU1 is a pre-defined core transform, e.g., DCT-4 or DCT-2, and vertical transform of TU1 is DCT-4.

3) Transform mode VH0: the CU is divided by a vertical split into two TUs, TU0 of size $(W/2) \times H$ and TU1 of size $(W/2) \times H$; the left TU0 has residual; the transform type is selected from a transform type set; the transform type set includes two transform types, wherein a first transform type is that the horizontal transform of TU0 is DCT-4, and vertical transform of TU0 is a pre-defined core transform, e.g., DST-4 or DCT-2; a second transform type is that the horizontal transform of TU0 is DST-4, and vertical transform of TU0 is a pre-defined core transform, e.g., DCT-4 or DCT-2. As an example, the vertical transform of the first transform type of TU0 is always DST-4 or is always DCT-2. As another example, the vertical transform of the first transform type of TU0 is DCT-2 if the height of TU0 is larger than a threshold MaxMtsSize (e.g., MaxMtsSize=32), and the vertical transform of the first transform type of TU0 is DST-4 if the height of TU0 is equal to or less than the threshold MaxMtsSize. As an example, the vertical transform of the second transform type of TU0 is always DCT-4 or is always DCT-2. As another example, the vertical transform of the second transform type of TU0 is DCT-2 if the height of TU0 is larger than a threshold MaxMtsSize (e.g., MaxMtsSize=32), and the vertical transform of the second transform type of TU0 is DCT-4 if the height of TU0 is equal to or less than the threshold MaxMtsSize.

4) Transform mode VH1: the CU is divided by a vertical split into two TUs, TU0 of size $(W/2) \times H$ and TU1 of size $(W/2) \times H$; the right TU1 has residual; the transform type is selected from a transform type set; the transform type set includes two transform types, wherein a first transform type is that the horizontal transform of TU1 is DST-4, and vertical transform of TU1 is a pre-defined core transform, e.g., DST-4 or DCT-2; a second transform type is that the horizontal transform of TU1 is DCT-4, and vertical transform of TU1 is a pre-defined core transform, e.g., DCT-4 or DCT-2.

In another example, the second transform type is always DCT-2/DCT-2 for HH0, HH1, VH0, and VH1.

In another example, the TU with residual has a transform type set including four transform types, e.g., DST-7/DST-7, DST-7/DCT-8, DCT-8/DST-7, and DCT-8/DCT-8, and the four transform types are the same for each transform mode among HH0, HH1, VH0, and VH1.

In an alternative embodiment, DST-7 may be replaced with DST-4, and DCT-8 may be replaced with DCT-4 throughout the present disclosure. Accordingly, in another example, the TU with residual has a transform type set including four transform types, e.g., DST-4/DST-4, DST-4/DCT-4, DCT-4/DST-4, and DCT-4/DCT-4, and the four transform types are the same for each transform mode among HH0, HH1, VH0, and VH1.

Figure 9:
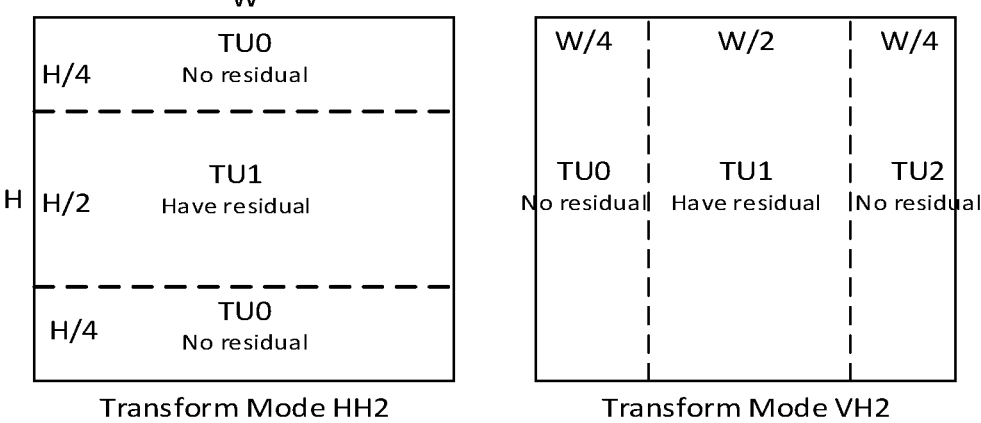
FIG. 9 illustrates transform modes HH2 and VH2.

In another example, the new transform modes include the following two modes HH2, and VH2, as illustrated in FIG. 9. For each of the two modes, a CU of size $W \times H$ is divided into three TUs, and only the TU of half size of the CU has residual. The TU with residual has a transform type set including two transform types, namely a first transform type and a second transform type, and the transform types are dependent on the transform mode. The actual transform type used by the TU with residual is signaled in bitstream, e.g., signaled by a flag.

1) Transform mode HH2: the CU is divided in horizontal direction into three TUs, TU0 of size $W \times (H/4)$, TU1 of size $W \times (H/2)$, TU2 of size $W \times (H/4)$; the center TU1 has residual; the transform type is selected from a transform type set; the transform type set includes two transform types, wherein a first transform type is that the horizontal transform and vertical transform of TU0 are DST-7 and DCT-2 (or DST-7 and DST-1), respectively; a second transform type is that the horizontal transform and vertical transform of TU0 are DCT-8 and DCT-2 (or DCT-8 and DST-1), respectively.

2) Transform mode VH2: the CU is divided in vertical direction into three TUs, TU0 of size $(W/4) \times H$, TU1 of size $(W/2) \times H$, and TU2 of size $(W/4) \times H$; the center TU1 has residual; the transform type is selected from a transform type set; the transform type set includes two transform types, wherein a first transform type is that the horizontal transform and vertical transform of TU1 are DCT-2 and DST-7 (or DST-1 and DST-7), respectively; a second transform type is that the horizontal transform and vertical transform of TU1 are DCT-2 and DCT-8 (or DST-1 and DCT-8), respectively.

In another example, the second transform type is always DCT-2/DCT-2 for HH2 and VH2.

In another example, the TU with residual has a transform type set including four transform types, e.g., DST-7/DST-7, DST-7/DCT-8, DCT-8/DST-7, and DCT-8/DCT-8, and the four transform types are the same for each transform mode between HH2 and VH2.

In an alternative embodiment, DST-7 may be replaced with DST-4, and DCT-8 may be replaced with DCT-4 throughout the present disclosure. Accordingly, in another example, the new transform modes include the following two modes HH2, and VH2, as illustrated in FIG. 9. For each of the two modes, a CU of size W×H is divided into three TUs, and only the TU of half size of the CU has residual. The TU with residual has a transform type set including two transform types, namely a first transform type and a second transform type, and the transform types are dependent on the transform mode. The actual transform type used by the TU with residual is signaled in bitstream, e.g., signaled by a flag.

1) Transform mode HH2: the CU is divided in horizontal direction into three TUs, TU0 of size W×(H/4), TU1 of size W×(H/2), TU2 of size W×(H/4); the center TU1 has residual; the transform type is selected from a transform type set; the transform type set includes two transform types, wherein a first transform type is that the horizontal transform and vertical transform of TU0 are DST-4 and DCT-2 (or DST-4 and DST-1), respectively; a second transform type is that the horizontal transform and vertical transform of TU0 are DCT-4 and DCT-2 (or DCT-4 and DST-1), respectively.

2) Transform mode VH2: the CU is divided in vertical direction into three TUs, TU0 of size (W/4)×H, TU1 of size (W/2)×H, and TU2 of size (W/4)×H; the center TU1 has residual; the transform type is selected from a transform type set; the transform type set includes two transform types, wherein a first transform type is that the horizontal transform and vertical transform of TU1 are DCT-2 and DST-4 (or DST-1 and DST-4), respectively; a second transform type is that the horizontal transform and vertical transform of TU1 are DCT-2 and DCT-4 (or DST-1 and DCT-4), respectively.

In another example, the second transform type is always DCT-2/DCT-2 for HH2 and VH2.

In another example, the TU with residual has a transform type set including four transform types, e.g., DST-4/DST-4, DST-4/DCT-4, DCT-4/DST-4, and DCT-4/DCT-4, and the four transform types are the same for each transform mode between HH2 and VH2.

Figure 10:
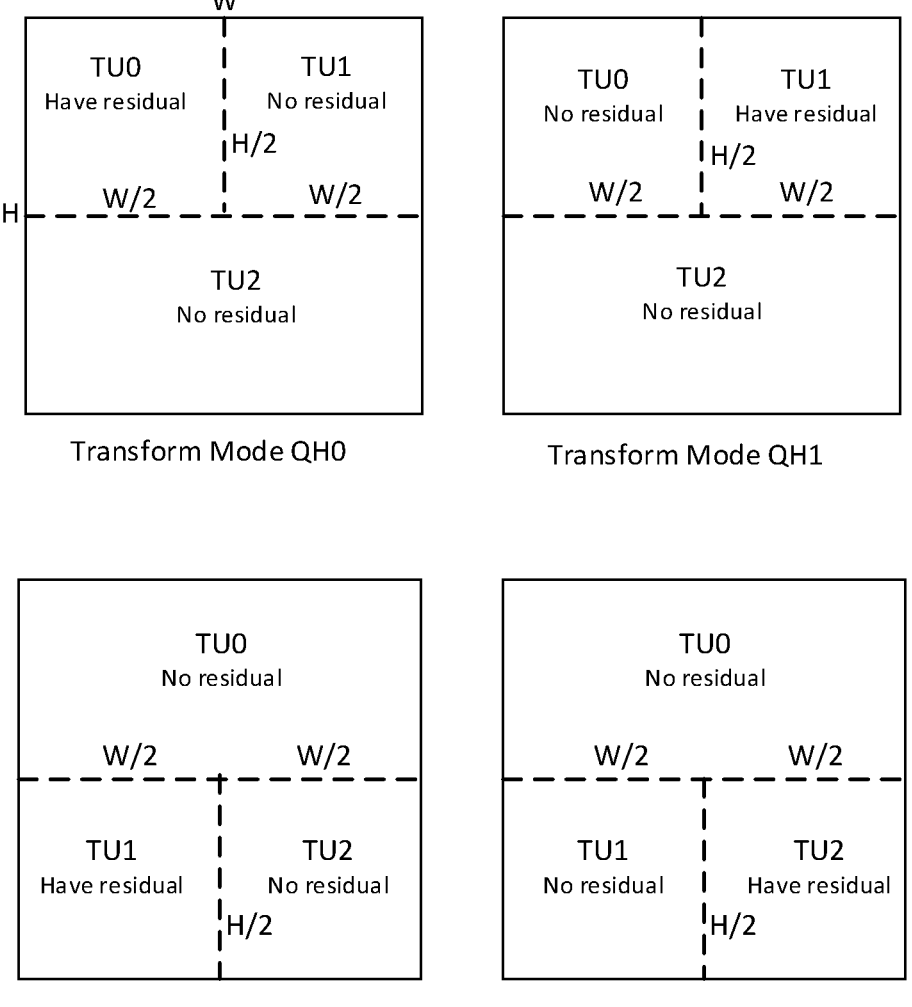
FIG. 10 illustrates transform modes QH0, QH1, QH2 and QH3.

In another example, the new transform modes include the following four modes QH0, QH1, QH2, and QH3, as illustrated in FIG. 10. For each of the four modes, a CU of size W×H is divided into 3 TUs, two of which are of size (W/2)×(H/2), and the other one is of size W×(H/2), namely TU0, TU1, and TU2. Only one of the TUs of size (W/2)× (H/2) has residual. The TU with residual has a transform type set including two transform types, namely a first transform type and a second transform type, and the transform types are dependent on the transform mode. The actual transform type used by the TU with residual is signaled in bitstream, e.g., signaled by a flag.

1) Transform mode QH0: the top-left TU0 has residual; the transform type is selected from a transform type set; the transform type set includes two transform types, wherein a first transform type is that the horizontal transform and vertical transform of TU0 are DCT-8 and DCT-8, respectively; a second transform type is that the horizontal transform and vertical transform of TU0 are DST-7 and DST-7, respectively.

2) Transform mode QH1: the top-right TU1 has residual; the transform type is selected from a transform type set; the transform type set includes two transform types, wherein a first transform type is that the horizontal transform and vertical transform of TU1 are DST-7 and DCT-8, respectively; a second transform type is that the horizontal transform and vertical transform of TU1 are DCT-8 and DST-7, respectively.

3) Transform mode QH2: the bottom-left TU1 has residual; the transform type is selected from a transform type set; the transform type set includes two transform types, wherein a first transform type is that the horizontal transform and vertical transform of TU1 are DCT-8 and DST-7, respectively; a second transform type is that the horizontal transform and vertical transform of TU1 are DST-7 and DCT-8, respectively.

4) Transform mode QH3: the bottom-right TU2 has residual; the transform type is selected from a transform type set; the transform type set includes two transform types, wherein a first transform type is that the horizontal transform and vertical transform of TU2 are DST-7 and DST-7, respectively; a second transform type is that the horizontal transform and vertical transform of TU2 are DCT-8 and DCT-8, respectively.

In another example, the second transform type is always DCT-2/DCT-2 for QH0, QH1, QH2, and QH3.

In another example, the TU with residual has a transform type set including four transform types, e.g., DST-7/DST-7, DST-7/DCT-8, DCT-8/DST-7, and DCT-8/DCT-8, and the four transform types are the same for each transform mode among QH0, QH1, QH2, and QH3.

In an alternative embodiment, DST-7 may be replaced with DST-4, and DCT-8 may be replaced with DCT-4 throughout the present disclosure. Accordingly, in another example, the new transform modes include the following four modes QH0, QH1, QH2, and QH3, as illustrated in FIG. 10. For each of the four modes, a CU of size W×H is divided into 3 TUs, two of which are of size (W/2)×(H/2), and the other one is of size W×(H/2), namely TU0, TU1, and TU2. Only one of the TUs of size (W/2)×(H/2) has residual. The TU with residual has a transform type set including two transform types, namely a first transform type and a second transform type, and the transform types are dependent on the transform mode. The actual transform type used by the TU with residual is signaled in bitstream, e.g., signaled by a flag.

1) Transform mode QH0: the top-left TU0 has residual; the transform type is selected from a transform type set; the transform type set includes two transform types, wherein a first transform type is that the horizontal transform and vertical transform of TU0 are DCT-4 and DCT-4, respectively; a second transform type is that the horizontal transform and vertical transform of TU0 are DST-4 and DST-4, respectively.

2) Transform mode QH1: the top-right TU1 has residual; the transform type is selected from a transform type set; the transform type set includes two transform types, wherein a first transform type is that the horizontal transform and vertical transform of TU1 are DST-4 and DCT-4, respectively; a second transform type is that the horizontal transform and vertical transform of TU1 are DCT-4 and DST-4, respectively.

3) Transform mode QH2: the bottom-left TU1 has residual; the transform type is selected from a transform type set; the transform type set includes two transform types, wherein a first transform type is that the horizontal transform and vertical transform of TU1 are DCT-4 and DST-4, respectively; a second transform type is that the horizontal transform and vertical transform of TU1 are DST-4 and DCT-4, respectively.

4) Transform mode QH3: the bottom-right TU2 has residual; the transform type is selected from a transform type set; the transform type set includes two transform types, wherein a first transform type is that the horizontal transform and vertical transform of TU2 are DST-4 and DST-4, respectively; a second transform type is that the horizontal transform and vertical transform of TU2 are DCT-4 and DCT-4, respectively.

In another example, the second transform type is always DCT-2/DCT-2 for QH0, QH1, QH2, and QH3.

In another example, the TU with residual has a transform type set including four transform types, e.g., DST-4/DST-4, DST-4/DCT-4, DCT-4/DST-4, and DCT-4/DCT-4, and the four transform types are the same for each transform mode among QH0, QH1, QH2, and QH3.

Figure 11:
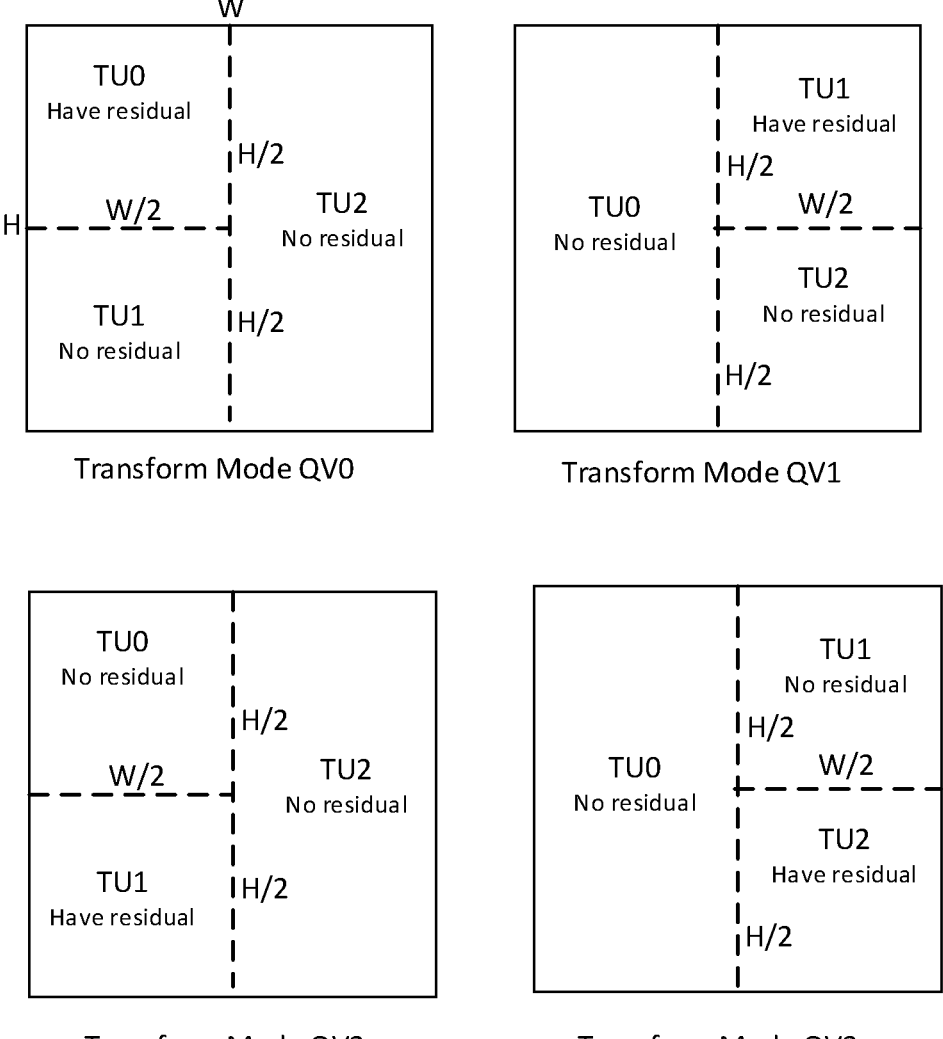
FIG. 11 illustrates transform modes QV0, QV1, QV2 and QV3.

In one example, the new transform modes include the following four modes QV0, QV1, QV2 and QV3, as illustrated in FIG. 11. For each of the four modes, a CU of size W×H is divided into 3 TUs, two of which are of size (W/2)×(H/2), and the other one is of size (W/2)×H, namely TU0, TU1, and TU2. Only one of the TUs of size (W/2)×(H/2) has residual. The TU with residual has a transform type set including two transform types, namely a first transform type and a second transform type, and the transform types are dependent on the transform mode. The actual transform type used by the TU with residual is signaled in bitstream, e.g., signaled by a flag.

1) Transform mode QV0: the top-left TU0 has residual; the transform type is selected from a transform type set; the transform type set includes two transform types, wherein a first transform type is that the horizontal transform and vertical transform of TU0 are DCT-8 and DCT-8, respectively; a second transform type is that the horizontal transform and vertical transform of TU0 are DST-7 and DST-7, respectively.

2) Transform mode QV1: the top-right TU1 has residual; the transform type is selected from a transform type set; the transform type set includes two transform types, wherein a first transform type is that the horizontal transform and vertical transform of TU1 are DST-7 and DCT-8, respectively; a second transform type is that the horizontal transform and vertical transform of TU1 are DCT-8 and DST-7, respectively.

3) Transform mode QV2: the bottom-left TU1 has residual; the transform type is selected from a transform type set; the transform type set includes two transform types, wherein a first transform type is that the horizontal transform and vertical transform of TU1 are DCT-8 and DST-7, respectively; a second transform type is that the horizontal transform and vertical transform of TU1 are DST-7 and DCT-8, respectively.

4) Transform mode QV3: the bottom-right TU2 has residual; the transform type is selected from a transform type set; the transform type set includes two transform types, wherein a first transform type is that the horizontal transform and vertical transform of TU2 are DST-7 and DST-7, respectively; a second transform type is that the horizontal transform and vertical transform of TU2 are DCT-8 and DCT-8, respectively.

In another example, the second transform type is always DCT-2/DCT-2 for QV0, QV1, QV2, and QV3.

In another example, the TU with residual has a transform type set including four transform types, e.g., DST-7/DST-7, DST-7/DCT-8, DCT-8/DST-7, and DCT-8/DCT-8, and the four transform types are the same for each transform mode among QV0, QV1, QV2, and QV3.

In an alternative embodiment, DST-7 may be replaced with DST-4, and DCT-8 may be replaced with DCT-4 throughout the present disclosure. Accordingly, in one example, the new transform modes include the following four modes QV0, QV1, QV2, and QV3, as illustrated in FIG. 11. For each of the four modes, a CU of size W×H is divided into 3 TUs, two of which are of size (W/2)×(H/2), and the other one is of size (W/2)×H, namely TU0, TU1 and TU2. Only one of the TUs of size (W/2)×(H/2) has residual. The TU with residual has a transform type set including two transform types, namely a first transform type and a second transform type, and the transform types are dependent on the transform mode. The actual transform type used by the TU with residual is signaled in bitstream, e.g., signaled by a flag.

1) Transform mode QV0: the top-left TU0 has residual; the transform type is selected from a transform type set; the transform type set includes two transform types, wherein a first transform type is that the horizontal transform and vertical transform of TU0 are DCT-4 and DCT-4, respectively; a second transform type is that the horizontal transform and vertical transform of TU0 are DST-4 and DST-4, respectively.

2) Transform mode QV1: the top-right TU1 has residual; the transform type is selected from a transform type set; the transform type set includes two transform types, wherein a first transform type is that the horizontal transform and vertical transform of TU1 are DST-4 and DCT-4, respectively; a second transform type is that the horizontal transform and vertical transform of TU1 are DCT-4 and DST-4, respectively.

3) Transform mode QV2: the bottom-left TU1 has residual; the transform type is selected from a transform type set; the transform type set includes two transform types, wherein a first transform type is that the horizontal transform and vertical transform of TU1 are DCT-4 and DST-4, respectively; a second transform type is that the horizontal transform and vertical transform of TU1 are DST-4 and DCT-4, respectively.

4) Transform mode QV3: the bottom-right TU2 has residual; the transform type is selected from a transform type set; the transform type set includes two transform types, wherein a first transform type is that the horizontal transform and vertical transform of TU2 are DST-4 and DST-4, respectively; a second transform type is that the horizontal transform and vertical transform of TU2 are DCT-4 and DCT-4, respectively.

In another example, the second transform type is always DCT-2/DCT-2 for QV0, QV1, QV2, and QV3.

In another example, the TU with residual has a transform type set including four transform types, e.g., DST-4/DST-4, DST-4/DCT-4, DCT-4/DST-4, and DCT-4/DCT-4, and the four transform types are the same for each transform mode among QV0, QV1, QV2, and QV3.

In one example, the new transform modes allowed for CUs include 6 modes among the above-mentioned modes: HH0, HH1, HH2, VH0, VH1, and VH2. A slice-level flag may be used to signal whether the 6 transform modes are allowed for a particular slice. Where the new transform modes allowed for CUs means that when decoding a CU, the target transform mode for the residual TU of the CU can be obtained among the new transform modes allowed for CUs. The new transform modes allowed for CUs may be a subset of the above mentioned 22 transform modes, thus can reduce the candidate transform modes for the target transform mode, in order to improve the decoding efficiency, and reduce the bits needed for transmitting the index/indices for indicating the target transform mode, in order to saving the bandwidth needed for transmitting the encoded video data. It should be noted that, the new transform modes allowed for CUs may be pre-defined/preset or determined in real time, when the new transform modes allowed for CUs are pre-defined/preset/determined, the decoder will know which new transform modes are candidate transform modes for the residual TU of the CU.

In one example, the new transform modes allowed for CUs include 8 modes among the above-mentioned modes: Q0, Q1, Q2, Q3, HQ0, HQ1, VQ0, and VQ1.

In one example, the new transform modes allowed for CUs include 8 modes among the above-mentioned modes: QH0, QH1, QH2, QH3, HQ0, HQ1, VQ0, and VQ1.

In one example, the new transform modes allowed for CUs include 8 modes among the above-mentioned modes: QV0, QV1, QV2, QV3, HQ0, HQ1, VQ0, and VQ1.

In one example, the new transform modes allowed for CUs include 8 modes among the above-mentioned transform modes: HH0, HH1, VH0, VH1, HQ0, HQ1, VQ0, and VQ1.

In one example, the new transform modes allowed for CUs include 12 modes among the above-mentioned modes: Q0, Q1, Q2, Q3, HQ0, HQ1, VQ0, VQ1, HH0, HH1, VH0, and VH1.

In one example, the new transform modes allowed for CUs include 14 modes among the above-mentioned modes: Q0, Q1, Q2, Q3, HQ0, HQ1, VQ0, VQ1, HH0, HH1, HH2, VH0, VH1, and VH2.

In one example, the new transform modes allowed for CUs include 14 modes among the above-mentioned modes: QH0, QH1, QH2, QH3, HQ0, HQ1, VQ0, VQ1, HH0, HH1, HH2, VH0, VH1, and VH2.

In one example, the new transform modes allowed for a plurality of CUs in a slice are signaled in sequence parameter set (SPS) or the slice header of the slice. Modes HH0, HH1, HH2, VH0, VH1, and VH2 are grouped as a first group. Modes Q0, Q1, Q2, Q3, HQ0, HQ1, VQ0, and VQ1 are grouped as a second group. The enabling of each group is signaling by one flag, i.e., a first flag is signaled to indicate whether the first group of modes is allowed, and a second flag is signaled to indicate whether the second group of modes is allowed.

In one example, the new transform modes allowed for a plurality of CUs in a slice are signaled in sequence parameter set or the slice header of the slice. Modes HH0, HH1, VH0, and VH1 are grouped as a first group. Modes Q0, Q1, Q2, and Q3 are grouped as a second group. Modes HQ0, HQ1, VQ0, and VQ1 are grouped as a third group. One index is signaled to indicate which of the three groups are allowed. Index value 0 indicates all three groups are not allowed, index value 1 indicates only the first group is allowed, index value 2 indicates the second group is allowed, index value 3 indicates the third group is allowed, index value 4 indicates the second and the third groups are allowed, and index value 5 indicates all the three groups are allowed.

The new transform modes may be applied to all CUs or applied to CUs according to the prediction information of the CU. In one example, the new transform modes are applied to intra-predicted CUs only. In another example, the new transform modes are applied to inter-predicted CUs only. In another example, the new transform modes may be allowed to CUs using a specific inter prediction method (e.g., translation model based motion compensation) but not allowed to CUs using another inter prediction method (e.g., affine model based motion compensation). In another example, the new transform modes may be allowed for CUs predicted by Merge mode or by AMVP mode with ¼-pel motion vector difference precision, but not allowed for CUs using affine merge mode, affine inter mode or AMVP mode with 1-pel or 4-pel motion vector difference precision. In another example, the new transform modes may be allowed for CUs using Merge mode with a merge index smaller than 2, but not allowed for CUs using Merge mode with a merge index not smaller than 2. The Merge mode and AMVP mode can be referred to in H.265/HEVC standard. Affine merge mode and affine inter mode can be referred to in Joint Exploration Model (JEM) codec from JVET.

The new transform modes may be allowed according to the size of the CU. In one example, if a CU being tiled by one of the transform mode results in a TU with one side smaller than a threshold (e.g., 4, or 8, or 16 luma pixels, etc.), the transform mode is not allowed for the CU. In one example, if a CU being tiled by one of the transform mode results in a TU with one side larger than a threshold (e.g., 32, or 64, or 128 luma pixels, etc.), the transform mode is not allowed for the CU. In one example, a CU with one side (i.e., width or height) larger than a threshold (e.g., 32 or 64 luma pixels) is not allowed to use the new transform modes.

FIG. 12 illustrates a decoding method of an embodiment of present disclosure, where the decoding method includes the following steps.

1201. Parsing a received bitstream to obtain prediction information of a CU.

This is commonly used process in video decoding, such as parsing coding unit and prediction unit syntax structure in H.265/HEVC or H.266/VVC.

1202. Obtaining a target transform mode of the residual TU when the CU has only one residual transform unit (TU) and the size of the residual TU is less than the size of the CU; wherein the target transform mode specifies a TU partitioning mode of the CU, the position of the residual TU (e.g., described by the index of the residual TU among all the TUs of the CU, or described by the coordinates of the top-left corner of the residual TU and the width and height of the residual TU), and a transform type of the residual TU.

The target transform mode is any one of the above mentioned modes: Q0, Q1, Q2, Q3, HQ0, HQ1, VQ0, VQ1, HH0, HH1, VH0, VH1, HH2, VH2, QH0, QH1, QH2, QH3, QV0, QV1, QV2, and QV3.

In some embodiments, in order to improve decoding efficiency, the presence of transform unit information in the CU is first checked. Where The presence of transform unit information may be indicated by a root cbf syntax element. Root cbf equal to 0 indicates that the transform unit information of the CU is not present in the bitstream (i.e., the CU does not have residual), while root cbf equal to 1 indicates that the transform unit information of the CU is present in the bitstream. For an inter-predicted CU, root cbf equal to 1 implies that the CU has residual. Step 1102 is performed when the CU has transform unit information. When the CU does not have transform unit information, the residual of the CU is set as zero and step 1105 is directly performed.

1203. Parsing the received bitstream to obtain transform coefficients of the residual TU.

This is commonly used process in video decoding.

1204. Applying an inverse quantization to the transform coefficients of the residual TU to obtain dequantized coefficients.

This is commonly used process in video decoding.

1205. Applying, based on the target transform mode, an inverse transform to the dequantized coefficients to obtain a residual block of the residual TU.

This is commonly used process in video decoding. Besides the residual TU, the residuals of the other TUs of the CU are set as zero.

1206. Obtaining a prediction block of the CU based on the prediction information.

This is commonly used process in video decoding, such as the intra prediction and inter prediction in HEVC and VVC.

1207. Obtaining a video block based on the residual block and the prediction block.

This is commonly used process in video decoding. In one embodiment, the video block is obtained by adding the residual of the CU with the prediction of the CU.

1208. Outputting a video sequence, the video sequence including a video frame that includes the video block.

This is commonly used process in video decoding.

FIG. 12B illustrates another decoding method of an embodiment of present disclosure. The difference between the embodiment as shown in FIG. 12B and the embodiment as shown in FIG. 12A lies in the following.

1202'. Obtaining a target transform mode of the residual TU when the CU has only one residual transform unit (TU) and the size of the residual TU is less than the size of the CU; wherein the target transform mode specifies a TU partitioning mode of the CU, the position of the residual TU (e.g., described by the index of the residual TU among all the TUs of the CU, or described by the coordinates of the top-left corner of the residual TU and the width and height of the residual TU), and a transform type set of the residual TU; and obtaining a transform type of the residual TU from the transform type set.

1205'. Applying, based on the transform type of the residual TU (or based on the TU partitioning mode of the CU, the position of the residual TU and the transform type of the residual TU), an inverse transform to the dequantized coefficients to obtain a residual block of the residual TU. The other steps are made reference to the embodiment as shown in FIG. 12A, it is not repeated here.

In one embodiment, obtaining the target transform mode of the residual TU comprises: parsing the bitstream to obtain a mode index for indicating the target transform mode of the residual TU; and obtaining the target transform mode of the residual TU based on the mode index. For example, if 8 modes among the above mentioned 22 target transform modes if allowed to be used in a slice, the mode index may be indicated by a mode index with M bins (e.g., M=3, 4 or 5), i.e., the mode index is binarized into M bins in Context-based Adaptive Binary Arithmetic Coding (CABAC) process (where M may be different for different binarization schemes), or the mode index may be expressed by M flags.

In order to reduce the bit budget of the mode index, in another embodiment, before parsing the bitstream to obtain a mode index for indicating the target transform mode of the residual TU, the method further comprising: determining candidate target transform modes of the residual TU based on a size of the CU. Additionally, the parsing the bitstream to obtain a mode index for indicating the target transform mode of the residual TU comprises: parsing, based on the candidate target transform modes of the residual TU, the bitstream to obtain a mode index for indicating the target transform mode of the residual TU. Therefore, depending on the size of the CU, the quantity of the candidate target transform modes may be smaller than 8, thus 1 or more bins of the mode flag may be saved.

The candidate target transform modes may be based on the CU size. For example, when a width of the CU is in the range of [Th1×2, Th3] and a height of the CU is in the range of [Th1×2, Th3], the candidate target transform modes may include transform mode Q0, transform mode Q1, transform mode Q2, and transform mode Q3.

For example, when a width of the CU is in the range of [Th1×4, Th3] and a height of the CU is in the range of [Th1, Th2], the candidate target transform modes may include transform mode VQ0, transform mode VQ1, and transform mode VH2.

For example, when a width of the CU is in the range of [Th1×2, Th2] and a height of the CU is in the range of [Th1, Th2], the candidate target transform modes may include transform mode VH0 and transform mode VH1.

For example, when a height of the CU is in the range of [Th1×4, Th3] and a width of the CU is in the range of [Th1, Th2], the candidate target transform modes may include transform mode HQ0, transform mode HQ1 and transform mode HH2.

For example, when a height of the CU is in the range of [Th1×2, Th2] and a width of the CU is in the range of [Th1, Th2], the candidate target transform modes may include transform mode HH0 and transform mode HH1.

For example, when a width of the CU is in the range of [Th1×2, Th2] and a height of the CU is in the range of [Th1×2, Th2], the candidate target transform modes may include mode transform mode Q0, transform mode Q1, transform mode Q2, and transform mode Q3.

For example, when a width of the CU is in the range of [Th1×4, Th2] and a height of the CU is in the range of [Th1, Th2], the candidate target transform modes may include transform mode VQ0, transform mode VQ1, and transform mode VH2.

For example, when a width of the CU is in the range of [Th1×2, Th2] and a height of the CU is in the range of [Th1, Th2], the candidate target transform modes may include transform mode VH0 and transform mode VH1/

For example, when a height of the CU is in the range of [Th1×4, Th2] and a width of the CU is in the range of [Th1, Th2], the candidate target transform modes may include transform mode HQ0, transform mode HQ1, and transform mode HH2.

For example, when a height of the CU is in the range of [Th1×2, Th2] and a width of the CU is in the range of [Th1, Th2], the candidate target transform modes may include transform mode HH0 and transform mode HH1.

Th1, Th2, and Th3 are pre-defined integer values, for example, Th1 is 4, 8, or 16; Th2 is 32, 64, or 128; and Th3 is 64, 128, or 256.

In another embodiment, in order to reduce the bit budget for indicating the target transform mode, the above mentioned 22 modes are grouped into mode groups. For example, the modes group may include at least one groups as following:

A mode group includes transform mode HH0, transform mode HH1, transform mode HH2, transform mode VH0, transform mode VH1, and transform mode VH2.

A mode group includes transform mode Q0, transform mode Q1, transform mode Q2, transform mode Q3, transform mode HQ0, transform mode HQ1, transform mode VQ0, and transform mode VQ1.

A mode group includes transform mode HH0, HH1, HH2, VH0, VH1 and VH2.

A mode group includes transform mode Q0, transform mode Q1, transform mode Q2, transform mode Q3, transform mode HQ0, transform mode HQ1, transform mode VQ0, and transform mode VQ1.

A mode group includes transform mode QH0, transform mode QH1, transform mode QH2, transform mode QH3, transform mode HQ0, transform mode HQ1, transform mode VQ0, and transform mode VQ1.

A mode group includes transform mode QV0, transform mode QV1, transform mode QV2, transform mode QV3, transform mode HQ0, transform mode HQ1, transform mode VQ0, and transform mode VQ1.

A mode group includes transform mode Q0, transform mode Q1, transform mode Q2, transform mode Q3, transform mode HQ0, transform mode HQ1, transform mode VQ0, transform mode VQ1, transform mode HH0, transform mode HH1, transform mode VH0 and transform mode VH1.

A mode group includes transform mode Q0, transform mode Q1, transform mode Q2, transform mode Q3, transform mode HQ0, transform mode HQ1, transform mode VQ0, transform mode VQ1, transform mode HH0, transform mode HH1, transform mode HH2, transform mode VH0, transform mode VH1, and transform mode VH2.

A mode group includes transform mode QH0, transform mode QH1, transform mode QH2, transform mode QH3, transform mode HQ0, transform mode HQ1, transform mode VQ0, transform mode VQ1, transform mode HH0, transform mode HH1, transform mode HH2, transform mode VH0, transform mode VH1, and transform mode VH2.

A mode group includes transform mode HH0, transform mode HH1, transform mode VH0, and transform mode VH1.

A mode group includes transform mode Q0, transform mode Q1, transform mode Q2, and transform mode Q3.

A mode group includes transform mode HQ0, transform mode HQ1, transform mode VQ0, and transform mode VQ1.

Additionally, the step of obtaining the target transform mode of the residual TU may include: parsing the bitstream to obtain a group index for indicating which mode group of the target transform mode belongs to; parsing the bitstream to obtain a mode index for indicating the target transform mode in the mode group; and obtaining the target transform mode based on the group index and the mode index.

In one embodiment, before parsing the bitstream to obtain a group index for indicating which mode group of the target transform mode belongs to, the method further comprises: determining at least one candidate mode groups of the residual TU based on a size of the CU; and correspondingly, parsing, based on the at least one candidate mode groups of the residual TU, the bitstream to obtain a group index for indicating which mode group of the target transform mode belongs to.

For example, when a width of the CU is in the range of [Th1×2, Th3] and a height of the CU is in the range of [Th1×2, Th3], the candidate mode groups comprise a mode group comprises transform mode Q0, transform mode Q1, transform mode Q2, and transform mode Q3.

For example, when a width of the CU is in the range of [Th1×4, Th3] and a height of the CU is in the range of [Th1, Th2], the candidate mode groups comprise a mode group comprises transform mode VQ0, transform mode VQ1, and transform mode VH2.

For example, when a width of the CU is in the range of [Th1×2, Th2] and a height of the CU is in the range of [Th1, Th2], the candidate mode groups comprise a mode group comprises transform mode VH0 and transform mode VH1.

For example, when a height of the CU is in the range of [Th1×4, Th3] and a width of the CU is in the range of [Th1, Th2], the candidate mode groups comprise a mode group comprises transform mode HQ0, transform mode HQ1, and transform mode HH2.

For example, when a height of the CU is in the range of [Th1×2, Th2] and a width of the CU is in the range of [Th1, Th2], the candidate mode groups comprise a mode group comprises transform mode HH0 and transform mode HH1.

For example, when a width of the CU is in the range of [Th1×2, Th2] and a height of the CU is in the range of [Th1×2, Th2], the candidate mode groups comprise a mode group comprises mode transform mode Q0, transform mode Q1, transform mode Q2, and transform mode Q3.

For example, when a width of the CU is in the range of [Th1×4, Th2] and a height of the CU is in the range of [Th1, Th2], the candidate mode groups comprise a mode group comprises transform mode VQ0, transform mode VQ1, and transform mode VH2.

For example, when a width of the CU is in the range of [Th1×2, Th2] and a height of the CU is in the range of [Th1, Th2], the candidate mode groups comprise a mode group comprises transform mode VH0 and transform mode VH1.

For example, when a height of the CU is in the range of [Th1×4, Th2] and a width of the CU is in the range of [Th1, Th2], the candidate mode groups comprise a mode group comprises transform mode HQ0, transform mode HQ1, and transform mode HH2.

For example, when a height of the CU is in the range of [Th1×2, Th2] and a width of the CU is in the range of [Th1, Th2], the candidate mode groups comprise a mode group comprises transform mode HH0 and transform mode HH1.

The threshold Th1, Th2, and Th3 are pre-defined integer values. For example, Th1 is 4, 8, or 16; Th2 is 32, 64, or 128; Th3 is 64, 128, or 256.

In another embodiment, before obtaining the target transform mode of the residual TU, the method further comprises: determining, based on the prediction information of the CU, whether to obtain the target transform mode of the residual TU.

For example, when a prediction mode of the CU is intra prediction mode, the method comprises determining to obtain the target transform mode of the residual TU.

For example, when a prediction mode of the CU is inter prediction mode, the method comprises determining to obtain the target transform mode of the residual TU.

For example, when a prediction method of the CU is a preset positive prediction method, the method comprises determining to obtain the target transform mode of the residual TU. The preset positive prediction method comprises at least one of the following: a translation model based motion compensation method; a Merge prediction method; an advanced motion vector prediction method with ¼-pel motion vector difference precision; or a Merge prediction method with a merge index smaller than 2.

For example, when a prediction method of the CU is a preset negative prediction method, the method comprises determining not to obtain the target transform mode of the residual TU. The preset negative prediction method comprises at least one of the following: an affine model based motion compensation method; an affine merge prediction method; an affine inter prediction mode; an advanced motion vector prediction method with 1-pel or 4-pel motion vector difference precision; or a Merge prediction method with a merge index not smaller than 2.

In another embodiment, before obtaining the target transform mode of the residual TU, the method further comprises: determining, based on a size of the CU, whether to obtain the target transform mode of the residual TU.

For example, when a width or a height of the CU is greater than a preset CU threshold, the method comprises determining not to obtain the target transform mode of the residual TU. The preset CU threshold may be 32 luma pixels, 64 luma pixels, or 128 luma pixels.

For example, when a width or a height of a TU of the CU is less than a preset minimum TU threshold, the method comprises determining not to obtain the target transform mode of the residual TU. The preset minimum TU threshold may be 4 luma pixels, 8 luma pixels, or 16 luma pixels.

For example, when a width or a height of a TU of the CU is greater than a preset maximum TU threshold, the method comprises determining not to obtain the target transform mode of the residual TU. The preset maximum TU threshold is 32 luma pixels, 64 luma pixels, or 128 luma pixels.

It should be noted that, even according to the prediction information of the CU and/or the size of the CU, determining to obtain the target transform mode of the residual TU only means that the target transform mode may be obtained, but not that the target transform mode is indeed to be obtained. Because at the encoder side, choosing which transform mode to do the transformation depends on many factors. That is, the above mentioned new transform modes (the above mentioned 22 transform modes) are added as candidates, the already existing transform modes (old transform modes), e.g., the CU is transformed by one TU of the CU size, still can be used.

Therefore, on the basis of the CU has transform unit information, when determining, according to the prediction information of the CU and/or the size of the CU, to obtain the target transform mode of the residual TU; parsing the bitstream may obtain a mode flag indicating the old transform modes. Accordingly, when determining not to obtain the target transform mode of the residual TU, means that the old transform modes are used for the CU. If the CU is transformed by one TU of the CU size, the residual TU is of the CU size, and the transform type of the residual TU may be DCT-2 for horizontal transform and DCT-2 for vertical transform by default or may be signaled in bitstream (e.g., the AMT method in VTM software, in which multiple transform types are allowed for a TU and the transform type used by the TU is signaled).

For example, if transform modes of Q0, Q1, Q2, Q3, VQ0, VQ1, HQ0, HQ1, VH0, VH1, VH2, HH0, HH1, and HH2 are candidate target transform modes of the CU, the decoder can first parse the bitstream to determine whether the CU uses one of the candidate target transform modes or the CU is transformed by one TU of the CU size. E.g., a flag may be used to indicate whether the CU uses one of candidate target transform modes or the CU is transformed by one TU of the CU size.

If the CU uses one of the candidate target transform modes, the bitstream is parsed to obtain the transform mode of the CU. In one method, Q0, Q1, Q2, and Q3 are grouped into group A; VQ0 and VQ1 are grouped into group B; HQ0 and HQ1 are grouped into group C; VH0, VH1, and VH2 are grouped into group D; and HH0, HH1, and HH2 are grouped into group E. It is first decided the group that the transform mode of the CU belongs to, by parsing a group index, and then decide the target transform mode inside the group by parsing another index.

Parsing the group index may be based on which mode groups are determined/preset as candidate mode groups. For example, when group A and any other group are candidate mode groups, a first flag is parsed to determine whether the target transform mode belongs to group A or not. Otherwise, if the first flag is not present in the bitstream, and the transform mode is inferred to belong to group A if group A is a candidate mode group, or is inferred to belong to groups B, C, D, and E if group A is not a candidate mode group. If the target transform mode belongs to groups B, C, D, and E, a second flag is parsed to determine whether the target transform mode belong to B/D (i.e., group B or D) or C/E if both group B/D and C/E are candidate, and the second flag can be inferred if only B/D is candidate or if only C/E is candidate. If the transform mode belongs to B/D, a third flag may be parsed to determine whether the target transform mode belongs to B. Similarly, if the target transform mode belongs to C/E, the third flag may be parsed to determine whether the transform mode belongs to C.

Similar to parsing the group index, parsing the index of the target transform mode inside a group may be based on which transform modes are in the group.

For example, if transform modes Q0, Q1, Q2, Q3, VQ0, VQ1, HQ0, and HQ1 are candidate target transform modes of the CU, the decoder can first parse the bitstream to determine whether the CU uses one of the candidate transform modes or the CU is transformed by one TU of the CU size. E.g., a flag may be used to indicate whether the CU uses one of candidate target transform modes or the CU is transformed by one TU of the CU size.

If the CU uses one of the candidate target transform modes, the bitstream is parsed to obtain the transform mode of the CU. In one method, transform modes Q0, Q1, Q2, and Q3 are grouped into group A; VQ0 and VQ1 are grouped into group B; and HQ0 and HQ1 are grouped into group C. It is first decided the group that the target transform mode belongs to, by parsing a group index, and then decide the target transform mode inside the group by parsing a mode index.

The present disclosure further discloses a video decoder, the structure of the decoder is illustrated in FIG. 3. The video decoder includes an entropy decoding unit 304 configured to: parse a received bitstream to obtain prediction information of a coding unit (CU); obtain a target transform mode of a residual transform unit (TU) when the residual TU is the only residual TU of the CU and a size of the residual TU is less than a size of the CU, wherein the target transform mode specifies a TU partitioning mode of the CU, the position of the residual TU, and a transform type set of the residual TU; obtain a transform type of the residual TU from the transform type set; and parse the received bitstream to obtain transform coefficients of the residual TU, where the target transform mode is the same as mentioned above. The video decoder further includes: an inverse quantization processing unit 310 configured to apply an inverse quantization to the transform coefficients of the residual TU to obtain dequantized coefficients; an inverse transform processing unit 312 configured to apply an inverse transform to the dequantized coefficients based on the transform type of the residual TU or based on the TU partitioning mode of the CU, the position of the residual TU and the transform type of the residual TU to obtain a residual block of the residual TU; a prediction processing unit 360 configured to obtain a prediction block of the CU based on the prediction information; a reconstruction unit 314 configured to obtain a video block based on the residual block and the prediction block; and an output 332 configured to output a video sequence, the video sequence including a video frame that includes the video block.

In one embodiment, the entropy decoding unit 304 is further configured to: parse the bitstream to obtain a mode index for indicating the target transform mode of the residual TU; and obtain the target transform mode of the residual TU based on the mode index.

In one embodiment, the entropy decoding unit 304 is further configured to: determine candidate target transform modes of the residual TU based on a size of the CU; and parse, based on the candidate target transform modes of the residual TU, the bitstream to obtain a mode index for indicating the target transform mode of the residual TU.

In one embodiment, the entropy decoding unit 304 is further configured to determine candidate target transform modes of the residual TU according to the method as stated above.

In one embodiment, the entropy decoding unit 304 is further configured to: parse the bitstream to obtain a group index for indicating which mode group of the target transform mode belongs to; parse the bitstream to obtain a mode index for indicating the target transform mode in the mode group; and obtain the target transform mode based on the group index and the mode index.

The target transform mode belongs to any mode group as stated above.

In one embodiment, the entropy decoding unit 304 is further configured to: determine at least one candidate mode groups of the residual TU based on a size of the CU; and parse, based on the at least one candidate mode groups of the residual TU, the bitstream to obtain a group index for indicating which mode group of the target transform mode belongs to.

The entropy decoding unit is further configured to determine at least one candidate mode groups according to at least one of the methods as stated above.

In one embodiment, the entropy decoding unit 304 is further configured to determine, based on the prediction information of the CU, whether to obtain the target transform mode of the residual TU.

The entropy decoding unit 304 is further configured to determine whether to obtain the target transform mode of the residual TU according to at least one of the methods as stated above.

In one embodiment, the entropy decoding unit 304 is further configured to determine, based on a size of the CU, whether to obtain the target transform mode of the residual TU.

The entropy decoding unit 304 is further configured to determine whether to obtain the target transform mode of the residual TU according to at least one of the methods as stated above.

The present disclosure further discloses a decoder comprising processing circuitry for carrying out the method as stated above.

The present disclosure further discloses a computer program product comprising a program code for performing the method as stated above.

The present disclosure further discloses a decoder comprising: one or more processors; and a non-transitory computer-readable storage medium coupled to the processors and storing programming for execution by the processors, wherein the programming, when executed by the processors, configures the decoder to carry out the method as stated above.

Figure 13:
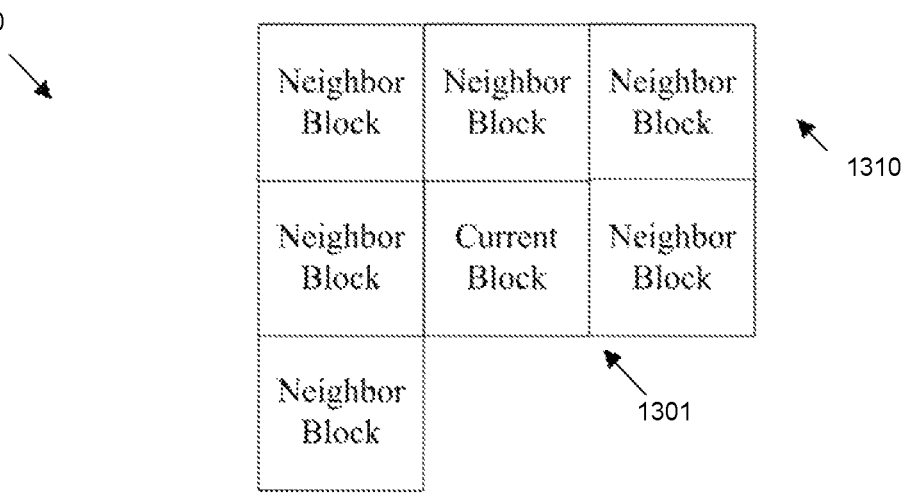
FIG. 13 illustrates an example of intra-prediction in video coding.

FIG. 13 illustrates an example of intra-prediction 1300 in video coding that employs intra-prediction modes. As shown, a current block 1301 can be predicted by samples in neighbor blocks 1310. Encoders may generally encode an image from top-left to bottom right. However, encoders may encode from right to left in some cases as discussed below. It should be noted that, as used herein right refers to the right side of an encoded image, left refers to the left side of an encoded image, top refers to the top side of an encoded image, and bottom refers to the bottom side of an encoded image.

It should be noted that a current block 1301 may not always exactly match a sample from a neighboring block 1310. In such a case, a prediction mode is encoded from the closest matching neighboring block 1310. In order to allow the decoder to determine the proper value, a difference between the predicted value and the actual value is retained. This is referred to as residual information. Residual information occurs in both intra-prediction 1300, as well as inter-prediction.

Figure 14:
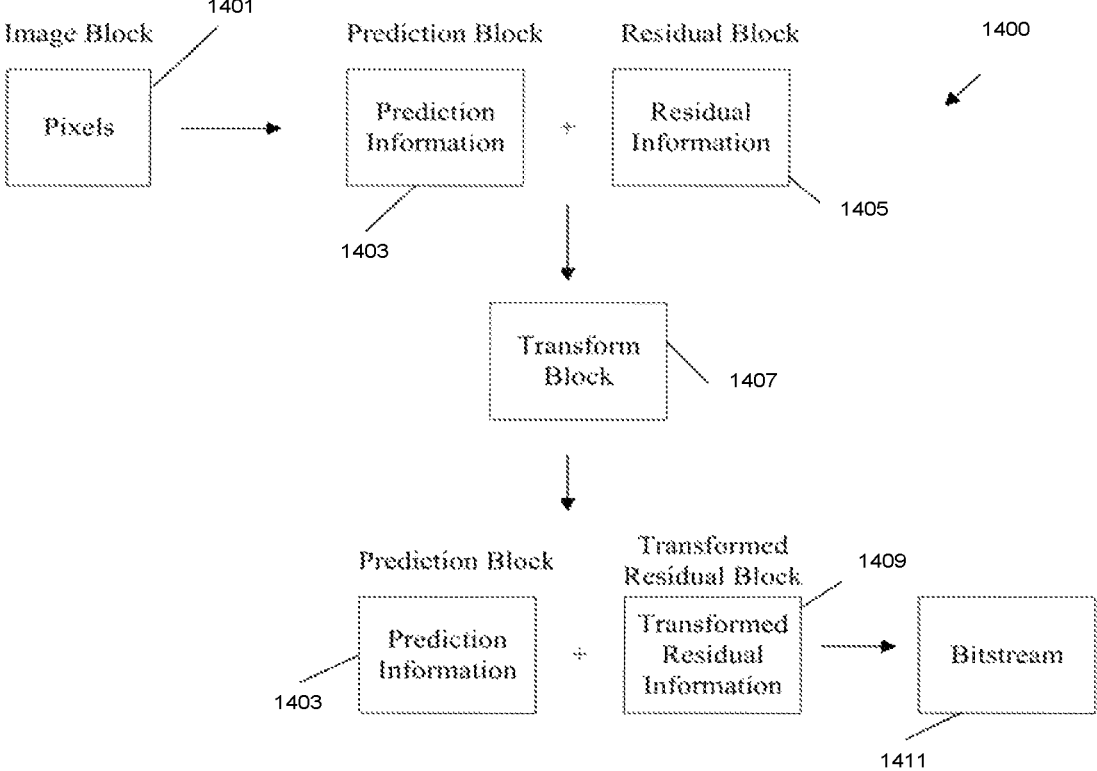
FIG. 14 is a schematic diagram of an example video encoding mechanism.

FIG. 14 is a schematic diagram of an example video encoding mechanism 1400, based on intra-prediction 1300 and/or inter-prediction. An image block 1401 can be obtained by an encoder from one or more frames. For example, an image may be split into a plurality of rectangular image regions. Each region of the image corresponds to a Coding Tree Unit (CTU). A CTU is partitioned into a plurality of blocks, such as the coding units in HEVC. Block partition information is then encoded in a bitstream 1411. Accordingly, the image block 301 is a partitioned portion of an image and contains pixels that represent luma components and/or chroma components at a corresponding portion of the image. During encoding, the image block 1401 is encoded as a prediction block 303 containing prediction information such as prediction modes for intra-prediction and/or motion vectors for inter-prediction. Encoding the image block 1401 as a prediction block 1403 may then leave a residual block 1405 containing residual information indicating the difference between the prediction block 1403 and the image block 1401.

It should be noted that an image block 1401 may be partitioned as a coding unit that contains one prediction block 1403 and one residual block 1405. The prediction block 1403 may contain all prediction samples of the coding unit, and the residual block 1405 may contain all residual samples of the coding unit. In such a case, the prediction block 1403 is of the same size as the residual block 1405. In another example, the image block 1401 may be partitioned as a coding unit that contains two prediction blocks 1403 and one residual block 1405. In such a case, each prediction block 1405 contains a portion of the prediction samples of the coding unit, and the residual block 1405 contains all of the residual samples of the coding unit. In yet another example, the image block 1401 is partitioned into a coding unit that contains two prediction blocks 1403 and four residual blocks 1405. The partition pattern of the residual blocks 1405 in a coding unit may be signaled in the bitstream 1411. Such position patterns may include Residual Quad-Tree (RQT) in HEVC. Further, an image block 1401 may contain only luma components (e.g., light), denoted as Y components, of image samples (or pixels). In other cases, the image block 1401 may contain Y, U and V components of image samples, where U and V indicate chrominance components (e.g., color) in a blue luminance and red luminance (UV) color space.

SVT may be employed to further compress the information. For example, SVT employs a transform block 1407 to further compress the residual block 1405. The transform block 1407 contains a transform, such as inverse DCT and/or inverse DST. The difference between the prediction block 1403 and the image block 1401 is the fit to the transform by employing transform coefficients. By indicating the transform mode of the transform block 1407 (e.g., inverse DCT and/or inverse DST) and the corresponding transform coefficients, the decoder can reconstruct the residual block 1405. When exact reproduction is not required, the transform coefficients can be further compressed by rounding certain values to create a better fit for the transform. This process is known as quantization and is performed according to quantization parameters that describe the allowable quantization. Accordingly, the transform modes, transform coefficients, and quantization parameters of the transform block 1407 are stored as transformed residual information in a transformed residual block 1409, which may also be referred to simply as a residual block in some cases.

The prediction information of the prediction block 1403 and the transformed residual information of the transformed residual block 1409 can then be encoded in a bitstream 1411. The bitstream 1411 can be stored and/or transmitted to a decoder. The decoder can then perform the process in reverse to recover the image block 1401. For example, the decoder can employ the transformed residual information to determine the transform block 1407. The transform block 1407 can then be employed in conjunction with the transformed residual block 1409 to determine the residual block 1405. The residual block 1405 and the prediction block 1403 can then be employed to reconstruct the image block 1401. The image block 1401 can then be positioned relative to other decoded image blocks 1401 to reconstruct frames and position such frames to recover the encoded video.

SVT is now described in more detail. To conduct SVT, the transform block 1407 is selected to be smaller than the residual block 1405. The transform block 1407 is employed to transform a corresponding part of the residual block 1405, and leave the remainder of the residual block without additional coding/compression. This is because the residual information is generally not evenly distributed across the residual block 1405. SVT employs a smaller transform block 1407 with an adaptive position to capture the majority of the residual information in the residual block 1405, without requiring the entire residual block 1405 to be transformed. This approach may achieve better coding efficiency than transforming all the residual information in the residual block 1405. As the transform block 1407 is smaller than the residual block 1405, SVT employs a mechanism for signaling the position of the transform relative to the residual block 1405. For example, when SVT is applied for a residual block 1405 of size w×h (e.g., width times height), the size and position information of the transform block 1407 may be coded into the bitstream 1411. This allows the decoder to reconstruct the transform block 1407 and compose the transform block 1407 into the correct position relative to the transformed residual block 1409 for reconstruction of the residual block 1405.

It should be noted that some prediction blocks 1403 can be encoded without resulting in a residual block 1405. However, such a case does not result in the use of SVT and hence is not discussed further. As noted above, SVT may be employed for inter-predicted blocks or intra-predicted blocks. Further, SVT may be employed on residual blocks 1405 generated by specified inter-prediction mechanisms (e.g., translation model based motion compensation), but may not be employed to residual blocks 1405 generated by other specified inter-prediction mechanisms (e.g., affine model based motion compensation).

Figure 15:
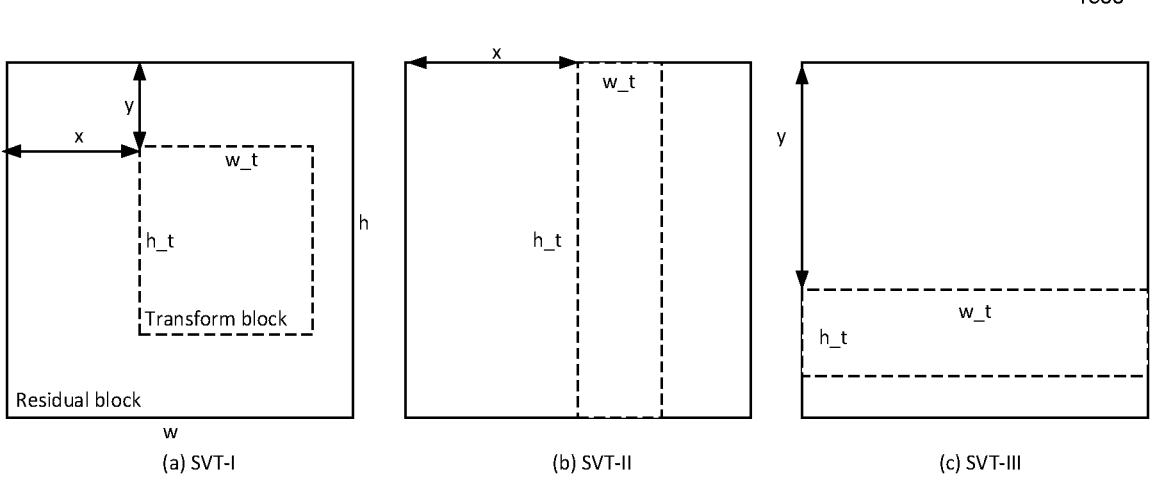
FIGS. 15-16 illustrate example spatial varying transform (SVT) transforms.

FIG. 15 illustrates example SVT transforms 1500 that may be employed as a transform block 307 for encoding a residual block 305. SVT transforms 1500 are referred to as SVT-I, SVT-II, and SVT-III. SVT-I is described as $w\_t=w/2$, $h\_t=h/2$, where $w\_t$ and $h\_t$ denote the width and height of the transform block, respectively, and w and h denote the width and height of the residual block, respectively. For example, the width and height of the transform block are both half of the width and height of the residual block. SVT-II is described as $w\_t=w/4$, $h\_t=h$ where the variables are as described above. For example, the transform block width is a quarter of the width of the residual block and the height of the transform block is equal to the height of the residual block. SVT-III is described as $w\_t=w$, $h\_t=h/4$ where the variables are as described above. For example, the width of the transform block is equal to the width of the residual block and the height of the transform block is one quarter of to the height of the residual block. The type information indicating the type of SVT block (e.g., SVT-I, SVT-II, or SVT-III) is coded into bitstream to support reconstruction by the decoder.

As can be seen by FIG. 15, each transform can be positioned in various locations relative to the residual block. The position of the transform block is represented by a position offset (x, y), to the top-left corner of the residual block, where x indicates the horizontal distance between the top-left corner of the transform block and that of the residual block in the unit of pixels, and y indicates the vertical distance between the top-left corner of the transform block and that of the residual block in the unit of pixels. Each potential position of the transform block inside the residual block is referred to as a candidate position. For a residual block, the number of candidate positions is $(w-w\_t+1)\times(h-h\_t+1)$ for a type of SVT. More specifically, for a 16×16 residual block, when SVT-I is used, there are eighty-one candidate positions. When SVT-II or SVT-III is used, there are thirteen candidate positions. Once determined, the x and y values of the position offset are coded into bitstream along with the type of SVT block employed. To reduce complexity for SVT-I, a subset of thirty-two positions can be selected from the eighty-one possible candidate positions. This subset then acts as the allowed candidate positions for SVT-I.

One drawback of an SVT scheme employing SVT transforms 1500 is that encoding the SVT position information as residual information results in significant signaling overhead. In addition, the encoder complexity may be significantly increased as the number of positions tested by compression quality processes, such as Rate-Distortion Optimization (RDO), increases. Since the number of candidate positions increases with the size of the residual block, the signaling overhead can be even bigger for larger residual blocks, such as 32×32 or 64×128. Another drawback of employing SVT transforms 1500 is that the size of the transform block is one quarter of the size of the residual block. A transform block of such a size may not be large enough to cover the major residual information in the residual block in many cases.

Figure 16:
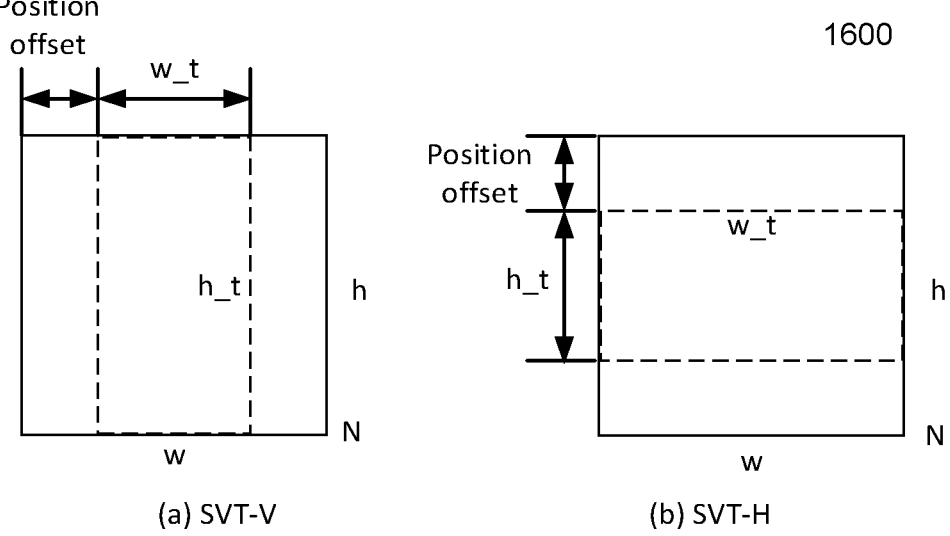

FIG. 16 illustrates additional example SVT transforms 1600 that may be employed as a transform block 307 for encoding a residual block 305. SVT transforms 1600 are referred to as SVT vertical (SVT-V) and SVT horizontal (SVT-H). The SVT transforms 1600 are similar to SVT transforms 1500, but are designed to support reduced signaling overhead and less complex processing requirements on the encoder.

SVT-V is described as $w\_t=w/2$ and $h\_t=h$, where the variables are as described above. The width of the transform block is half of the width of the residual block and the height transform block is equal to the height of the residual block.

SVT-H is described as w_t=w and h_t=h/2, where the variables are as described above. For example, the width of the transform block is equal to the width of the residual block and the height transform block is half of the height of the residual block. SVT-V is similar to SVT-II and SVT-H is similar to SVT-III. Compared with SVT-II and SVT-III, the transform block in SVT-V and SVT-H is enlarged to half of the residual block, which can cover more residual information in the residual block.

As with SVT transforms 1500, SVT transforms 1600 can include several candidate positions, where candidate positions are the possible allowable position of a transform block relative to a residual block. Candidate positions are determined according to a Candidate Position Step Size (CPSS). Candidate positions may be separated with an equal space specified by the CPSS. In such a case, the number of candidate positions is reduced to no more than five. The reduced number of candidate positions mitigates the signaling overhead associated with the position information as the selected position for a transform can be signaled with fewer bits. Further, reducing the number of candidate positions make the selection of a transform position algorithmically simpler, which allows the encoder complexity to be reduced (e.g., resulting in fewer computing resources employed to encode).

Figure 17:
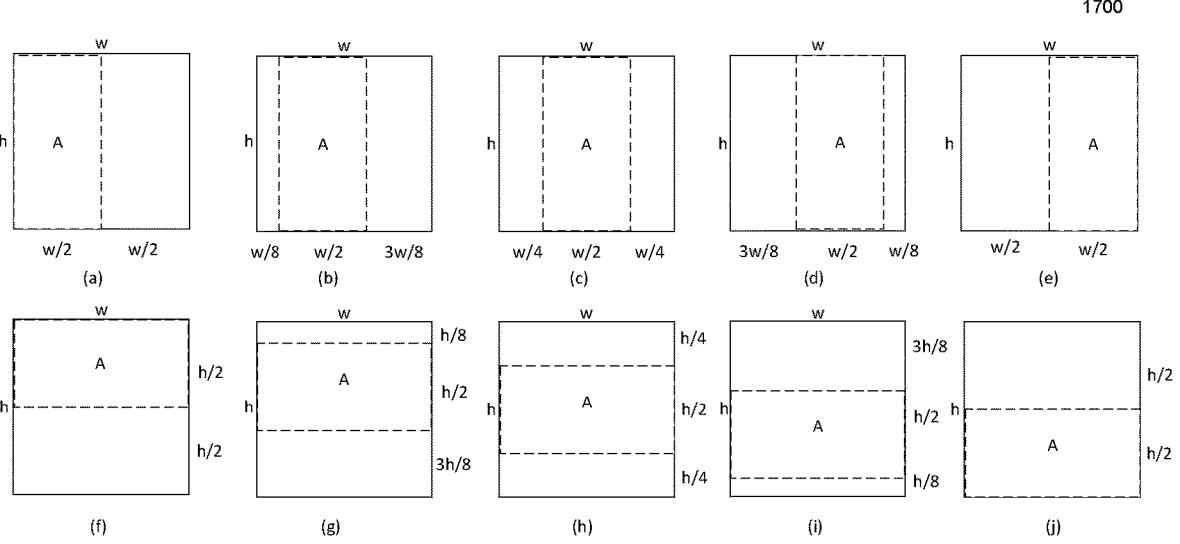
FIG. 17 illustrates example SVT transform candidate positions relative to a residual block.

FIG. 17 illustrates example SVT transform candidate positions 1700 relative to a residual block. For example, the SVT transform candidate positions 1700 employ SVT-V and SVT-H (e.g., SVT transforms 1600) positioned relative to a residual block. The allowable candidate positions for a transform depend on the CPSS, which further depends on the portion of the residual block that the transform block should cover and/or a step size between candidate positions. For example, the CPSS may be calculated as s=w/M1 for SVT-V or s=h/M2 for SVT-H, where w and h are the width and height of the residual block, respectively, and M1 and M2 are pre-determined integers in range of two to eight. More candidate positions are allowed with a larger M1 or M2 value. For example, M1 and M2 may both be set as eight. In this case, a value of the position index (P) describing the location of the transform block relative to the residual block is between zero and four.

In another example, the CPSS is calculated as s=max (w/M1, Th1) for SVT-V or s=max (h/M2, Th2) for SVT-H, where Th1 and Th2 are pre-defined integers specifying a minimum step size. Th1 and Th2 may be integers that are no less than two. In this example, Th1 and Th2 are set as four, and M1 and M2 are set as eight. In this example, different block sizes may have a different number of candidate positions. For example, when the width of the residual block is eight, two candidate positions are available for SVT-V, i.e., candidate positions 1700 (*a*) and (*c*). For example, only two candidate positions satisfy the CPSS when the step size, as indicated by Th1, is large and the portion of the residual block the transform covers, as indicated by w/M1, is also large. However, when w is set to sixteen, the portion of the residual block the transform covers decreases due to a change in w/M1. This results in more candidate positions, in this case the three candidate positions 1700 (*a*), (*c*), and (*c*). All five candidate positions are available when the width of the residual block is greater than sixteen while the values of Th1 and M1 are as discussed above.

Other examples can also be seen when CPSS is calculated according to other mechanisms. For example, the CPSS may be calculated as s=w/M1 for SVT-V or s=h/M2 for SVT-H. In this case, three candidate positions are allowed for SVT-V (e.g., candidate positions 1700 (*a*), (*c*), and (*c*)) and three candidate positions are allowed for SVT-H (e.g., candidate positions 1700 (*f*), (*h*), and (*j*)) when M1 and M2 are set as four. Further, when M1 and M2 are set as four, the portion of the residual block that the transform covers increases resulting in two allowable candidate positions of SVT-V (e.g., candidate positions 1700 (*a*) and (*c*)) and two allowable candidate positions for SVT-H (e.g., candidate positions 1700 (*f*) and (*c*)).

In another example, the CPSS is calculated as s=max (w/M1, Th1) for SVT-V or s=max (h/M2, Th2) for SVT-H as discussed above. In this case, T1 and T2 are set as a pre-defined integer, for example two, M1 is set as eight if w≥h or is set as four when w<h, and M2 is set as eight when h≥w or is set as four when h<w. For example, the portion of the residual block that the transform covers is dependent on whether the residual block's height is greater than the residual block's width, or vice versa. Accordingly, the number of candidate positions for SVT-H or SVT-V further depends on the aspect ratio of the residual block.

In another example, the CPSS is calculated as s=max (w/M1, Th1) for SVT-V or s=max (h/M2, Th2) for SVT-H, as discussed above. In this case, the values of M1, M2, Th1, and Th2 are derived from a high-level syntax structure in the bitstream (e.g., a sequence parameter set). For example, the values employed to derive CPSS can be signaled in the bitstream. M1 and M2 may share the same value parsed from a syntax element, and Th1 and Th2 may share the same value parsed from another syntax element.

Figure 18:
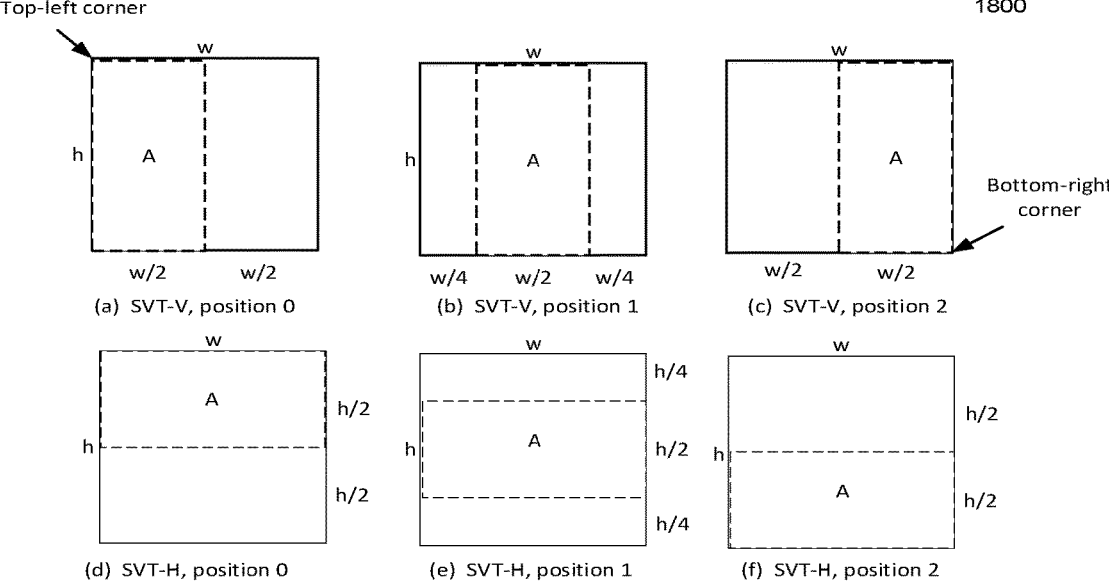
FIG. 18 illustrates example SVT transform positions relative to a residual block.

FIG. 18 illustrates example SVT transform positions 1800 relative to a residual block. The SVT transform positions 1800 are selected from candidate positions, such as SVT transform candidate positions 1700. For example, the SVT transform positions 1800 selected may be encoded as to a position index P. The position index P can be employed to determine a position offset (Z) of the top-left corner of the transform block relative to the top-left corner of the residual block. For example, this position correlation can be determined according to Z=s×P, where s is a CPSS for the transform block based on SVT type and calculated as discussed with respect to FIG. 6. The value of P may be encoded as 0, 1, . . . , w−w_t/s when the transform block is an SVT-V type. The value of P may be encoded as 0, 1, . . . , h−h_t/s when the transform block is an SVT-H type. For example, (0, 0) can represent the coordinate of the top-left corner of the residual block. In such a case, the coordinate of the top-left corner of the transform block is (Z, 0) for SVT-V or (0, Z) for SVT-H.

As discussed in more detail below, the encoder may encode the SVT transform type (e.g., SVT-H or SVT-T) and residual block size in the bitstream by employing flags. The decoder may then determine the SVT transform size based on the SVT transform size and residual block size. Once the SVT transform size is determined, the decoder can determine the allowable candidate positions of the SVT transform, such as SVT transform candidate positions 1700, according to the CPSS function. As the decoder is capable of determining the candidate positions of the SVT transform, the encoder may not signal the coordinates of the position offset. Instead, a code can be employed to indicate which of the candidate positions is employed for the corresponding transform. For example, the position index P may be binarized into one or more bins using truncated unary code for increased compression. As a particular example, when the P value is in the range of zero to four, the P value 0, 4, 2, 3, and 1 can be binarized as 0, 01, 001, 0001, and 0000, respectively. This binary code is more compressed than expressing the base ten value of the position index. As another example, when the P value is in the range of zero to one, the P value 0 and 1 can be binarized as 0 and 1, respectively. As such, the position index can grow or shrink in size as desired to signal a particular transform block position in light of the possible candidate positions for the transform block.

The position index P may be binarized into one or more bins by employing a most probable position and less probably remaining positions. For example, when the left and top neighbor blocks have already been decoded at the decoder, and hence are available for prediction, the most probable position may be set as the position covering the bottom-right corner of the residual block. In one example, when the P value is in the range of zero to four and position four is set as the most probable position, P value 4, 0, 1, 2, and 3 are binarized as 1, 000, 001, 010, and 011, respectively. Further, when the P value is in the range of zero to two and position two is set as the most probable position, P value 2, 0, and 1 are binarized as 1, 01, and 00, respectively. Accordingly, the most probable position index of the candidate positions is denoted with the fewest bits to reduce signaling overhead for the most common cases. The probability can be determined based on the coding order of adjacent reconstructed blocks. Accordingly, the decoder can infer the code word scheme to be employed for a corresponding block based on the decoding scheme employed.

For example, in HEVC the coding unit coding order is generally from top to bottom and from left to right. In such case, the right-side of a current encoding/decoding coding unit is not available rendering the top-right corner the more probable transform position. However, motion vector predictors are derived from the left and top spatial neighbors. In such a case, the residual information is statistically more intense towards the bottom-right corner. In this case, the candidate position covering the bottom-right part is the most probable position. Further, when an adaptive coding unit coding order is utilized, one node may split vertically into two child nodes and the right child node may be coded before the left one. In this case, the right-side neighbor of the left child node has been reconstructed before the decoding/encoding of the left child node. Further, in such a case, the left-side neighboring pixels are not available. When the right-side neighbor is available and the left-side neighbor is not available, the bottom-left portion of the residual block is likely to contain a large amount of residual information, and thus the candidate position covering the bottom-left portion of the residual block becomes the most probable position.

Therefore, the position index P may be binarized into one or more bins according to whether the right side next to the residual block has been reconstructed. In one example, the P value is in the range of zero to 2, as shown by SVT transform positions 1800. When the right side next to the residual block has been reconstructed, the P value 0, 2, and 1 are binarized as 0, 01, and 00. Otherwise, the P value 2, 0, and 1 are binarized as 0, 01, and 00. In another example, when the right side next to the residual block has been reconstructed, but the left side next to the residual block has not been reconstructed, the P value 0, 2, and 1 are binarized as 0, 00, and 01. Otherwise, the P value 2, 0, and 1 are binarized as 0, 00, and 01. In these examples, the position corresponding to a single bin is the most probable position and the other two positions are remaining positions. For example, the most probable position is dependent on the availability of the right-side neighbor.

The probability distribution of the best position in the sense of rate-distortion performance may be quite different across inter-prediction modes. For example, when the residual block corresponds to a prediction block generated by template matching with spatially neighboring reconstructed pixels as the template, the best position is most probably position two. For other inter-prediction modes, the probability of position two (or position zero when the right neighbor is available and the left neighbor is not available) being the best position is lower than that of the template matching mode. In view of this, the context model for the first bin of position index P may be decided according to the inter-prediction mode associated with the residual block. For example, when the residual block is associated with template matching based inter-prediction, the first bin of position index P uses a first context model. Otherwise, a second context model is used for encoding/decoding this bin.

In another example, when the residual block is associated with template matching based inter-prediction, the most probable position (e.g., position two, or position zero when the right neighbor is available but the left neighbor is not available) is directly set as the transform block position and position information is not signaled in the bitstream. Otherwise, the position index is explicitly signaled in the bitstream.

It should also be noted that different transforms can be employed depending on the position of the transform block relative to the residual block. For example, the left side of the residual block is reconstructed and the right side of the residual block is not reconstructed, which occurs for video coding with a fixed coding unit coding order from left to right and from top to bottom (e.g., the coding order in HEVC). In this case, the candidate position covering the bottom-right corner of the residual block may employ DST (e.g., DST type seven (DST-7) or DST type one (DST-1)) for a transform in a transform block when encoding. (In an alternative embodiment, DST-7 may be replaced with DST-4, and DCT-8 may be replaced with DCT-4 throughout the present disclosure. Accordingly, in this case, the candidate position covering the bottom-right corner of the residual block may employ DST (e.g., DST type four (DST-4) or DST type one (DST-1)) for a transform in a transform block when encoding). Accordingly, an inverse DST transform is employed at the decoder for the corresponding candidate position. Further, a candidate position covering the top-left corner of the residual block may employ DCT (e.g., DCT type eight (DCT-8) or DCT type two (DCT-2)) for a transform in the transform block when encoding (In an alternative embodiment, DST-7 may be replaced with DST-4, and DCT-8 may be replaced with DCT-4 throughout the present disclosure. Accordingly, further, a candidate position covering the top-left corner of the residual block may employ DCT (e.g., DCT type four (DCT-4) or DCT type two (DCT-2)) for a transform in the transform block when encoding). Accordingly, an inverse DCT transform is employed at the decoder for the corresponding candidate position. This is because the bottom-right corner is the most distant to the spatially reconstructed area among the four corners in this case. Further, DST is more effective than DCT for transforming the residual information distribution when the transform block covers the bottom-right corner of the residual block. However, DCT is more effective than DST for transforming the residual information distribution when the transform block covers the top-left corner of the residual block. For the rest candidate positions, the transform type can be either inverse DST or DCT. For example, when a candidate position is closer to the bottom-right corner than the top-left corner, inverse DST is employed as the transform type. Otherwise inverse DCT is employed the transform type.

As an example, three candidate positions for the transform block may be allowed as shown in FIG. 18. In this case, position zero covers the top-left corner and position two covers the bottom-right corner. Position one is at the middle of the residual block and equidistant to both left and right corners. The transform types can be selected as DCT-8, DST-7, and DST-7 for position zero, position one, and position two, respectively, at the encoder. Inverse transforms DCT-8, DST-7, and DST-7 can then be employed at the decoder for position zero, position one, and position two, respectively. In another example, the transform types for position zero, position one, and position two are DCT-2, DCT-2, and DST-7, respectively, at the encoder. Inverse transforms DCT-2, DCT-2, and DST-7 can then be employed at the decoder for position zero, position one, and position two, respectively. As such, the transform types for corresponding candidate positions can be predetermined.

In an alternative embodiment, DST-7 may be replaced with DST-4, and DCT-8 may be replaced with DCT-4 throughout the present disclosure. Accordingly, as an example, three candidate positions for the transform block may be allowed as shown in FIG. 18. In this case, position zero covers the top-left corner and position two covers the bottom-right corner. Position one is at the middle of the residual block and equidistant to both left and right corners. The transform types can be selected as DCT-4, DST-4, and DST-4 for position zero, position one, and position two, respectively, at the encoder. Inverse transforms DCT-4, DST-4, and DST-4 can then be employed at the decoder for position zero, position one, and position two, respectively. In another example, the transform types for position zero, position one, and position two are DCT-2, DCT-2, and DST-4, respectively, at the encoder. Inverse transforms DCT-2, DCT-2, and DST-4 can then be employed at the decoder for position zero, position one, and position two, respectively. As such, the transform types for corresponding candidate positions can be predetermined.

In some cases, the position-dependent multiple transforms described above may be applied to luma transform blocks only. The corresponding chroma transform blocks may always use inverse DCT-2 in the transform/inverse transform process.

Figure 19:
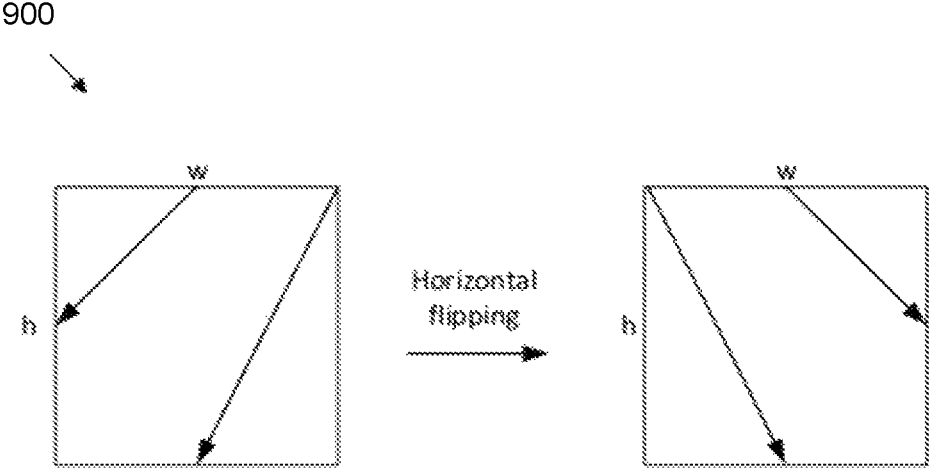
FIG. 19 illustrates an example of residual sample horizontal flipping.

FIG. 19 illustrates an example 1900 of residual sample horizontal flipping. In some cases, beneficial residual compression can be achieved by horizontally flipping the residual information in the residual block (e.g., residual block 305) before applying a transform block (e.g., transform block 307) at the encoder. Example 1900 illustrates such horizontal flipping. In this context, horizontal flipping refers to rotating the residual samples in a residual block about an axis half way between the left side of the residual block and the right side of the residual block. Such horizontal flipping occurs prior to applying the transform (e.g., transform block) at the encoder and after applying the inverse transform (e.g., the transform block) at the decoder. Such flipping may be employed when specified pre-defined conditions occur.

In one example, the horizontal flipping occurs when the transform block employs DST/inverse DST in the transform process. In this case, the right-side neighbor of the residual block is encoded/reconstructed prior to the current block, and the left-side neighbor is not encoded/reconstructed prior to the current block. The horizontal flipping process exchanges the residual samples at column i of the residual block with the residual samples at column w−1−i of the residual block. In this context, w is the width of the transform block and i=0, 1, . . . , (w/2)−1. The horizontal flipping of the residual samples may increase coding efficiency by making the residual distribution fit better to a DST transform.

FIG. 20 is a flowchart of an example method 2000 of video decoding with position dependent SVT that employs the mechanisms discussed above. Method 2000 may be initiated at a decoder upon receiving a bitstream, such as bitstream 311. The method 2000 employs the bitstream to determine prediction blocks and transformed residual blocks, such as prediction block 303 and transformed residual block 309. The method 2000 also determines transform blocks, such as transform block 307, which is employed to determine residual blocks, such as residual block 305. The residual blocks and the prediction blocks are then employed to reconstruct image blocks, such as image block 301. It should be noted that while method 2000 is described from the perspective of the decoder, a similar method may be employed (e.g., in reverse) to encode the video by employing SVT.

At block 2001, a bitstream is obtained at the decoder. The bitstream may be received from memory or from a streaming source. The bitstream contains data which can be decoded into at least one image corresponding to video data from an encoder. For example, the bitstream contains block partition information that can be employed to determine a coding unit containing prediction blocks and residual blocks from the bitstream as described in mechanism 300. As such, coding information related to the coding units can be parsed from the bitstream and pixels of the coding units can be reconstructed based on the coding information as discussed below.

At block 2003, a prediction block and a corresponding transformed residual block are obtained from the bitstream based on the block partition information. For this example, the transformed residual block has been encoded according to SVT as discussed with respect to mechanism 300 above. The method 2000 then reconstructs a residual block of size w×h from the transformed residual block as discussed below.

At block 2005, the SVT usage, type of SVT, and transform block size are determined. For example, the decoder first determines whether SVT has been used in the encoding. This is because some encodings employ transforms that are the size of the residual block. The usage of SVT can be signaled by a syntax element in the bitstream. For example, when a residual block is allowed to employ SVT, a flag, such as svt_flag, is parsed from the bitstream. The residual block is allowed to employ SVT when the transformed residual block has non-zero transform coefficients (e.g., corresponding to any luma or chroma components). For example, a residual block may employ SVT when the residual block contains any residual data. The SVT flag indicates whether the residual block is coded using a transform block of the same size to the residual block (e.g., svt_flag is set to zero) or the residual block is coded with a transform block of a smaller size than the residual block (e.g., svt_flag is set to one). A coded block flag (cbf) can be employed to indicate whether a residual block includes non-zero transform coefficients of a color component, as used in HEVC. Also, a root coded block (root cbf) flag can indicate whether a residual block contains non-zero transform coefficients of any color component, as used in HEVC. As a particular example, a residual block is allowed to use SVT when the image block is predicted using inter-prediction and either the residual block width or residual block height falls in a pre-determined range of [a1, a2], where a1=16 and a2=64, a1=8 and a2=64, or a1=16 and a2=128. The values of a1 and a2 can be predetermined fixed values. The values may also be derived from a sequence parameter set (SPS) or a slice header in the bitstream. When the residual block does not employ SVT, the transform block size is set as the width and height of the residual block size. Otherwise, the transform size is determined based on the SVT transform type.

Once the decoder determines that SVT has been used for the residual block, the decoder determines the type of SVT transform block used and derives the transform block size according to the SVT type. Allowed SVT types for the residual block are decided based on the width and height of the residual block. An SVT-V transform as shown in FIG. 16 is allowed if the width of the residual block is in the range [a1, a2] as such values are defined above. An SVT-H transform as shown in FIG. 16 is allowed when the height of the residual block is in the range [a1, a2], as such values are defined above. SVT may be used for only the luma components in the residual block, or SVT may be employed for the luma and both chroma components in the residual block. When SVT is only used for the luma component, the luma component residual information is transformed by SVT and the chroma components are transformed by a transform the size of the residual block. When both SVT-V and SVT-H are allowed, a flag, such as a svt_type_flag, may be encoded into the bitstream. The svt_type_flag indicates whether SVT-V is used for the residual block (e.g., svt-_type_flag is set to zero) or SVT-H is used for the residual block (e.g., svt_type_flag is set to one). Once the type of SVT transform is determined, the transform block size is set according to the signaled SVT type (e.g., w_t=w/2 and h_t=h for SVT-V, and w_t=w and h_t=h/2 for SVT-H). When only SVT-V is allowed or only SVT-H is allowed, the svt_type_flag may not be encoded into the bitstream. In such a case, the decoder can infer the transform block size based on the allowed SVT type.

Once the SVT type and size are determined, the decoder proceeds to block 2007. At block 2007, the decoder determines the position of the transform relative to the residual block as well as the type of the transform (e.g., either DST or DCT). The position of the transform block can be determined according to a syntax element in the bitstream. For example, a position index can be directly signaled and hence parsed from the bitstream in some examples. In other examples, the position can be inferred as discussed with respect to FIGS. 5-7. For example, candidate positions for the transform can be determined according to a CPSS function. The CPSS function can determine the candidate positions by considering the width of the residual block, the height of the residual block, the SVT type as determined by block 2005, the step size of the transform, and/or the portion of the residual block that the transform covers. The decoder can then determine the transform block position from the candidate positions by obtaining a p-index including a code that signals the correct candidate position according to candidate position selection probability as discussed with respect to FIG. 18 above. Once the transform block position is known, the decoder can infer the type of transform employed by the transform block as discussed with respect to FIG. 18A or FIG. 18B above. Accordingly, the encoder can select the corresponding inverse transform.

At block 2009, the decoder parses the transform coefficients of the transform block based on the transform block size determined at block 2005. This process may be accomplished according to transform coefficients parsing mechanisms employed in HEVC, H.264, and/or advance video coding (AVC). The transform coefficients may be coded using run-length coding and/or as a set of transform coefficient groups (CGs). It should be noted that block 2009 may be performed before block 2007 in some examples.

At block 2011, the residual block is reconstructed based on the transform position, transform coefficients, and transform type as determined above. For example, inverse quantization and inverse transform of size w_t×h_t are applied to the transform coefficients to recover residual samples of the residual block. The size of the residual block with the residual samples is w_t×h_t. The inverse transform may be an inverse DCT or an inverse DST, according to the position-dependent transform type determined at block 2007. The residual samples are assigned to a corresponding region inside the residual block, according to the transform block position. Any residual samples inside the residual block and outside of the transform block may be set to zero. For example, when SVT-V is employed, the number of candidate positions is five, and the position index indicates the fifth transform block position, the reconstructed residual samples are assigned to region A in transform candidate positions 1700 (e) and the region of size (w/2)×h to the left of region A has zero residual samples.

At optional block 2013, the residual block information of the reconstructed block may be horizontally flipped as discussed with respect to FIG. 19. As noted above, this may occur when the transform block at the decoder employs inverse DST, the right side neighbor block is already reconstructed, and left side neighbor is not already reconstructed. For example, the encoder may horizontally flip the residual block prior to applying a DST transform in the case mentioned above in order to increase coding efficiency. Accordingly, optional block 2013 may be employed to correct for such horizontal flipping at the encoder to create an accurate reconstructed block.

At block 2015, the reconstructed residual block may be composed with the prediction block to generate the reconstructed image block containing samples as part of a coding unit. A filtering process may also be applied on the reconstructed samples, such as deblocking filter and sample adaptive offset (SAO) processing in HEVC. The reconstructed image block may then be combined with other image blocks decoded in a similar fashion to generate frames of a media/video file. The reconstructed media file may then be displayed to a user on a monitor or other display device.

It should be noted that an equivalent implementation of method 2000 can be employed generate the reconstructed samples in the residual block. For example, the residual samples of the transform block can be composed directly with the prediction block at the position indicated by the transform block position information, without first recovering the residual block.

In summary, the above disclosure includes mechanisms that adaptively employ multiple transform types for transform block at different positions. Further, the disclosure allows for horizontally flipping the residual samples in the residual block to support coding efficiency. This occurs when the transform block uses DST and inverse DST at the encoder and decoder, respectively and when the right neighbor block is available and the left neighbor is not available. Further, the disclosure includes mechanisms to support coding position information in the bitstream based on the inter-prediction mode associated with the residual block.

Additional embodiments may be found in the following examples.

Example 1. A method implemented in a computing device, the method comprising: receiving a bitstream at a processor of the computing device, the bitstream stored in memory of the computing device and received via a receiver of the computing device; receiving, at the processor, a prediction block and a corresponding transformed residual block from the bitstream; determining, by the processor, a type of spatial varying transform (SVT) transform employed to generate the transformed residual block; determining, by the processor, a position of the SVT transform relative to the transformed residual block; applying, by the processor, an inverse of the SVT transform to the transformed residual block to reconstruct a reconstructed residual block; and composing, by the processor, the reconstructed residual block with the prediction block to reconstruct an image block for display on a monitor.

Example 2. The method of example 1, wherein the type of the SVT transform is a SVT vertical (SVT-V) type or a SVT horizontal (SVT-H) type, the SVT-V type including a height that equals a height of the transformed residual block and a width that is half a width of the transformed residual block, and the SVT_H type including a height that is half the height of the transformed residual block and a width that is equal to a width of the transformed residual block.

Example 3. The method of any one of examples 1-2, wherein the type of SVT transform is determined by parsing a svt_type_flag from the bitstream.

Example 4. The method of any one of examples 1-3, wherein the type of SVT transform is determined by the processor by inference when only one type of SVT transform is allowed for the residual block.

Example 5. The method of any one of examples 1-4, wherein the position of the SVT transform is determined by the processor by parsing a position index from the bitstream.

Example 6. The method of any one of examples 1-5, wherein the position index contains a binary code indicating the position from a set of candidate positions determined according to a candidate position step size (CPSS).

Example 7. The method of any one of examples 1-6, wherein a most probable position of the SVT transform is assigned a least number of bits in the binary code indicating the position index.

Example 8. The method of any one of examples 1-7, wherein the position of the SVT transform is inferred by the processor when a single candidate position is available for the SVT transform.

Example 9. The method of any one of examples 1-8, wherein the position of the SVT transform is inferred by the processor when the residual block was generated by template matching in an inter-prediction mode.

Example 10. The method of any one of examples 1-9, further comprising determining, by the processor, the inverse of the SVT transform based on the position of the SVT transform.

Example 11. The method of any one of examples 1-10, wherein an inverse Discrete Sine Transform (DST) is employed, by the processor, for a SVT vertical (SVT-V) type transform positioned at a left boundary of the residual block, an inverse DST is employed, by the processor, for a SVT horizontal (SVT-H) type transform positioned at a top boundary of the residual block, an inverse Discrete Cosine Transform (DCT) is employed, by the processor, for a SVT-V type transform positioned at a right boundary of the residual block, or an inverse DCT is employed, by the processor, for a SVT-H type transform positioned at a bottom boundary of the residual block.

Example 12. The method of any one of examples 1-11, further comprising horizontally flipping, by the processor, samples in the reconstructed residual block prior to composing the reconstructed residual block with the prediction block when a right side neighbor of a coding unit associated with the reconstructed residual block has been reconstructed and a left side neighbor of the coding unit has not been reconstructed.

Example 13. A method implemented in a computing device, the method comprising: receiving, at a processor of the computing device, a video signal from a video capture device, the video signal including an image block; generating, by the processor, a prediction block and a residual block to represent the image block; employing, by the processor, a spatial varying transform (SVT) transform to convert the residual block into a transformed residual block; indicating, by the processor, a type of the SVT transform in a bitstream; indicating, by the processor, a position of the SVT transform in the bitstream; and encoding, by the processor, the prediction block and the transformed residual block into the bitstream for use by a decoder, the bitstream stored in a memory of the computing device for transmission to the decoder via a transmitter.

Example 14. The method of example 13, wherein the type of the SVT transform is a SVT vertical (SVT-V) type or a SVT horizontal (SVT-H), the SVT-V type including a height that equals a height of the residual block and a width that is half a width of the residual block, and the SVT_H type including a height that is half the height of the residual block and a width that is equal to a width of the residual block.

Example 15. The method of any one of examples 13-14, wherein the position of the SVT transform is encoded in a position index.

Example 16. The method of any one of examples 13-15, wherein the position index contains a binary code indicating the position from a set of candidate positions determined according to a candidate position step size (CPSS).

Example 17. The method of any one of examples 13-16, wherein a most probable position of the SVT transform is assigned, by the processor, as a least number of bits in the binary code indicating the position index.

Example 18. The method of any one of examples 13-17, further comprising selecting, by the processor, a transform algorithm for the SVT transform based on the position of the SVT transform.

Example 19. The method of any one of examples 13-18, wherein a Discrete Sine Transform (DST) algorithm is employed by the processor for a SVT vertical (SVT-V) type transform positioned at a left boundary of the residual block, a DST algorithm is selected by the processor for a SVT horizontal (SVT-H) type transform positioned at a top boundary of the residual block, a Discrete Cosine Transform (DCT) algorithm is selected by the processor for a SVT-V type transform positioned at a right boundary of the residual block, or a DCT algorithm is selected by the processor for a SVT-H type transform positioned at a bottom boundary of the residual block.

Example 20. The method of any one of examples 13-19, further comprising horizontally flipping, by the processor, samples in the residual block prior converting, by the processor, the residual block into the transformed residual block when a right side neighbor of a coding unit associated with the residual block has been encoded and a left side neighbor of the coding unit has not been encoded.

The following document is incorporated by reference: C. Zhang, K. Ugur, J. Lainema, A. Hallapuro and M. Gabbouj, "Video Coding Using Spatially Varying Transform", IEEE Trans. Image Process., vol. 21, no. 2, February 2011, pp. 127-140.

The present disclosure further introduces another improved SVT scheme. The improvement is that the type of horizontal transform and the type of vertical transform of an SVT block are determined based on the SVT type and SVT block position. The horizontal transform can be different from the vertical transform. Previously, the type of horizontal transform and the type of vertical transform of an SVT block were determined based on the SVT block position only, and they are always the same.

A first embodiment describes the process of decoding a residual block. A bitstream containing at least one picture of video data is decoded. A picture is split into a plurality of rectangular image regions and each region corresponds to a Coding Tree Unit (CTU). A CTU is partitioned into a plurality of blocks, such as the coding units in HEVC, according to block partition information contained in the bitstream. The coding information of the blocks is parsed from the bitstream and pixels of the blocks are reconstructed based on the coding information.

In this embodiment, SVT is restricted to being used for inter-predicted blocks. SVT may also be used for intra-predicted blocks. In a more advanced method, SVT may be allowed for blocks using a specific inter prediction method (e.g., translation model based motion compensation) but not allowed for blocks using some other inter prediction method (e.g., affine model based motion compensation). In another example, SVT may be allowed for prediction blocks using Merge mode or AMVP (advanced motion vector prediction) mode with ¼-pel motion vector difference precision, but not allowed for prediction blocks using affine merge mode, affine inter mode, or AMVP mode with 1-pel or 4-pel motion vector difference precision. In another example, SVT may be allowed for prediction blocks using Merge mode with a merge index smaller than 2, but not allowed for prediction blocks using Merge mode with a merge index not smaller than 2. The Merge mode and AMVP mode can be referred to in H.265/HEVC standard. Affine merge mode and affine inter mode can be referred to in Joint Exploration Model (JEM) codec from Joint Video Exploration Team (JVET).

In one example, a block may refer to a coding unit, where the coding unit may contain one prediction block and one residual block. The prediction block may contain all prediction samples of the coding unit, the residual block may contain all residual samples of the coding unit, and the prediction block is of the same size as the residual block. In another example, a block may refer to a coding unit, a coding unit may contain two prediction blocks and one residual block, each prediction block may contain a part of prediction samples of the coding unit, and a residual block may contain all residual samples of the coding unit. In another example, a block may refer to a coding unit, a coding unit may contain two prediction blocks and four residual blocks. The partition pattern of residual blocks in a coding unit may be signaled in the bitstream, such as the Residual Quad-Tree (RQT) in HEVC.

A block may contain only Y component of image samples (or pixels), or it may contain Y, U, and V components of image samples.

A residual block Ro of size w×h can be reconstructed by the following steps.

Step 1. Determine the transform block size of the residual block Ro.

Step 1.1. Determine the usage of SVT according to a syntax element. For a residual block which is allowed to use SVT, if the residual block has non-zero transform coefficients of Y component (or it has non-zero transform coefficients of any color component), a flag (namely svt_flag) is parsed from the bitstream. The flag indicates whether the residual block is coded using a transform block of the same size as the residual block (e.g., svt_flag=0) or the residual block is coded with a transform block of a smaller size than the residual block (e.g., svt_flag=1). Whether a block has non-zero transform coefficients of a color component may be indicated by a coded block flag (cbf) of the color component, as used in HEVC. Whether a block has non-zero transform coefficients of any color component may be indicated by a root coded block flag (root cbf), as used in HEVC.

In one example, a block is allowed to use SVT if the following conditions are satisfied:
1) the block is predicted using inter prediction;
2) either the block width or block height falls in a pre-determined range [a1, a2], e.g., a1=16 and a2=64, or a1=8 and a2-64, or a1=16 and a2=128. The value of a1 and a2 can be fixed values. The value also can be derived from a sequence parameter set (SPS) or a slice header.

In another example, a block is allowed to use SVT if the following conditions are satisfied:
1) the block is predicted using Merge mode with merge index smaller than a threshold (e.g., 1 or 2 or 3) or using AMVP mode with 1/4-pel motion vector difference precision;
2) one dimension of the block falls in a pre-determined range [a1, a2], and the other dimension of the block is not greater than a threshold a3, e.g., a1-8, a2=32 and a3=32. Parameter a1 may be set as twice of minimum transform size, a2 and a3 may both be set as the maximum transform size. The value of a1, a2 and a3 can be fixed values. The value also can be derived from a sequence parameter set (SPS) or a slice header.

If the block does not use SVT, the transform block size is set as w×h. Otherwise, Step 1.2 is applied to decide the transform size.

Step 1.2. Determine the type of SVT according to a syntax element, and derive the transform block size according to the SVT type. Allowed SVT types for the residual block are decided based on the width and height of the residual block. SVT-V is allowed if w is in the range [a1, a2] and h is not greater than a3; SVT-H is allowed if h is in the range [a1, a2] and w is not greater than a3. SVT may be only used for the Y component, or it may be used for all three components. When SVT is only used for the Y component, the Y component residual is transformed by SVT and the U and V components are transformed according to the size of the residual block.

When both SVT-V and SVT-H are allowed, one flag (namely svt_type_flag) is parsed from the bitstream, which indicates whether SVT-V is used (e.g., svt_type_flag=0) or SVT-H is used (e.g., svt_type_flag=1) for the residual block, and the transform block size is set according to the signaled SVT type (i.e., w_t=w/2 and h_t=h for SVT-V, and w_t=w and h_t=h/2 for SVT-H). When only SVT-V is allowed or only SVT-H is allowed, the svt_type_flag is not parsed from the bitstream, and the transform block size is set according to the allowed SVT type.

Step 2. Determine the transform block position according to a syntax element, and determine the transform type for the transform block based on the type of SVT and the transform block position information.

Step 2.1: Determine the transform block position according to a syntax element.

A position index P is parsed from the bitstream, and the position offset Z of the top left corner of the transform block to the top left corner of the residual block is determined as Z=s×P, where s is a candidate position step size (CPSS). The value of P is among 0, 1, . . . , $$\frac{w - w\_t}{s}$$

if SVT-V is used, or the value of P is among 0, 1, . . . , $$\frac{h - h\_t}{s}$$

if SVT-H is used. More specifically, let (0, 0) represent the coordinate of the top left corner of the residual block, the coordinate of the top left corner of the transform block is (Z, 0) for SVT-V or (0, Z) for SVT-H.

Figure 21:
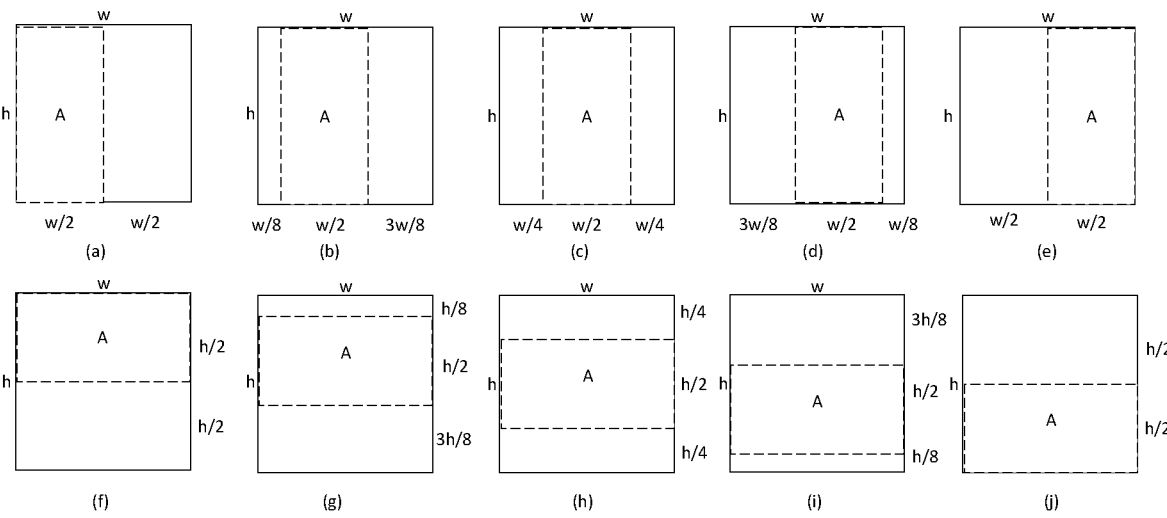
FIG. 21 is an illustration of candidate positions of SVT-V and SVT-H blocks (M1=M2=8).

In one example, the CPSS is calculated as s=w/M1 for SVT-V or s=h/M2 for SVT-H, where w and h are the width and height of the residual block, respectively, and M1 and M2 are pre-determined integers in range of 2 to 8. More candidate positions are allowed with a larger M1 or M2 value. In this example, M1 and M2 are both set as 8. Therefore, the value of P is among 0 to 4. The candidate positions are illustrated in FIG. 21.

In another example, the CPSS is calculated as s=max (w/M1, Th1) for SVT-V or s=max (h/M2, Th2) for SVT-H, where Th1 and Th2 are pre-defined integers specifying a minimum step size. Th1 and Th2 are integers no less than 2. In this example, Th1 and Th2 are set as 4, and M1 and M2 are set as 8. In this example, different block sizes may have different number of candidate positions. For example, when w=8, 2 candidate positions (as illustrated by FIG. 21(a) and FIG. 21(c)) are available to choose; when w=16, 3 candidate positions (as illustrated by FIG. 21(a), FIG. 21(c), and FIG. 21(c)) are available to choose; when w>16, 5 positions are available to choose.

In another example, the CPSS is calculated as s=w/M1 for SVT-V or s=h/M2 for SVT-H, where M1 and M2 are set as 4. Accordingly, 3 candidate positions are allowed.

In another example, the CPSS is calculated as s=w/M1 for SVT-V or s=h/M2 for SVT-H, where M1 and M2 are set as 2. Accordingly, 2 candidate positions are allowed.

In another example, the CPSS is calculated as s=max (w/M1, Th1) for SVT-V or s=max (h/M2, Th2) for SVT-H, where T1 and T2 are set as 2, M1 is set as 8 if w≥h or is set as 4 if w<h, and M2 is set as 8 if h≥w or is set as 4 if h<w. In this case, the number of candidate positions for SVT-H or SVT-V may further depend on the aspect ratio of the residual block.

In another example, the CPSS is calculated as s=max (w/M1, Th1) for SVT-V or s=max (h/M2, Th2) for SVT-H, where the values of M1, M2, Th1 and Th2 are derived from a high-level syntax structure in the bitstream (e.g., sequence parameter set). M1 and M2 may share the same value parsed from a syntax element, and Th1 and Th2 may share the same value parsed from another syntax element.

The position index P may be binarized into one or more bins using truncated unary code. For example, if the P value is in the range of 0 to 4, P value 0, 4, 2, 3, and 1 are binarized as 0, 01, 001, 0001, and 0000, respectively; if the P value is in the range of 0 to 1, P value 0 and 1 are binarized as 0 and 1, respectively.

The position index P may be binarized into one or more bins using one most probable position and several remaining positions. When the left and top neighbors are available, the most probable position may be set as the position covering the bottom-right corner of the residual block. In one example, if the P value is in the range of 0 to 4 and position 4 is set as the most probable position, P value 4, 0, 1, 2, and 3 are binarized as 1, 000, 001, 010, and 011, respectively; if the P value is in the range of 0 to 2 and position 2 is set as the most probable position, P value 2, 0, and 1 are binarized as 1, 01, and 00, respectively.

Step 2.2: determine the transform type for the transform block based on the type of SVT and transform block position information. The transform type includes the horizontal transform and vertical transform of a 2-D separable transform.

Figure 22:
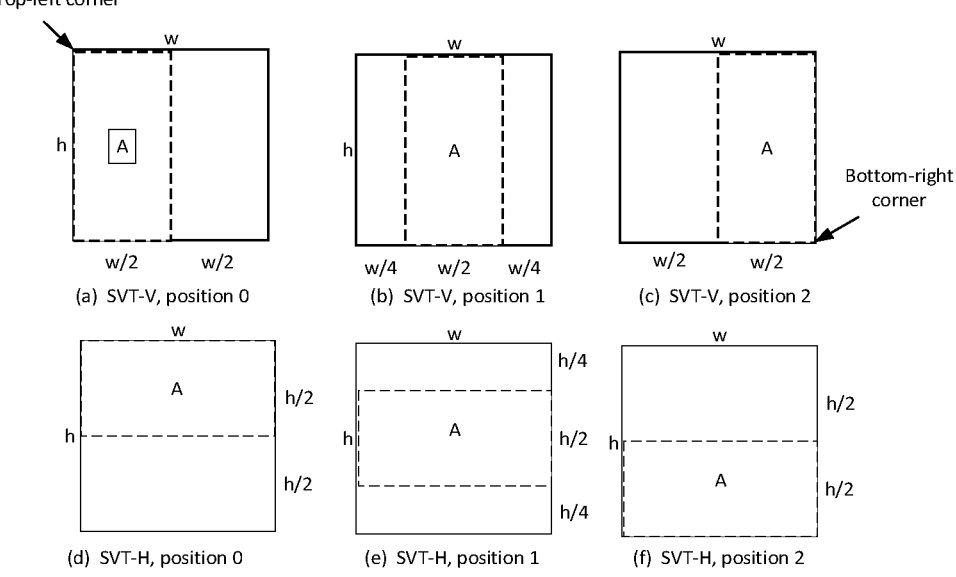
FIG. 22 is an illustration of SVT-V and SVT-H with 3 candidate positions.

Taking the case that 3 candidate positions are allowed for an example, as shown in FIG. 22. Position 0 covers the top-left corner, and position 2 covers the bottom-right corner. Position 1 is at the middle of the residual block. There are three positions for both SVT-V and SVT-H, as shown in FIG. 22.

A two-dimensional transform may be separable into one-dimensional horizontal transform and vertical transform. A forward 2D transform which turns residual into transform coefficients may be realized by first applying horizontal transform on a residual block to generate a block TA and then applying vertical transform on the block TA to generate a transform coefficient block, as implemented in JEM codec. Accordingly, an inverse 2D transform which turns transform coefficients back to residual may be realized by first applying inverse vertical transform on a transform coefficient block to generate a block TB and then applying inverse horizontal transform on the block TB to generate a residual block, as implemented in JEM codec.

In one example, the horizontal and vertical transforms for SVT-V position 0 are DCT-8 and DST-7; the horizontal and vertical transforms for SVT-V position 1 are DST-1 and DST-7; the horizontal and vertical transforms for SVT-V position 2 are DST-7 and DST-7; the horizontal and vertical transforms for SVT-H position 0 are DST-7 and DCT-8; the horizontal and vertical transforms for SVT-H position 1 are DST-7 and DST-1; the horizontal and vertical transforms for SVT-H position 2 are DST-7 and DST-7, as listed in Table I. In this example, the vertical transform for SVT-V and the horizontal transform for SVT-H are set as DST-7, and the other transform is based on SVT position.

TABLE I

An example of 1-D horizontal and vertical transforms for different SVT types and positions.

| SVT type, position | horizontal transform | vertical transform |
|---|---|---|
| SVT-V, position 0 | DCT-8 | DST-7 |
| SVT-V, position 1 | DST-1 | DST-7 |
| SVT-V, position 2 | DST-7 | DST-7 |
| SVT-H, position 0 | DST-7 | DCT-8 |
| SVT-H, position 1 | DST-7 | DST-1 |
| SVT-H, position 2 | DST-7 | DST-7 |

In an alternative embodiment, DST-7 may be replaced with DST-4, and DCT-8 may be replaced with DCT-4 throughout the present disclosure. Accordingly, in one example, the horizontal and vertical transforms for SVT-V position 0 are DCT-4 and DST-4; the horizontal and vertical transforms for SVT-V position 1 are DST-1 and DST-4; the horizontal and vertical transforms for SVT-V position 2 are DST-4 and DST-4; the horizontal and vertical transforms for SVT-H position 0 are DST-4 and DCT-4; the horizontal and vertical transforms for SVT-H position 1 are DST-4 and DST-1; the horizontal and vertical transforms for SVT-H position 2 are DST-4 and DST-4, as listed in Table I'. In this example, the vertical transform for SVT-V and the horizontal transform for SVT-H are set as DST-4, and the other transform is based on SVT position.

TABLE I'

An example of 1-D horizontal and vertical transforms for different SVT types and positions.

| SVT type, position | horizontal transform | vertical transform |
|---|---|---|
| SVT-V, position 0 | DCT-4 | DST-4 |
| SVT-V, position 1 | DST-1 | DST-4 |
| SVT-V, position 2 | DST-4 | DST-4 |
| SVT-H, position 0 | DST-4 | DCT-4 |
| SVT-H, position 1 | DST-4 | DST-1 |
| SVT-H, position 2 | DST-4 | DST-4 |

In another example, the horizontal transform and vertical transform for different SVT types and positions are listed in Table II. In this example, the vertical transform for SVT-V and the horizontal transform for SVT-H are set as DCT-2, and the other transform is based on SVT position.

TABLE II

An example of 1-D horizontal and vertical transforms for different SVT types and positions.

| SVT type, position | horizontal transform | vertical transform |
|---|---|---|
| SVT-V, position 0 | DCT-8 | DCT-2 |
| SVT-V, position 1 | DST-1 | DCT-2 |
| SVT-V, position 2 | DST-7 | DCT-2 |
| SVT-H, position 0 | DCT-2 | DCT-8 |
| SVT-H, position 1 | DCT-2 | DST-1 |
| SVT-H, position 2 | DCT-2 | DST-7 |

In an alternative embodiment, DST-7 may be replaced with DST-4, and DCT-8 may be replaced with DCT-4 throughout the present disclosure. Accordingly, in another example, the horizontal transform and vertical transform for different SVT types and positions are listed in Table II'. In this example, the vertical transform for SVT-V and the horizontal transform for SVT-H are set as DCT-2, and the other transform is based on SVT position.

TABLE II'

An example of 1-D horizontal and vertical transforms for different SVT types and positions.

| SVT type, position | horizontal transform | vertical transform |
|---|---|---|
| SVT-V, position 0 | DCT-4 | DCT-2 |
| SVT-V, position 1 | DST-1 | DCT-2 |
| SVT-V, position 2 | DST-4 | DCT-2 |
| SVT-H, position 0 | DCT-2 | DCT-4 |
| SVT-H, position 1 | DCT-2 | DST-1 |
| SVT-H, position 2 | DCT-2 | DST-4 |

In another example, the horizontal transform and vertical transform for different SVT types and positions are listed in Table III. In this example, the horizontal transform and vertical transform are decided only by SVT position.

TABLE III

An example of 1-D horizontal and vertical transforms for different SVT types and positions.

| SVT type, position | horizontal transform | vertical transform |
|---|---|---|
| SVT-V, position 0 | DCT-8 | DCT-8 |
| SVT-V, position 1 | DST-1 | DST-1 |
| SVT-V, position 2 | DST-7 | DST-7 |
| SVT-H, position 0 | DCT-8 | DCT-8 |
| SVT-H, position 1 | DST-1 | DST-1 |
| SVT-H, position 2 | DST-7 | DST-7 |

In an alternative embodiment, DST-7 may be replaced with DST-4, and DCT-8 may be replaced with DCT-4 throughout the present disclosure. Accordingly, in another example, the horizontal transform and vertical transform for different SVT types and positions are listed in Table III'. In this example, the horizontal transform and vertical transform are decided only by SVT position.

TABLE III'

An example of 1-D horizontal and vertical transforms for different SVT types and positions.

| SVT type, position | horizontal transform | vertical transform |
|---|---|---|
| SVT-V, position 0 | DCT-4 | DCT-4 |
| SVT-V, position 1 | DST-1 | DST-1 |
| SVT-V, position 2 | DST-4 | DST-4 |
| SVT-H, position 0 | DCT-4 | DCT-4 |
| SVT-H, position 1 | DST-1 | DST-1 |
| SVT-H, position 2 | DST-4 | DST-4 |

In another example, the horizontal transform and vertical transform for different SVT types and positions are listed in Table IV.

TABLE IV

An example of 1-D horizontal and vertical transforms for different SVT types and positions.

| SVT type, position | horizontal transform | vertical transform |
|---|---|---|
| SVT-V, position 0 | DST-7 | DCT-8 |
| SVT-V, position 1 | DST-7 | DST-1 |
| SVT-V, position 2 | DST-7 | DST-7 |
| SVT-H, position 0 | DCT-8 | DST-7 |
| SVT-H, position 1 | DST-1 | DST-7 |
| SVT-H, position 2 | DST-7 | DST-7 |

In an alternative embodiment, DST-7 may be replaced with DST-4, and DCT-8 may be replaced with DCT-4 throughout the present disclosure. Accordingly, in another example, the horizontal transform and vertical transform for different SVT types and positions are listed in Table IV'.

TABLE IV'

An example of 1-D horizontal and vertical transforms for different SVT types and positions.

| SVT type, position | horizontal transform | vertical transform |
|---|---|---|
| SVT-V, position 0 | DST-4 | DCT-4 |
| SVT-V, position 1 | DST-4 | DST-1 |
| SVT-V, position 2 | DST-4 | DST-4 |
| SVT-H, position 0 | DCT-4 | DST-4 |
| SVT-H, position 1 | DST-1 | DST-4 |
| SVT-H, position 2 | DST-4 | DST-4 |

In another example, the horizontal transform and vertical transform for different SVT types and positions are listed in Table V.

TABLE V

An example of 1-D horizontal and vertical transforms for different SVT types and positions.

| SVT type, position | horizontal transform | vertical transform |
|---|---|---|
| SVT-V, position 0 | DCT-8 | DST-7 |
| SVT-V, position 1 | DCT-2 | DST-7 |
| SVT-V, position 2 | DST-7 | DST-7 |
| SVT-H, position 0 | DST-7 | DCT-8 |
| SVT-H, position 1 | DST-7 | DCT-2 |
| SVT-H, position 2 | DST-7 | DST-7 |

In an alternative embodiment, DST-7 may be replaced with DST-4, and DCT-8 may be replaced with DCT-4 throughout the present disclosure. Accordingly, in another example, the horizontal transform and vertical transform for different SVT types and positions are listed in Table V'.

TABLE V'

An example of 1-D horizontal and vertical transforms for different SVT types and positions.

| SVT type, position | horizontal transform | vertical transform |
|---|---|---|
| SVT-V, position 0 | DCT-4 | DST-4 |
| SVT-V, position 1 | DCT-2 | DST-4 |
| SVT-V, position 2 | DST-4 | DST-4 |
| SVT-H, position 0 | DST-4 | DCT-4 |
| SVT-H, position 1 | DST-4 | DCT-2 |
| SVT-H, position 2 | DST-4 | DST-4 |

In another example, the horizontal transform and vertical transform for different SVT types and positions are listed in Table VI.

TABLE VI

An example of 1-D horizontal and vertical transforms for different SVT types and positions.

| SVT type, position | horizontal transform | vertical transform |
|---|---|---|
| SVT-V, position 0 | DCT-8 | DCT-2 |
| SVT-V, position 1 | DCT-2 | DCT-2 |
| SVT-V, position 2 | DST-7 | DCT-2 |
| SVT-H, position 0 | DCT-2 | DCT-8 |
| SVT-H, position 1 | DCT-2 | DCT-2 |
| SVT-H, position 2 | DCT-2 | DST-7 |

In an alternative embodiment, DST-7 may be replaced with DST-4, and DCT-8 may be replaced with DCT-4 throughout the present disclosure. Accordingly, in another example, the horizontal transform and vertical transform for different SVT types and positions are listed in Table VI'.

TABLE VI'

An example of 1-D horizontal and vertical transforms for different SVT types and positions.

| SVT type, position | horizontal transform | vertical transform |
|---|---|---|
| SVT-V, position 0 | DCT-4 | DCT-2 |
| SVT-V, position 1 | DCT-2 | DCT-2 |
| SVT-V, position 2 | DST-4 | DCT-2 |
| SVT-H, position 0 | DCT-2 | DCT-4 |
| SVT-H, position 1 | DCT-2 | DCT-2 |

TABLE VI'-continued

An example of 1-D horizontal and vertical transforms for different SVT types and positions.

| SVT type, position | horizontal transform | vertical transform |
|---|---|---|
| SVT-H, position 2 | DCT-2 | DST-4 |

The position-dependent multiple transforms may be applied to luma transform block only, and the corresponding chroma transform blocks always use inverse DCT-2 in the inverse transform process.

Step 3. Parse transform coefficients of the transform block based on the transform block size.

This is a commonly used process in video decoding, such as the transform coefficients parsing in HEVC or H.264/AVC. The transform coefficients may be coded using run-length coding or coded more sophisticated as a set of transform coefficient groups (CGs).

Step 3 may be conducted before Step 2.

Step 4. Reconstruct the residual block Ro based on the transform coefficients and the transform block position and the type of inverse transform.

Inverse quantization and inverse transform of size $w\_t \times h\_t$ are applied to the transform coefficients to recover residual samples. The size of the residual samples is $w\_t \times h\_t$, which is the same to the transform block size. The inverse transform is a 2-D separable transform. The dequantized transform coefficient block is first transformed by an inverse vertical transform to generate a block TC and then the block TC is transformed by an inverse horizontal transform, in which the inverse horizontal transform and inverse vertical transform are decided in Step 2.2 based on transform block position or based on both transform block position and SVT type of the transform block.

The residual samples are assigned to a corresponding region inside the residual block Ro, according to the transform block position, and the rest samples inside the residual block are set to be zero. For example, if SVT-V is used and the number of candidate position is 5 and the position index is 4, the reconstructed residual samples are assigned to region A in FIG. 21($c$) and the region of size $(w/2) \times h$ to the left of region A has zero residual.

After conducting Step 1 to Step 4, the reconstructed residual block may be composed with a prediction block to generate the reconstructed samples in a coding unit. A filtering process may be applied on the reconstructed samples later, such as deblocking filter and sample adaptive offset (SAO) processing in HEVC.

Unlike existing solutions, the present solution adaptively uses multiple transform types for transform block based on the SVT type and position information.

Figure 23:
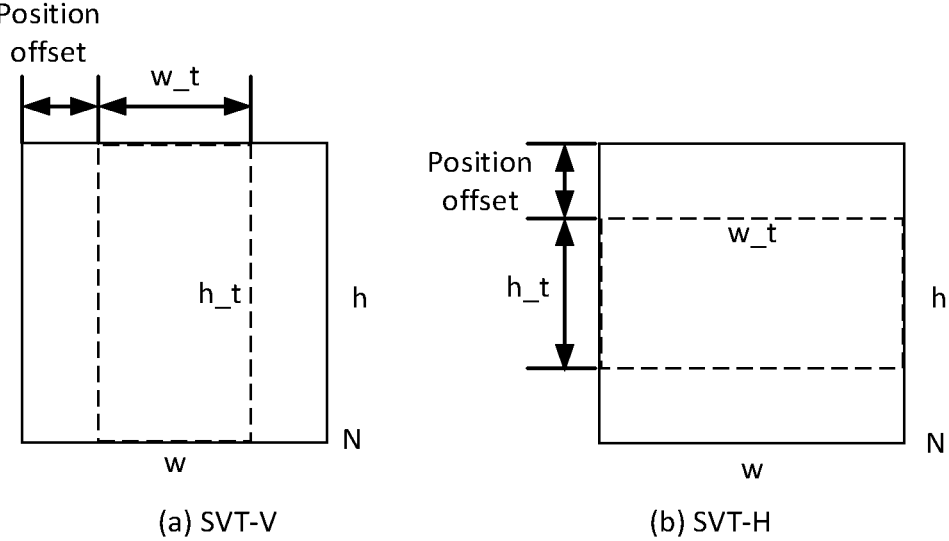
FIG. 23 is an illustration of SVT-H and SVT-V.

The present disclosure introduces an improved SVT scheme. Two types of SVT blocks are used for residual coding, denoted as SVT-H and SVT-V, as shown in FIG. 23. These are (1) SVT-V: $w\_t = w/2$ and $h\_t = h$; and (2) SVT-H: $w\_t = w$ and $h\_t = h/2$.

SVT-V is similar to SVT-II, and SVT-H is similar to SVT-III. Compared with SVT-II and SVT-III, the transform block in SVT-V and SVT-H is enlarged to half of the residual block, which can cover more residual in the residual block. Note that SVT-II or SVT-H may be used to replace SVT-V or SVT-H.

Candidate positions are decided by a Candidate Position Step Size (CPSS). Accordingly, candidate positions are separated with an equal space specified by the CPSS. The number of candidate positions is reduced to no more than 5 in different embodiments, which mitigates the overhead of position information as well as the encoder complexity for deciding the best transform block position.

The CPSS denotes the distance between two adjacent candidate positions (e.g., 1 in [1]), and is calculated based on the width or height of the residual block. More specifically, the candidate position step size for SVT-V is determined as h_b=max (w/M1, Th1), where M1 and Th1 are pre-defined integers, and max (a,b) is the operation of selecting the maximum value between a and b. Similarly, the candidate position step sizes for SVT-H is determined as w_b=max (w/M2, Th2), where M2 and Th2 are pre-defined integers. M1 and M2 are integers between 2 and 8, e.g., M1=M2=8, or M1=M2=4, or M1=M2=2. Th1 and Th2 are integers no less than 2. M1, M2, Th1, and Th2 can be set as fixed values or they can be derived from a high-level syntax structure in the bitstream (e.g., sequence parameter set).

The coding of SVT information (e.g., the usage of SVT for a residual block, the type of SVT, and the position of the transform block) is different from that in [1], and is further improved by analyzing the transform coefficients of the residual block.

For the case where SVT-V: w_t=w/2 and h_t=h, the SVT information may be partially derived from decoded transform coefficients. In one example, the position information may be derived from the sum of the transform coefficients levels. In another example, the SVT type information is derived from the sum of a first group of transform coefficients (e.g., the first 16 coefficients in a scan order), and the position information is derived from the sum of a second group of transform coefficients (e.g., the rest coefficients in the transform block).

For the case where SVT-H: w_t=w and h_t=h/2, the number of candidate positions is determined according to the transform coefficient information, and the position information is decoded based on the number of candidate positions.

Embodiment 1

This embodiment describes the process of decoding a residual block. A bitstream containing at least one picture of video data is decoded. A picture is split into a plurality of rectangular image regions and each region corresponds to a Coding Tree Unit (CTU). A CTU is partitioned into a plurality of blocks, such as the coding units in High Efficiency Video Coding (HEVC), according to block partition information contained in the bitstream. Coding information of the blocks are parsed from the bitstream and pixels of the blocks are reconstructed based on the coding information.

In this embodiment, SVT is restricted to be used for inter-predicted blocks. SVT may also be used for intra-predicted blocks. In a more advanced method, SVT may be allowed for blocks using a specific inter prediction method (e.g., translation model based motion compensation) but not allowed for blocks using some other inter prediction method (e.g., affine model based motion compensation).

In one example, a block may refer to a coding unit, where the coding unit may contain one prediction block and one residual block. The prediction block may contain all prediction samples of the coding unit, the residual block may contain all residual samples of the coding unit, and the prediction block is of the same size as the residual block. In another example, a block may refer to a coding unit, a coding unit may contain two prediction blocks and one residual block, each prediction block may contain a part of prediction samples of the coding unit, and a residual block may contain all residual samples of the coding unit. In another example, a block may refer to a coding unit, a coding unit may contain two prediction blocks and four residual blocks. The partition pattern of residual blocks in a coding unit may be signaled in the bitstream, such as the Residual Quad-Tree (RQT) in HEVC.

A block may contain only Y component of image samples (or pixels), or it may contain Y, U and V components of image samples.

A residual block Ro of size w×h can be reconstructed by the following steps.

Step 1. Determine the transform block size of the residual block Ro.

Step 1.1. Determine the usage of SVT according to a syntax element. For a residual block which is allowed to use SVT, if the residual block has non-zero transform coefficients of Y component (or it has non-zero transform coefficients of any color component), a flag (namely svt_flag) is parsed from the bitstream, which indicates whether the residual block is coded using a transform block of the same size to the residual block (e.g., svt_flag=0) or the residual block is coded with a transform block of a smaller size than the residual block (e.g., svt_flag=1). Whether a block has non-zero transform coefficients of a color component may be indicated by a coded block flag (cbf) of the color component, as used in HEVC. Whether a block has non-zero transform coefficients of any color component may be indicated by a root coded block flag (root cbf), as used in HEVC.

In one example, a block is allowed to use SVT if the following conditions are satisfied:
1) the block is predicted using inter prediction;
2) either the block width or block height falls in a pre-determined range [a1, a2], e.g., a1=16 and a2=64, or a1=8 and a2=64, or a1=16 and a2=128. The value of a1 and a2 can be fixed values. The value also can be derived from a sequence parameter set (SPS) or a slice header.

If the block does not use SVT, the transform block size is set as w×h. Otherwise, Step 1.2 is applied to decide the transform size.

Step 1.2. Determine the type of SVT according to a syntax element, and derive the transform block size according to the SVT type. Allowed SVT types for the residual block are decided based on the width and height of the residual block. SVT-V is allowed if w is in the range [a1, a2]; SVT-H is allowed if h is in the range [a1, a2]. SVT may be only used for the Y component, or it may be used for all three components. When SVT is only used for the Y component, the Y component residual is transformed by SVT and the U and V components are transformed according to the size of the residual block.

When both SVT-V and SVT-H are allowed, one flag (namely svt_type_flag) is parsed from the bitstream, which indicates whether SVT-V is used (e.g., svt_type_flag=0) or SVT-H is used (e.g., svt_type_flag=1) for the residual block, and the transform block size is set according to the signaled SVT type (i.e., w_t=w/2 and h_t=h for SVT-V, and w_t=w and h_t=h/2 for SVT-H). When only SVT-V is allowed or only SVT-H is allowed, the svt_type_flag is not parsed from the bitstream, and the transform block size is set according to the allowed SVT type.

Step 2. Determine the transform block position according to a syntax element.

A position index P is parsed from the bitstream, and the position offset Z of the top left corner of the transform block to the top left corner of the residual block is determined as $Z=s\times P$, where s is a CPSS. The value of P is among 0, 1, . . . , $$\frac{w - w\_t}{s}$$

if SVT-V is used, or the value of P is among 0, 1, . . . , $$\frac{h - h\_t}{s}$$

if SVT-H is used. More specifically, let (0, 0) represent the coordinate of the top left corner of the residual block, the coordinate of the top left corner of the transform block is (Z, 0) for SVT-V or (0, Z) for SVT-H.

Figure 24:
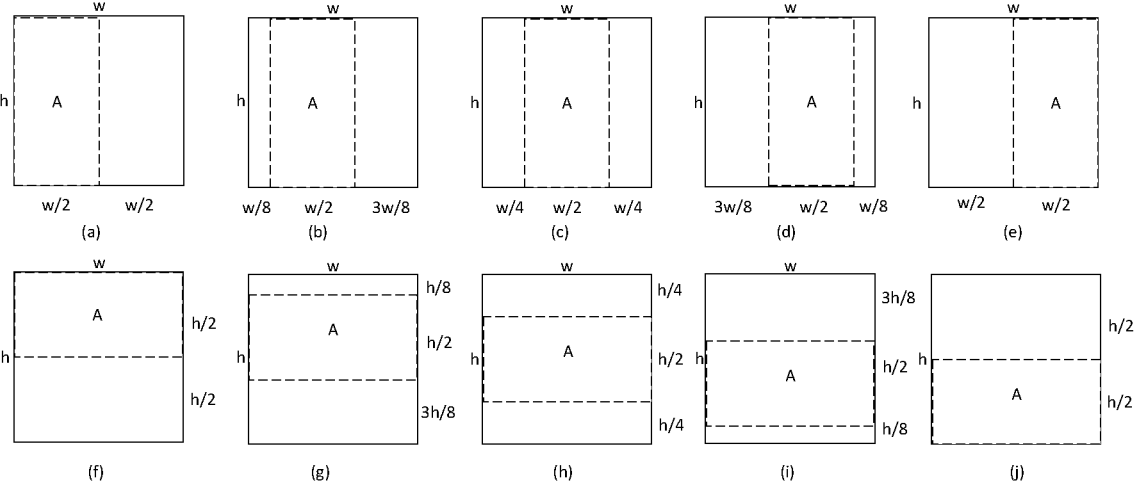
FIG. 24 is an illustration of candidate positions of SVT-V and SVT-H blocks (M1=M2=8).

In one example, the CPSS is calculated as s=w/M1 for SVT-V or s=h/M2 for SVT-H, where w and h are the width and height of the residual block, respectively, and M1 and M2 are pre-determined integers in range of 2 to 8. More candidate positions are allowed with a larger M1 or M2 value. In this example, M1 and M2 are both set as 8. Therefore, the value of P is among 0 to 4. The candidate positions are illustrated in FIG. 24.

In another example, the CPSS is calculated as s=max (w/M1, Th1) for SVT-V or s=max (h/M2, Th2) for SVT-H, where Th1 and Th2 are pre-defined integers specifying a minimum step size. Th1 and Th2 are integers no less than 2. In this example, Th1 and Th2 are set as 4, and M1 and M2 are set as 8. In this example, different block sizes may have different number of candidate positions. For example, when w=8, 2 candidate positions (as illustrated by FIG. 24(A) and FIG. 24(E)) are available to choose; when w=16, 3 candidate positions (as illustrated by FIG. 24(A), FIG. 24(C), and FIG. 24(E)) are available to choose; when w>16, 5 positions are available to choose.

In another example, the CPSS is calculated as s=w/M1 for SVT-V or s=h/M2 for SVT-H, where M1 and M2 are set as 4. Accordingly, 3 candidate positions are allowed.

In another example, the CPSS is calculated as s=w/M1 for SVT-V or s=h/M2 for SVT-H, where M1 and M2 are set as 2. Accordingly, 2 candidate positions are allowed.

In another example, the CPSS is calculated as s=max (w/M1, Th1) for SVT-V or s=max (h/M2, Th2) for SVT-H, where T1 and T2 are set as 2, M1 is set as 8 if w≥h or is set as 4 if w<h, and M2 is set as 8 if h≥w or is set as 4 if h<w. In this case, the number of candidate positions for SVT-H or SVT-V may further depend on the aspect ratio of the residual block.

In another example, the CPSS is calculated as s=max (w/M1, Th1) for SVT-V or s=max (h/M2, Th2) for SVT-H, where the values of M1, M2, Th1 and Th2 are derived from a high-level syntax structure in the bitstream (e.g., sequence parameter set). M1 and M2 may share the same value parsed from a syntax element, and Th1 and Th2 may share the same value parsed from another syntax element.

The position index P may be binarized into one or more bins using truncated unary code. For example, if the P value is in the range of 0 to 4, P value 0, 4, 2, 3, and 1 are binarized as 0, 01, 001, 0001, and 0000, respectively; if the P value is in the range of 0 to 1, P value 0 and 1 are binarized as 0 and 1, respectively.

Step 3. Parse transform coefficients of the transform block based on the transform block size.

This is a commonly used process in video decoding, such as the transform coefficients parsing in HEVC or H.264/ Advanced Video Coding (AVC). The transform coefficients may be coded using run-length coding or coded more sophisticated as a set of transform groups.

Step 3 may be conducted before Step 2.

Step 4. Reconstruct the residual block Ro based on the transform coefficients and the transform block position.

Inverse quantization and inverse transform of size w_t× h_t are applied to the transform coefficients to recover residual samples. The size of the residual samples is w_t× h_t, which is the same to the transform block size. The inverse transform may be an inverse Discrete Cosine Transform (DCT) or an inverse Discrete Sine Transform (DST).

The residual samples are assigned to a corresponding region inside the residual block Ro, according to the transform block position, and the rest samples inside the residual block are set to be zero. For example, if SVT-V is used and the number of candidate position is 5 and the position index is 4, the reconstructed residual samples are assigned to region A in FIG. 24(E) and the region of size (w/2)×h to the left of region A has zero residual.

After conducting Step 1 to Step 4, the reconstructed residual block may be composed with a prediction block to generate the reconstructed samples in a coding unit. A filtering process may be applied on the reconstructed samples later, such as deblocking filter and sample adaptive offset (SAO) processing in HEVC.

Embodiment 2

In another embodiment, the transform position information is derived from the transform coefficients of the residual block. A residual block Ro of size w×h can be reconstructed by the following steps.

Step 1. Determine the transform block size of the residual block Ro.

The same process described in Step 1 of Embodiment 1 can be applied.

Step 2. Parse transform coefficients of the transform block based on the transform block size.

The same process described in Step 3 of Embodiment 1 can be applied.

Step 3. Derive the transform block position based on the sum of the transform coefficients.

In one example, the sum of the transform coefficients is calculated by adding up all transform coefficients of Y component. In another example, the sum of the transform coefficients is calculated by adding up all transform coefficients of Y, U, and V components. In another example, the sum of the transform coefficients is calculated by adding up the first N transform coefficients of Y component in coefficients scan order (e.g., using a zig-zag scan), where N may be set as 16 or 32.

The position index P (which indicates the transform block position, as described in Embodiment 1) is derived by the sum of the transform coefficients St and the number of candidate positions Nt associated with the transform block, according to the following formula: P=St % Nt, where % denotes a modulo operation which finds the remainder after division of St by Nt.

In one example, the parameters M1 and M2 are set as 4, and there are 3 candidate positions for SVT-H or SVT-V (i.e., Nt for SVT-H or SVT-V is 3). The P is calculated as the remainder of St divided by 3. In another example, the parameters M1 and M2 are set as 2, and there are 2 candidate positions for SVT-H or SVT-V (i.e., Nt for SVT-H or SVT-V is 2). The P is calculated as the remainder of St divided by 2.

In another example, the position index may be partially decided by the transform coefficient sum. The parameters M1 and M2 are set as 8, and there are 5 candidate positions for SVT-H or SVT-V. If St % 3 is equal to 0, P is determined as 0; if St % 3 is equal to 1, P is determined as 4; otherwise, the P value is among 1, 2s and 3 (but not decided yet). Then, a syntax element having three possible values is parsed to determine whether P is equal to 1 or 2 or 3 based on the value of the syntax element (e.g., P is set as 1, 2s or 3 if the syntax element value is 0, 1, or 2).

There may be some condition check to determine whether the position index information is hidden in the coefficient sum. For example, when the number of transform coefficients is smaller than a threshold (e.g., 4 or 6) or the distance between the first and last coefficients are smaller than a threshold (e.g., 5 or 6), the position index does not rely on the coefficient sum and is explicitly signaled, and the parsing process in Embodiment 1 is applied to determine the position index.

Step 4. Reconstruct the residual block Ro based on the transform coefficients and the transform block position.

The same process described in Step 4 of embodiment 1 can be applied.

Embodiment 3

In another embodiment, the type of SVT is derived based on a first group of transform coefficient, and the position information is derived from a second group of the transform coefficients of the residual block.

A residual block Ro of size w×h can be reconstructed by the following steps.

Step 1. Determine the transform block size of the residual block Ro, by step 1.1 and step 1.2.

Step 1.1. Determine the usage of SVT. This is the same as Step 1.1 in Embodiment 1.

Step 1.2. Parse a first group of transform coefficients and determine the type of SVT based on the sum of the first group of transform coefficients.

Figure 25:
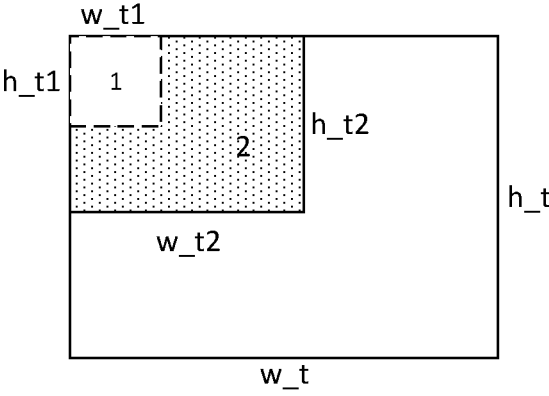
FIG. 25 is an illustration of a first group of transform coefficients and a second group of transform coefficients.

The first group of transform coefficients may be in a region of size $w\_t1 \times h\_t1$ at the top left part of the transform block (corresponding to lower frequency transform coefficients), as illustrated by the solid region 1 in FIG. 25. In one example, $w\_t1$ and $h\_t1$ are both set as 4. In another example, $w\_t1 = max (w/8, 4)$ and $h\_t1 = max (h/8, 4)$.

If the sum of the first-group coefficients is an even number, SVT-V (or SVT-H) is used; otherwise, SVT-H (or SVT-V) is used.

Step 2. Parse the rest transform coefficients in the transform block based on the transform block size.

The coefficients scan order is derived based on the width and height of the transform block. When parsing the transform coefficients, the coefficients at positions covered by the first group of transform coefficients are skipped and they are assigned to be the first group of transform coefficients.

Step 3. Derive the transform block position based on the sum of a second group of transform coefficients.

A second group of transform coefficients are used to calculate a sum. Based on the sum, the position index is derived, in which the method described in Embodiment 2 can be used. The second group of transform coefficients may be in a region of size $w\_t2 \times h\_t2$ at the top left part of the transform block apart from the first group of transform coefficients, as illustrated by the dotted region 2 in FIG. 25.

In one example, $w\_t2 = w\_t$ and $h\_t2 = h\_t$, i.e., all coefficients apart from the first-group coefficients belong to the second group. In another example, $w\_t2 = max (w\_t/2, w\_t1)$ and $h\_t2 = max (h\_t/2, h\_t1)$.

Step 4. Reconstruct the residual block Ro based on the transform coefficients and the transform block position. The processing in Step 4 of Embodiment 1 can be used.

Embodiment 4

In another embodiment, the number of candidate positions for a residual block using SVT is derived based on the distribution of transform coefficient.

A residual block Ro of size w×h can be reconstructed by the following steps.

Step 1. Determine the transform block size of the residual block Ro.

The same process described in Step 1 of Embodiment 1 can be applied.

Step 2. Parse transform coefficients of the transform block based on the transform block size.

The same process described in Step 3 of Embodiment 1 can be applied.

Step 3. Derive the transform block position based on the distribution of the transform coefficients.

In one example, the number of non-zero transform coefficients Nnz is used to decide the number of candidate positions. If Nnz is smaller than a threshold (e.g., 4 or 5 or 8), the candidate position step size is set as w/4 for SVT-V and h/4 for SVT-H, and thus the number of candidate positions is 3; otherwise, the candidate position step size is set as w/8 for SVT-V and h/8 or SVT-H, and thus the number of candidate positions is 5.

In another example, if the last non-zero transform coefficients are inside the top left 4×4 area in the transform block, the candidate position step size is set as w/4 for SVT-V and h/4 for SVT-H, and thus the number of candidate positions is 3; otherwise, the candidate position step size is set as w/8 for SVT-V and h/8 or SVT-H, and thus the number of candidate positions is 5.

Based on the number of candidate positions, the position index is decoded with truncated unary code with the largest possible value being the number of candidate positions minus one.

Step 4. Reconstruct the residual block Ro based on the transform coefficients and the transform block position. The processing in Step 4 of Embodiment 1 can be used.

The present disclosure provides the following benefits and advantages relative to known solutions.

The candidate positions for SVT blocks are decided by a step size related to the width and height of the residual block and are limited to be no more than 5, which reduces the transform block information compared with [1] and achieves a better balance between signaling overhead and residual coding efficiency.

The SVT information is coded different from [1], i.e., it is organized as an SVT usage information, an SVT type information, and an SVT position information.

The SVT position information may be derived based on the sum of a plurality of transform coefficients of the residual block.

The SVT type information may be derived based on the sum of a plurality of transform coefficients of the residual block.

It may be understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a Universal Serial Bus (USB) flash drive, a removable hard disk, a read-only memory (ROM), a random-access memory (RAM), a magnetic disk, or an optical disc.

The foregoing descriptions are merely example embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A video encoding method, comprising:
    obtaining a picture;

partitioning, based on partition information, the picture into a set of non-overlapping blocks that include a coding unit (CU);

obtaining, when the CU comprises only one residual transform unit (TU) and when a first size of the residual TU is less than a second size of the CU, a TU partitioning mode of the CU and a residual position of the residual TU;

determining, using the TU partitioning mode and the residual position, a horizontal transform type and a vertical transform type;

obtaining transform coefficients of the residual TU based on the horizontal transform type and the vertical transform type; and generating a bitstream that comprises a first flag indicating the TU partitioning mode, a second flag indicating the residual position, the partition information, and the transform coefficients.

2. The video encoding method of claim 1, wherein the horizontal transform type is based on discrete sine transform (DST) type VII (DST-7) and the vertical transform type is based on the DST-7, the horizontal transform type is based on the DST-7 and the vertical transform type is based on discrete cosine transform (DCT) type VIII (DCT-8), or the horizontal transform type is based on the DCT-8 and the vertical transform type is based on the DST-7.

3. The video encoding method of claim 2, wherein the TU partitioning mode specifies that the CU is partitioned into two first TUs that are arranged horizontally and that comprise a left TU and a right TU, and a third size of the left TU is smaller than, greater than, or equal to a fourth size of the right TU, or wherein the TU partitioning mode specifies that the CU is partitioned into two second TUs that are arranged vertically and that comprise a top TU and a bottom TU, and a fifth size of the top TU is smaller than, greater than, or equal to a sixth size of the bottom TU.

4. The video encoding method of claim 3, further comprising:
    partitioning the CU into the two first TUs, wherein the residual position is left or right; or
    partitioning the CU into the two second TUs, wherein the residual position is a top or a bottom.

5. The video encoding method of claim 4, wherein the horizontal transform type is the DST-7 and the vertical transform type is the DCT-8 when the CU is partitioned into the two second TUs and the residual position is the top, the horizontal transform type is the DST-7 and the vertical transform type is the DST-7 when the CU is partitioned into the two second TUs and the residual position is the bottom, the horizontal transform type is the DCT-8 and the vertical transform type is the DST-7 when the CU is partitioned into the two first TUs and the residual position is the left, and the horizontal transform type is the DST-7 and the vertical transform type is the DST-7 when the CU is partitioned into the two first TUs and the residual position is the right.

6. The video encoding method of claim 1, wherein the residual TU comprises one or more residuals for one or more of a first chrominance component, a second chrominance component, or a luminance component.

7. The video encoding method of claim 6, wherein the one or more residuals comprise a first residual for the first chrominance component, a second residual for the second chrominance component, and a third residual for the luminance component.

8. A video decoding method, comprising:
    obtaining partition information;

partitioning, based on the partition information, a picture block into a set of non-overlapping blocks that include a coding unit (CU);

obtaining, when the CU comprises only one residual transform unit (TU) and a size of the residual TU is less than a size of the CU, a TU partitioning mode of the CU and a residual position of the residual TU;

obtaining, based on the TU partitioning mode and the residual position, a horizontal transform type and a vertical transform type;

applying, based on the horizontal transform type and the vertical transform type, an inverse transform to dequantized coefficients of the residual TU to obtain a residual block of the residual TU; and obtaining a video block based on the residual block.

9. The video decoding method of claim 8, wherein the horizontal transform type is based on discrete sine transform (DST) type VII (DST-7) and the vertical transform type is based on the DST-7, the horizontal transform type is based on the DST-7 and the vertical transform type is based on discrete cosine transform (DCT) type VIII (DCT-8), or the horizontal transform type is based on the DCT-8 and the vertical transform type is based on the DST-7.

10. The video decoding method of claim 9, wherein the TU partitioning mode specifies that the CU is partitioned into two first TUs that are arranged horizontally and that comprise a left TU and a right TU, and a third size of the left TU is smaller than, greater than, or equal to a fourth size of the right TU, or wherein the TU partitioning mode specifies that the CU is partitioned into two second TUs that are arranged vertically and that comprise a top TU and a bottom TU, and a fifth size of the top TU is smaller than, greater than, or equal to a sixth size of the bottom TU.

11. The video decoding method of claim 10, further comprising:

partitioning the CU into the two first TUs, wherein the residual position is left or right; or partitioning the CU into the two second TUs, wherein the residual position is a top or a bottom.

12. The video decoding method of claim 11, wherein the horizontal transform type is the DST-7 and the vertical transform type is the DCT-8 when the CU is partitioned into the two second TUs and the residual position is the top, the horizontal transform type is the DST-7 and the vertical transform type is the DST-7 when the CU is partitioned into the two second TUs and the residual position is the bottom, the horizontal transform type is the DCT-8 and the vertical transform type is the DST-7 when the CU is partitioned into the two first TUs and the residual position is the left, and the horizontal transform type is the DST-7 and the vertical transform type is the DST-7 when the CU is partitioned into the two first TUs and the residual position is the right.

13. The video decoding method of claim 8, wherein the residual TU comprises one or more residuals for one or more of a first chrominance component, a second chrominance component, or a luminance component.

14. The video decoding method of claim 13, wherein the one or more residuals comprise a first residual for the first chrominance component, a second residual for the second chrominance component, and a third residual for the luminance component.

15. A non-transitory computer-readable storage medium storing a bitstream and one or more instructions executable by at least one processor to perform operations of decoding the bitstream, the operations comprising:

receiving the bitstream, the bitstream comprising:

partition information configured to partition a picture block into a set of non-overlapping blocks that includes a coding unit (CU);

a first flag indicating a transform unit (TU) partitioning mode that partitions the CU into at least two non-overlapping TUs that include a residual TU;

transform coefficients of the residual TU; and a second flag indicating a residual position of the residual TU, wherein the TU partitioning mode and the residual position determine a horizontal transform type and a vertical transform type, wherein the horizontal transform type, the vertical transform type, and the transform coefficients obtain a residual block of the residual TU, and wherein the residual block obtains a video block.

16. The non-transitory computer-readable medium of claim 15, wherein the horizontal transform type is based on discrete sine transform (DST) type VII (DST-7) and the vertical transform type is based on the DST-7, the horizontal transform type is based on the DST-7 and the vertical transform type is based on discrete cosine transform (DCT) type VIII (DCT-8), or the horizontal transform type is based on the DCT-8 and the vertical transform type is based on the DST-7.

17. The non-transitory computer-readable medium of claim 16, wherein the TU partitioning mode specifies that the CU is partitioned into two first TUs that are arranged horizontally and that comprise a left TU and a right TU, and a third size of the left TU is smaller than, greater than, or equal to a fourth size of the right TU, or wherein the TU partitioning mode specifies that the CU is partitioned into two second TUs that are arranged vertically and that comprise a top TU and a bottom TU, and a fifth size of the top TU is smaller than, greater than, or equal to a sixth size of the bottom TU.

18. The non-transitory computer-readable medium of claim 17, wherein the residual position is either left or right when the CU is partitioned into the two first TUs, and wherein the residual position is either a top or a bottom when the CU is partitioned into the two second TUs.

19. The non-transitory computer-readable medium of claim 18, wherein the horizontal transform type is the DST-7 and the vertical transform type is the DCT-8 when the CU is partitioned into the two second TUs and the residual position is the top, the horizontal transform type is the DST-7 and the vertical transform type is the DST-7 when the CU is partitioned into the two second TUs and the residual position is the bottom, the horizontal transform type is the DCT-8 and the vertical transform type is the DST-7 when the CU is partitioned into the two first TUs and the residual position is the left, and the horizontal transform type is the DST-7 and the vertical transform type is the DST-7 when the CU is partitioned into the two first TUs and the residual position is the right.

20. The non-transitory computer-readable medium of claim 15, wherein the residual TU comprises one or more residuals for one or more of a first chrominance component, a second chrominance component, or a luminance component.

* * * * *